United States Patent [19]

Tanita et al.

[11] Patent Number: 5,063,334
[45] Date of Patent: Nov. 5, 1991

[54] ORTHOGONAL TWO-AXIS MOVING APPARATUS

[75] Inventors: Takeo Tanita, Kawasaki; Hiroyuki Kigami; Yusaku Azuma, both of Yokohama, all of Japan

[73] Assignee: Canon Kabushiki Kaisha, Tokyo, Japan

[21] Appl. No.: 555,939

[22] Filed: Jul. 23, 1990

[30] Foreign Application Priority Data

Jul. 24, 1989 [JP] Japan ................................ 1-188912
Jul. 24, 1989 [JP] Japan ................................ 1-188913
Jul. 24, 1989 [JP] Japan ................................ 1-188916
Sep. 28, 1989 [JP] Japan ................................ 1-250562

[51] Int. Cl.$^5$ ............................................. B66C 23/16
[52] U.S. Cl. ............................ 318/568.10; 318/567; 318/67; 414/749; 74/89.22; 901/17
[58] Field of Search .......................... 318/560–640, 318/67, 62, 5, 9, 14; 901/17, 21, 3, 9, 12, 13, 14, 15, 16; 74/89.22, 89.2; 364/513; 414/744 R, 749

[56] References Cited

U.S. PATENT DOCUMENTS

| | | | |
|---|---|---|---|
| Re. 32,414 | 5/1987 | Hutchins et al. | 901/21 X |
| 4,315,437 | 2/1982 | Etchepare et al. | 74/89.22 |
| 4,524,520 | 6/1985 | Levy | 74/89.22 |
| 4,537,084 | 8/1985 | Passemard et al. | 74/89.22 |
| 4,600,083 | 7/1986 | Parent et al. | 74/89.22 X |
| 4,922,173 | 5/1990 | Lawler | 364/513 X |
| 4,961,213 | 10/1990 | Linhart | 378/181 |

FOREIGN PATENT DOCUMENTS 61-10276 3/1986 Japan.
61-21799 5/1986 Japan.
2-250784 10/1990 Japan.

*Primary Examiner*—Paul Ip
*Attorney, Agent, or Firm*—Fitzpatrick, Cella, Harper & Scinto

[57] ABSTRACT

An orthogonal two-axis moving apparatus includes a first guide member which extends along one direction and is attached to a stationary position, a slide block which is slidably supported on the first guide member and is movable in the one direction, and a second guide member which extends along the other direction perpendicular to the one direction and is supported by the slide block to be movable in the other direction. First and second rollers are pivotally supported on two ends of the first guide member, a third roller is pivotally supported on one end of the second guide member, and intermediate rollers are pivotally supported on four corner portions of the slide block. A coupling belt is provided and has two ends of which are fixed to the other end of the second guide member and which is looped in a cross shape on the first to third rollers and the four intermediate rollers. In addition, a first origin detection device detects an original position of the slide block along the one direction, and a second origin detection device for detecting an origin position of the second guide member along the other direction.

19 Claims, 34 Drawing Sheets

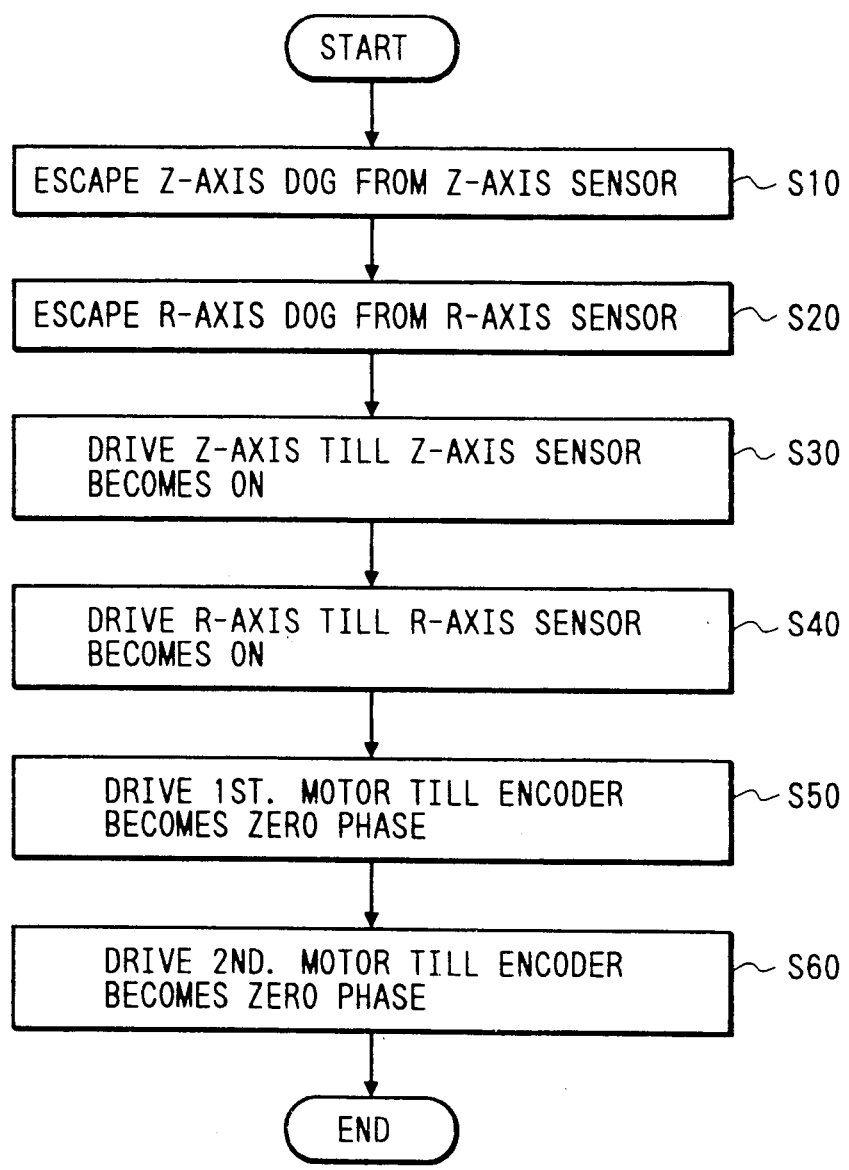

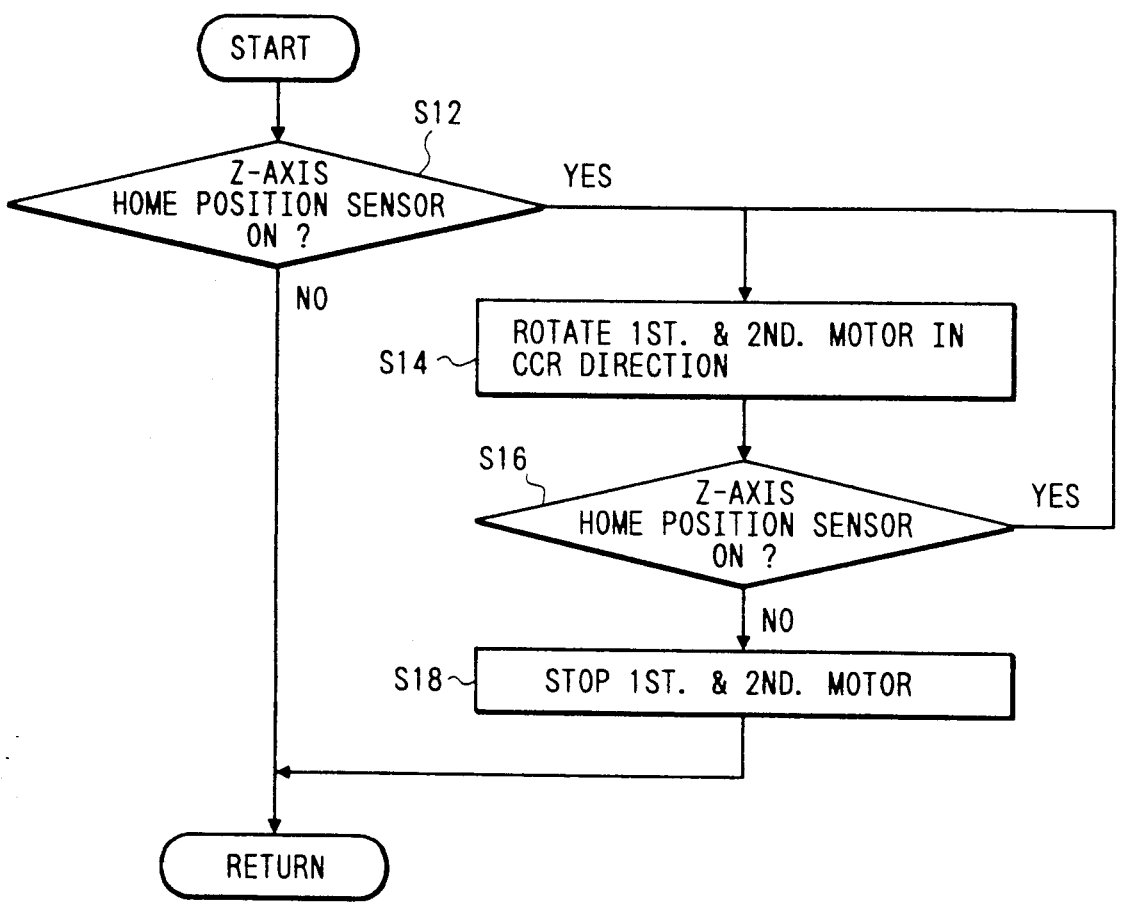

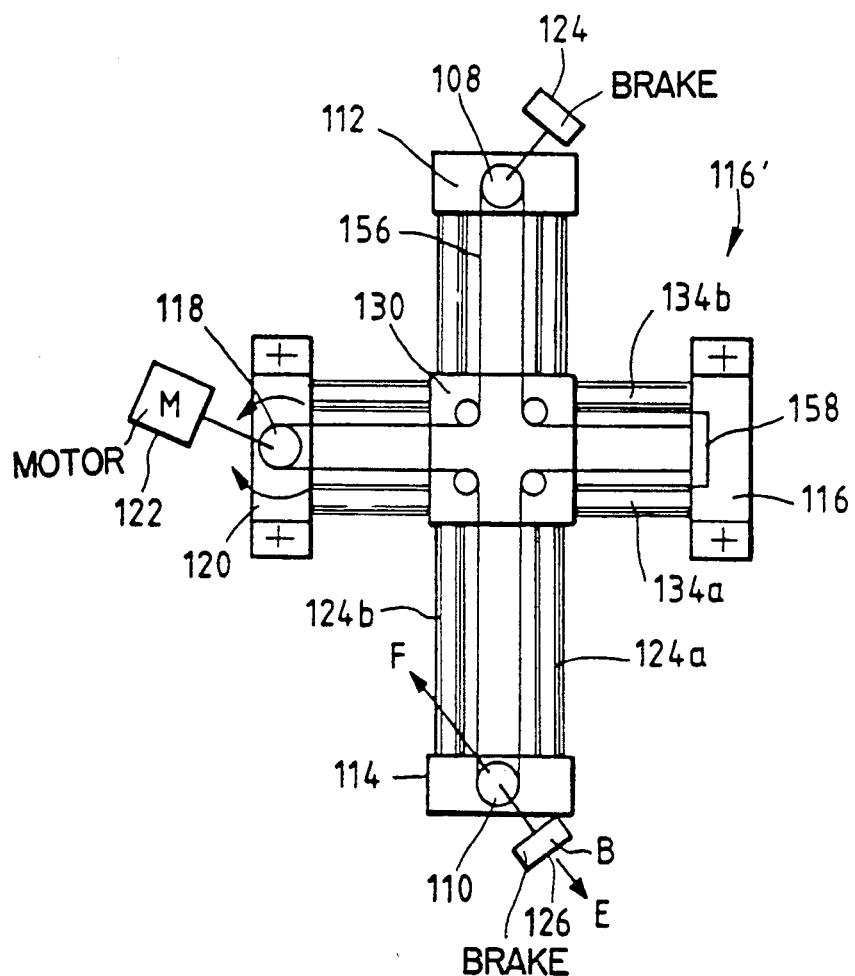

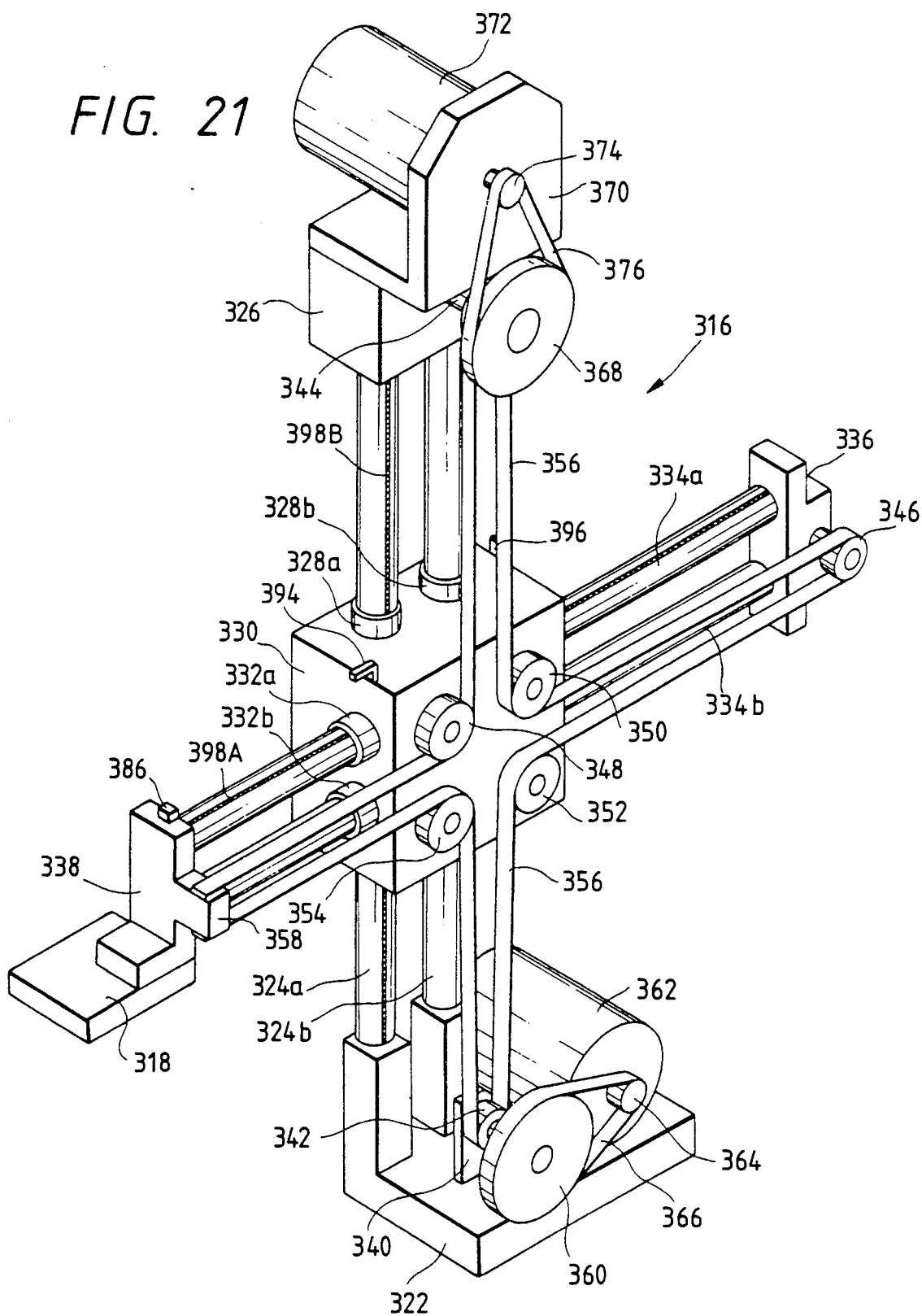

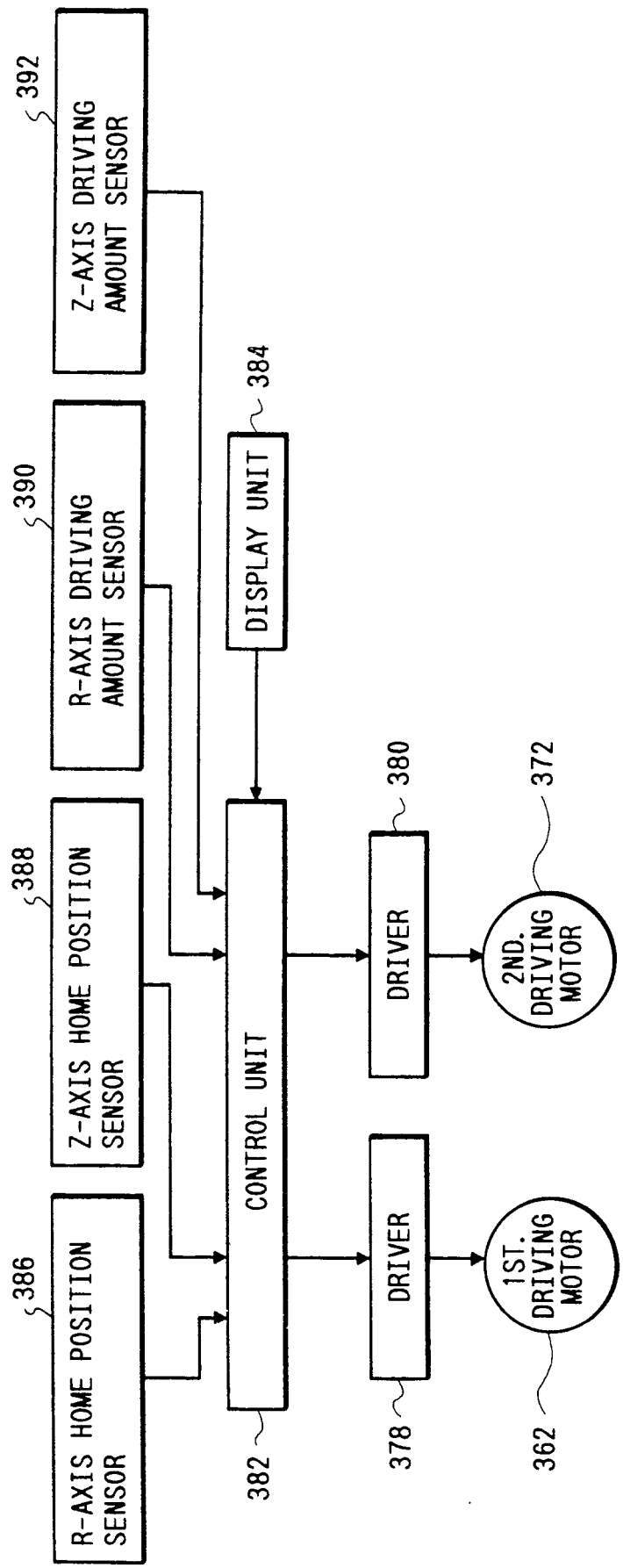

ORTHOGONAL TWO-AXIS MOVING APPARATUS

BACKGROUND OF THE INVENTION

1. Field of the Invention

The present invention relates to an orthogonal two-axis moving apparatus which can move one end portion of an arm to an arbitrary position within a plane having two axes, i.e., one axis parallel to an extending direction of the arm and an axis perpendicular to the one arm.

2. Background Art

Conventionally, various orthogonal two-axis moving apparatuses are known, each of which can move one end portion of an arm to an arbitrary position within a plane having two axes, i.e., one axis parallel to an extending direction of the arm and an axis perpendicular to the one arm. For example, as shown in FIG. 29, a slide block a is slidably supported by first and second guide rods b and c which are perpendicular to each other. Two orthogonal ball screw shafts d and e extend through the slide block a in a threadably engaged state The first ball screw shaft d is rotated by a first driving motor f mounted on one end of the first guide rod b, and the second ball screw shaft e is rotated by a second driving motor c mounted on one end of the second guide rod c.

In the conventional orthogonal two-axis moving apparatus with the above structure, the slide block a can be moved to an arbitrary position in a plane including the first and second guide rods b and c by selectively driving the first and second motors f and g.

However, since the conventional orthogonal two-axis moving apparatus uses two expensive ball screw shafts, the apparatus becomes expensive, thus posing a problem in terms of a cost. Paying attention to the first driving motor f, a weight as a drive load of this motor is a sum of the weight of the slide block a and the weight of the second driving motor, and is considerably large. As a result, the first driving motor f must comprise a large capacity motor, and this also results in an increase in cost. In addition, the weight of a moving portion is increased, thus impairing movement performance.

Furthermore, demand has arisen for an inexpensive origin detection mechanism which can reliably detect origin positions of two axes, as starting points upon execution of movement control.

SUMMARY OF THE INVENTION

The present invention has been made in consideration of the above situation, and has as its object to provide an inexpensive orthogonal two-axis moving apparatus which can reduce its cost, has good movement performance, and can reliably detect origin positions.

BRIEF DESCRIPTION OF THE DRAWINGS

FIG. 5 is a flow chart showing a main routine of an origin detection operation in a control unit;

FIGS. 6A to 6F are flow charts showing in detail steps in the main routine shown in FIG. 5;

FIGS. 13A to 13C are schematic plan views respectively showing six moving states of a mounting plate according to different operation states of a driving motor and first and second brake mechanisms;

FIG. 21 is a perspective view of a structure of the orthogonal two-axis moving apparatus shown in FIG. 20;

FIG. 22 is a block diagram showing an arrangement of a control system for the orthogonal two-axis moving apparatus;

DETAILED DESCRIPTION OF THE PREFERRED EMBODIMENTS

A structure of the first embodiment of an orthogonal two-axis moving apparatus according to the present invention, which is applied to an assembly robot, will be described in detail below with reference to FIGS. 1 to 6.

Structure of First Embodiment

Figure 1:
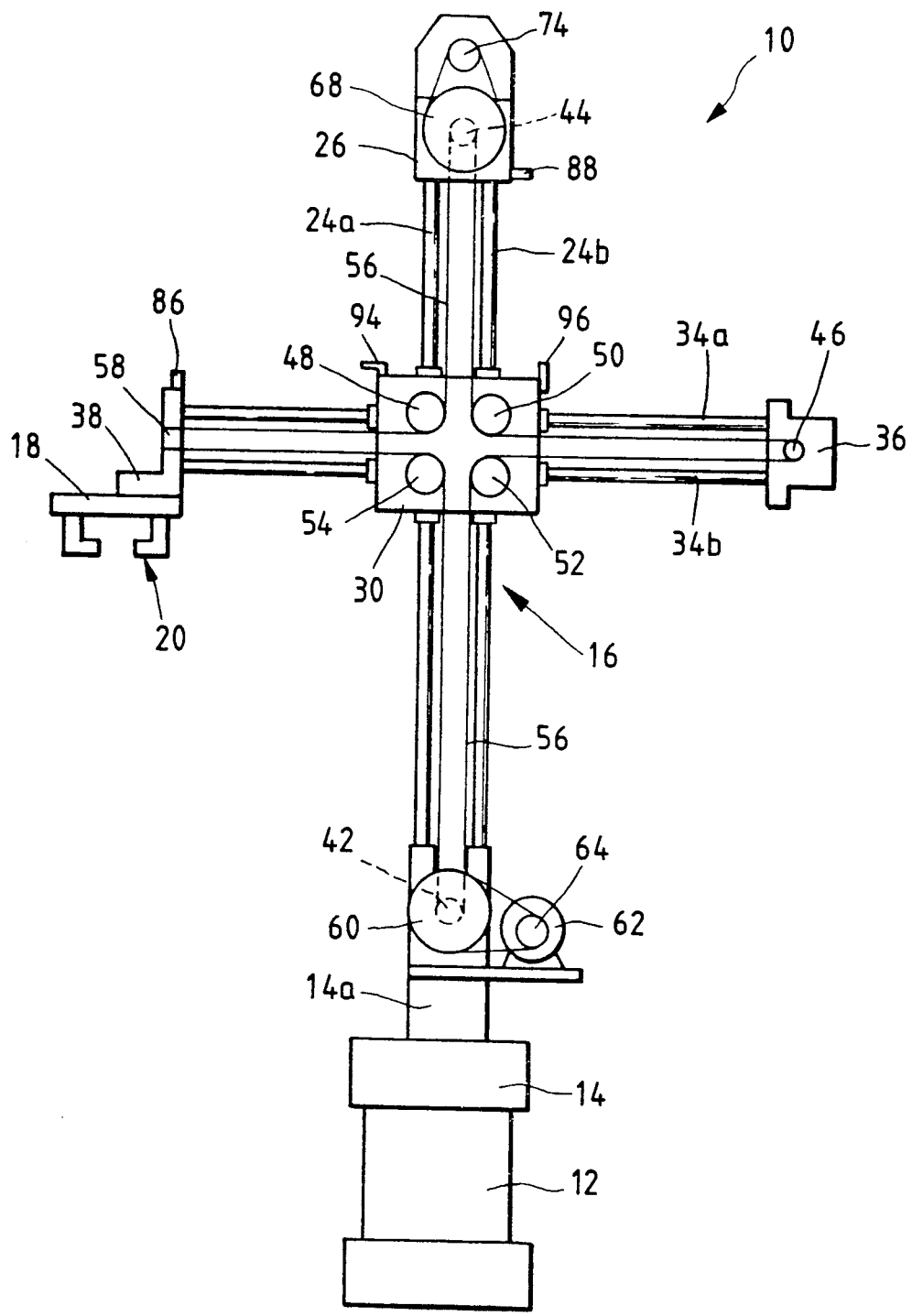
FIG. 1 is a schematic front view showing a structure of an assembly robot to which the first embodiment of an orthogonal two-axis moving apparatus according to the present invention is applied.

As shown in FIG. 1, an assembly robot 10 comprises a main motor 12 mounted on a foundation (not shown), a reduction gear mechanism 14 connected to the upper portion of the main motor 12 and comprising a driving shaft 14a which projects upward and is rotated about a vertical axis, an orthogonal two-axis moving apparatus (to be simply referred to as a moving apparatus hereinafter) 16 which is rotated by the driving shaft 14a of the reduction gear mechanism 14 about the vertical axis, a finger mounting plate 18 attached to the left end in FIG. 1 of the moving apparatus 16, and a finger device 20 attached to the finger mounting plate 18.

Figure 2:
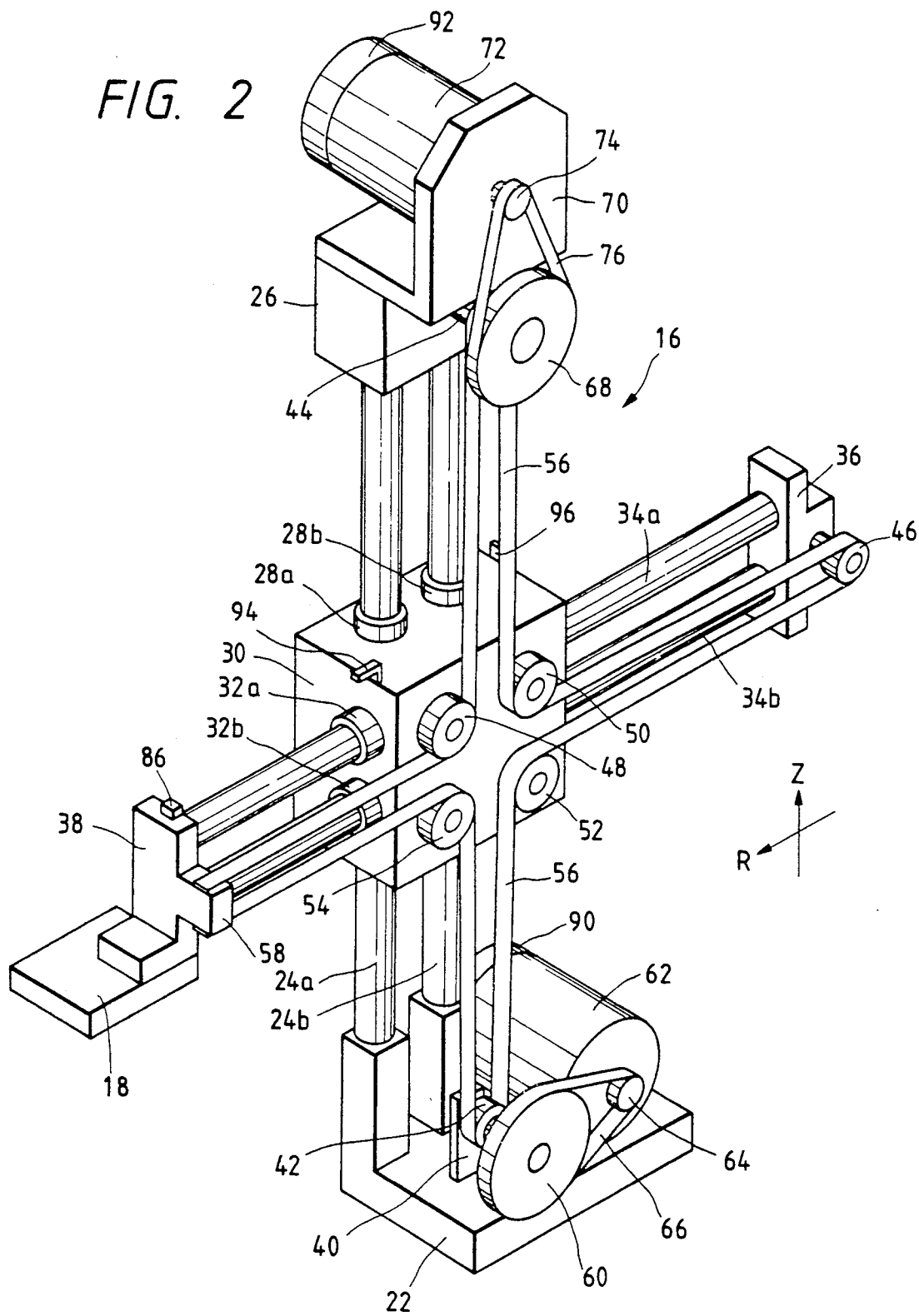
FIG. 2 is a perspective view of a structure of the orthogonal two-axis moving apparatus shown in FIG. 1.

The structure of the moving apparatus 16 will be described in detail below with reference to FIG. 2.

The moving apparatus 16 comprises a base 22 fixed to the upper end of the driving shaft 14a of the reduction gear mechanism 14 described above, two first guide shafts 24a and 24b which stand upright (i.e., extend in a Z-axis direction) on the base 22, and an upper stationary block 26 fixed to the upper ends of the first guide shafts 24a and 24b. A slide block 30 is slidably supported in the Z-axis direction while the first guide shafts 24a and 24b extend through the slide block 30 via first slide bushings 28a and 28b. In other words, the slide block 30 is vertically slidably supported by the pair of first guide shafts 24a and 24b.

A pair of second guide shafts 34a and 34b are supported by the slide block 30 to be slidable in a horizontal direction (R-axis direction) while extending through it via second slide bushings 32a and 32b. A right movable block 36 is attached to one-end portions, i.e., the right end portions (FIG. 2) of these second guide shafts 34a and 34b. A left movable block 38 is attached to the other-end portions, i.e., the left end portions (FIG. 2) of the shafts 34a and 34b. The above-mentioned finger mounting plate 18 is fixed to the lower surface of the left movable block 38.

With this arrangement, the finger mounting plate 18 can be moved to an arbitrary position within a vertical plane including two orthogonal axes, i.e., R and Z axes. In particular, as shown in FIG. 1, since the moving apparatus 16 is attached to the driving shaft 14a which is pivoted about the vertical axis, the finger mounting plate 18, and hence, the finger device 20 attached to the finger mounting plate 18 can be moved to an arbitrary position within a predetermined radius (i.e., an R-axis direction stroke) having the main motor 12 as the center.

A driving mechanism for moving the finger mounting plate 18 to an arbitrary position within the vertical plane in the above-mentioned structure will be described below.

In this driving mechanism, a first driving roller 42 is axially supported by the base 22 via a mounting stay 40 to be pivotal about an axis perpendicular to the vertical plane. A second driving roller 44 is axially supported by the upper stationary block 26 in a similar rotatable state. On the other hand, a driven roller 46 is axially supported by the right movable block 36 in a similar rotatable state.

The slide block 30 is formed into a substantially square shape when viewed from the front side. Four intermediate rollers 48, 50, 52, and 54 are rotatably and axially supported on the four corners of the front surface of the slide block 30 in the same state as the first and second driving rollers 42 and 44. The first intermediate roller 48 is located at the upper left corner in FIG. 2, the second intermediate roller 50 is located at the upper right corner in FIG. 2, the third intermediate roller 52 is located at the lower right corner in FIG. 2, and the fourth intermediate roller 54 is located at the lower left corner in FIG. 2.

The first and second driving rollers 42 and 44, and the driven roller 46 respectively comprise toothed rollers on outer peripheral surfaces of which teeth are formed. The first to fourth intermediate rollers 48 to 54 comprise so-called idle rollers, outer peripheral surfaces of which are formed to be smooth.

A coupling belt 56 is wound around these first and second driving rollers 42 and 44, the driven roller 46, and the first to fourth intermediate rollers 48 to 54 in a cross shape. The coupling belt 56 comprises a toothed timing belt. In this embodiment, the coupling belt 56 is wound while the toothed surface faces inward.

More specifically, the coupling belt 56 is wound around the inside outer peripheral surface of the first intermediate roller 48 while one end of the coupling belt 56 is locked by the upper surface of a locking portion 58 integrally formed on the left movable block 38, and is then wound around the outside outer peripheral surface of the second driving roller 44, the outside outer peripheral surface of the driven roller 46, the inside outer peripheral surface of the third intermediate roller 52, the outside outer peripheral surface of the first driving roller 42, and the inside outer peripheral surface of the fourth intermediate roller 54 in turn. Then, the belt 56 is extended while the other end is locked by the lower surface of the locking portion 58 described above.

A large-diameter driven pulley 60 is coaxially fixed to the first driving roller 42. A first driving motor 62 having a reversibly rotatable driving shaft which is rotated about an axis of rotation parallel to that of the driven pulley 60 is mounted on the above-mentioned base 22. A driving pulley 64 is coaxially fixed to the driving shaft of the first driving motor 62. An endless belt 66 is looped between the driving and driven pulleys 64 and 60. With this structure, when the first driving motor 62 is started, the first driving roller 42 can be rotated in one of clockwise or counterclockwise directions.

A large-diameter driven pulley 68 is coaxially fixed to the second driving roller 44. A second driving motor 72 having a reversibly rotatable driving shaft which is rotated about an axis of rotation parallel to that of the driven pulley 68 is mounted on the upper stationary block 26 via a mounting stay 70. A driving pulley 74 is coaxially fixed to the driving shaft of the second driving motor 72. An endless belt 76 is looped between the driving and driven pulleys 74 and 68. With this structure, when the second driving motor 72 is started, the second driving roller 44 can be rotated in one of clockwise or counterclockwise directions.

The first and second driving motors 62 and 72 each incorporate a brake mechanism for braking the corresponding driving shaft when a power supply is stopped. The brake mechanism immediately cancels its brake operation upon power-on. With this brake mechanism, when a power switch is turned off upon completion of a daily work, the slide block 30 can be reliably prevented from being dropped downward by its weight.

When the power supply is accidentally stopped during an operation due to, e.g., a power failure, if the brake mechanisms do not brake the corresponding driving shafts, an article gripped by the finger device 20 collides against, e.g., a floor and is damaged upon downward movement of the slide block 30, and the finger device 20 itself is also damaged. In this embodiment, however, the brake mechanisms are operated when a power supply is stopped, and stop rotation of the driving shafts of the driving motors 62 and 72. Therefore, articles can be reliably prevented from damage.

Figure 3:
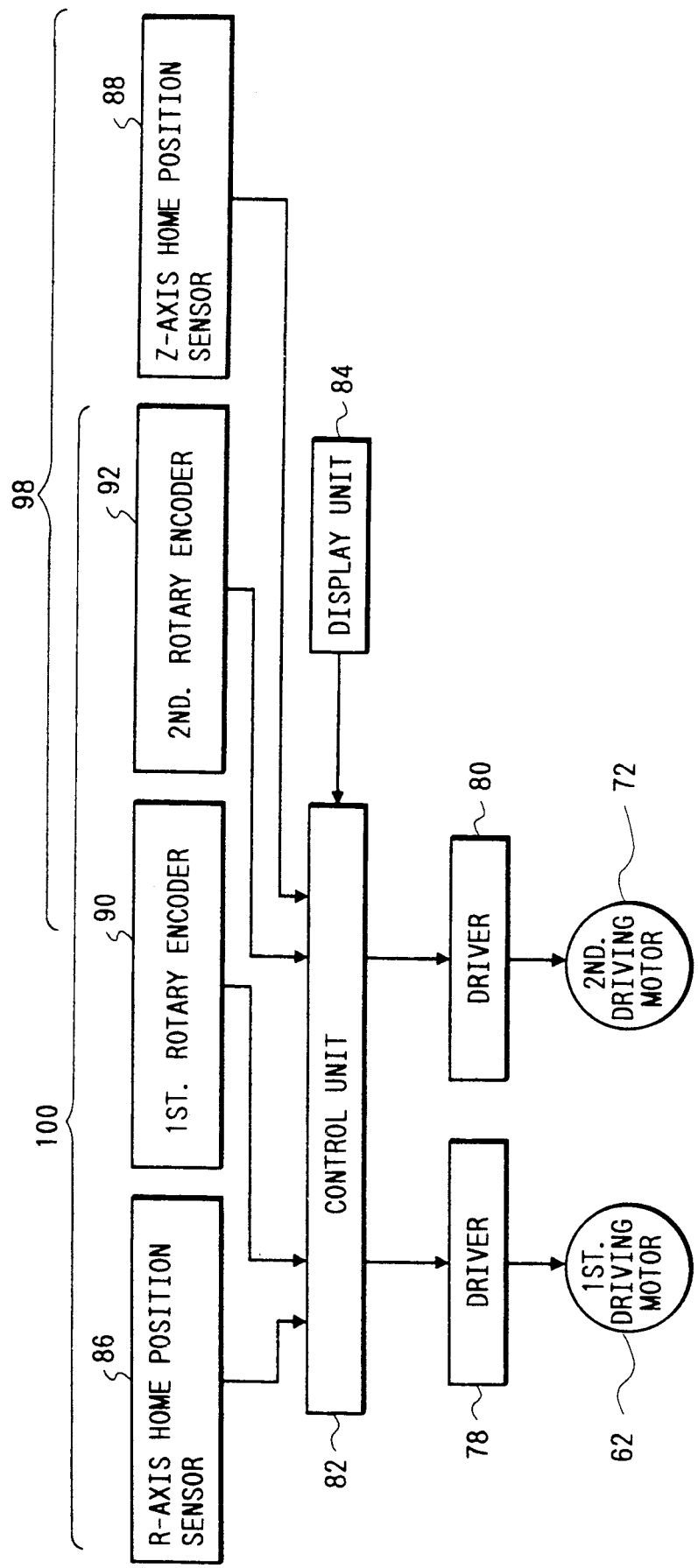
FIG. 3 is a block diagram showing an arrangement of a control system for the orthogonal two-axis moving apparatus.

As shown in FIG. 3, the first and second driving motors 62 and 72 are connected to a control unit 82 through corresponding drivers 78 and 80. The control unit 82 moves an article gripped by the finger device 20 from a start point to an end point on the basis of a prestored control program. The control unit 82 is connected to a teaching unit 84 for teaching the start and end points, and other necessary information.

The control unit 82 is connected to R- and Z-axis home position sensors 86 and 88 for detecting the present position of the central position of the mounting plate 18 as an object to be moved, a first rotary encoder 90, attached to the first driving motor 62, for detecting a rotation amount of the motor 62, and a second rotary encoder 92, attached to the second driving motor 72, for detecting a rotation amount of the motor 72.

The R- and Z-axis home position sensors 86 and 88 are respectively attached to the right end portion of the upper surface of the left movable block 38 and the lower end portion of the right side surface of the upper stationary block 26, respectively, as shown in FIG. 1. An R-axis sensor dog 94 is mounted on the left end portion of the upper surface of the slide block 30. When the second guide shafts 34a and 34b are maximally displaced to the right in FIG. 1, in other words, when the mounting plate 18 is maximally retracted, the R-axis sensor dog 94 opposes the R-axis home position sensor 86 and turns it on. A Z-axis sensor dog 96 is mounted on the upper end portion of the right side surface of the slide block 30. When the slide block 30 is maximally displaced upward, the Z-axis sensor dog 96 opposes the Z-axis home position sensor 88, and turns it on.

In this embodiment, the R-axis home position sensor 86, the R-axis sensor dog 94, the first and second rotary encoders 90 and 92, and the control unit 82 for executing an origin detection control operation for the R-axis on the basis of detection data from these components constitute an R-axis origin detection mechanism 98. The Z-axis home position sensor 88, the Z-axis sensor dog 96, the first and second rotary encoders 90 and 92, and the control unit 82 for executing an origin detection control operation for the Z-axis on the basis of detection data from these components constitute a Z-axis origin detection mechanism 100.

The control unit 82 recognizes a position where the mounting plate 18 is maximally retracted toward the slide block 30 side, and is displaced at its uppermost position, as a home position serving as a reference position in a movement vertical plane, and defines positions for turning on zero phases in the first and second rotary encoders 90 and 92 as origin positions on the basis of this home position. The origin detection control operation will be described later.

Since the first and second rotary encoders 90 and 92 are respectively attached to the first and second driving motors 62 and 72, a driving amount in the R-axis direction and a driving amount in the Z-axis direction of the mounting plate 18 can be obtained from predetermined calculations of rotation amounts detected by the first and second rotary encoders 90 and 92.

Control Sequence of First Embodiment

A control sequence of a moving operation in the control unit 82 in the moving apparatus 16 with the above-mentioned arrangement will be described below.

When the mounting plate 18 is to be moved downward along the Z-axis, the control unit 82 synchronously rotates the first and second driving motors 62 and 72 counterclockwise.

Upon counterclockwise rotation of the first driving motor 62, since the two ends of the timing belt 56 are fixed to the left movable block 38, the length of the timing belt 56 between the left movable block 38 and the fourth intermediate roller 54 is left unchanged, and the length of the timing belt 56 between the first driving roller 42 and the fourth intermediate roller 54 is decreased. On the other hand, upon counterclockwise rotation of the second driving motor 72, the length of the timing belt 56 between the left movable block 38 and the first intermediate roller 48 is left unchanged, and the length of the timing belt 56 between the second driving roller 44 and the first intermediate roller 48 is increased.

A portion of the timing belt 56 between the first driving roller 42 and the third intermediate roller 52 is fed toward a portion between the third intermediate roller 52 and the driven roller 46. A portion of the timing belt 56 between the third intermediate roller 52 and the driven roller 46 is fed toward a portion between the driven roller 46 and the second intermediate roller 50. A portion of the timing belt 56 between the driven roller 46 and the second intermediate roller 50 is fed toward a portion between the second driving roller 44 and the second intermediate roller 50. A portion of the timing belt 56 between the second driving roller 44 and the second intermediate roller 50 is fed toward a portion between the second driving roller 44 and the first intermediate roller 48.

The driving amounts of the first and second driving motors 62 and 72 are set to be equal to each other since these motors are synchronous with each other. Therefore, these feed amounts are equal to each other.

Figure 4A:
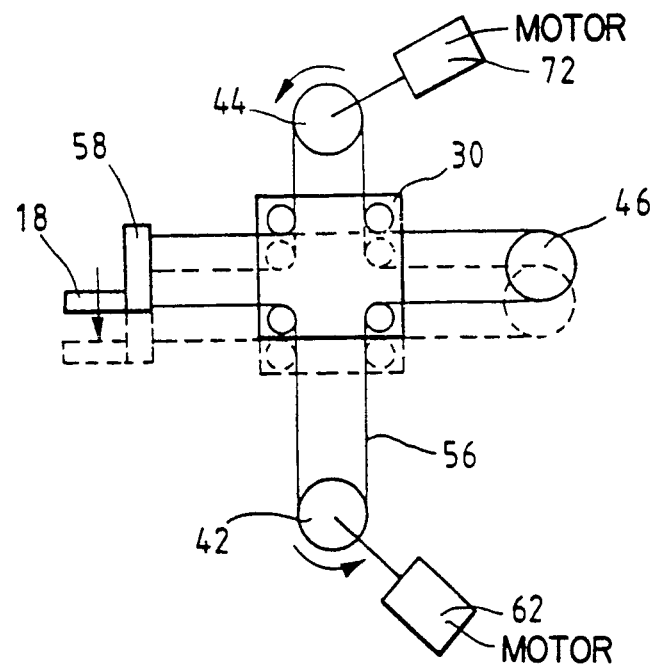
FIGS. 4A to 4D are schematic front views respectively showing four moving states of a mounting plate according to different driving states of first and second driving motors.

In this manner, the lengths of the portions between the first and fourth intermediate rollers 48 and 54 and the left movable block 38 and the lengths of the portions between the driven roller 46 and the second and third intermediate rollers 50 and 52 are left unchanged, the lengths of the portions of the timing belt 56 between the first driving roller 42 and the third and fourth intermediate rollers 52 and 54 are similarly decreased, and the lengths of the portions of the timing belt 56 between the second driven roller 44 and the first and second intermediate rollers 48 and 50 are similarly increased. As a result, as shown in FIG. 4A, the slide block 30 is moved vertically downward, i.e., the mounting plate 18 is moved downward along the Z-axis.

Figure 4B:
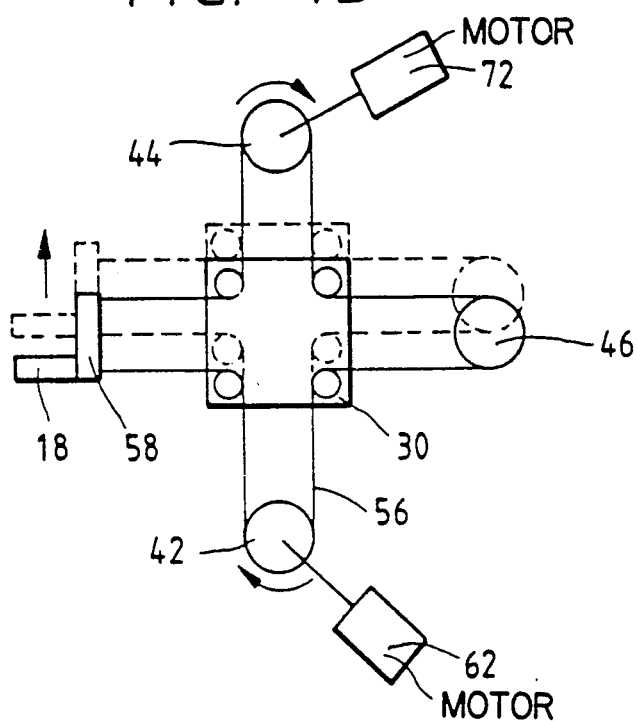

When the mounting plate 18 is to be moved upward along the Z-axis, the control unit 82 synchronously rotates the first and second driving motors 62 and 72 clockwise. As a result, in a state opposite to the state wherein the motors are rotated counterclockwise, lengths of the portions of the timing belt 56 between the first driving roller 42 and the third and fourth intermediate rollers 52 and 54 are similarly increased, and the lengths of the portions of the timing belt 56 between the second driving roller 44 and the first and second intermediate rollers 48 and 50 are similarly decreased. As a result, as shown in FIG. 4B, the slide block 30 is moved vertically upward, i.e., the mounting plate 18 is moved upward along the Z-axis.

When the mounting plate 18 is to project to the left along the R-axis, the control unit 82 synchronously rotates the first driving motor 62 clockwise and the second driving motor 72 counterclockwise.

Upon clockwise rotation of the first driving motor 62, a portion of the timing belt 56 between the driven roller 46 and the third intermediate roller 52 is fed toward a portion between the third intermediate roller 52 and the first driving roller 42. A portion of the timing belt 56 between the third intermediate roller 52 and the first driving roller 42 is fed toward a portion between the first driving roller 42 and the fourth intermediate roller 54. A portion of the timing belt 56 between the first driving roller 42 and the fourth intermediate roller 54 is fed to a portion between the fourth intermediate roller 54 and the left movable block 38. In this manner, the length of the portion of the timing belt 56 between the fourth intermediate roller 54 and the left movable block 38 is increased.

However, upon counterclockwise rotation of the second driving motor 72, a portion of the timing belt 56 between the driven roller 46 and the second intermediate roller 50 is fed toward a portion between the second intermediate roller 50 and the second driving roller 44. A portion of the timing belt 56 between the second intermediate roller and the second driving roller 44 is fed toward a portion between the second driving roller 44 and the first intermediate roller 48. A portion of the timing belt 56 between the second driving roller 44 and the first intermediate roller 48 is fed toward a portion between the first intermediate roller 48 and the left movable block 38. In this manner, the length of the portion of the timing belt 56 between the first intermediate roller 48 and the left movable block 38 is increased.

The driving amounts of the first and second driving motors 62 and 72 are set to be equal to each other since these motors are synchronous with each other. Therefore, these feed amounts are equal to each other.

Figure 4C:
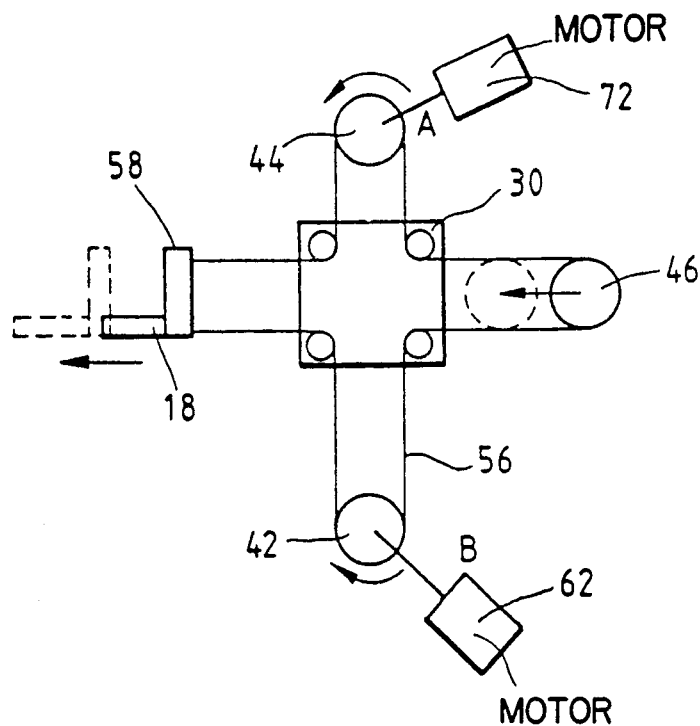

In this manner, the lengths of the portions of the timing belt 56 between the first driving roller 42 and the third and fourth intermediate rollers 52 and 54 and the lengths of the portions of the timing belt 56 between the second driving roller 44 and the first and second intermediate rollers 48 and 50 are similarly left unchanged, the lengths of the portions of the timing belt 56 between the first and fourth intermediate rollers 48 and 54 and the left movable block 38 are similarly increased, and the lengths of the portions of the timing belt 56 between the driven roller 46 and the second and third intermediate rollers 50 and 52 are similarly decreased. As a result, as shown in FIG. 4C, the second guide shafts 34a and 34b are moved to the left relative to the slide block 30, i.e., the mounting plate 18 projects to the left along the R-axis.

Figure 4D:
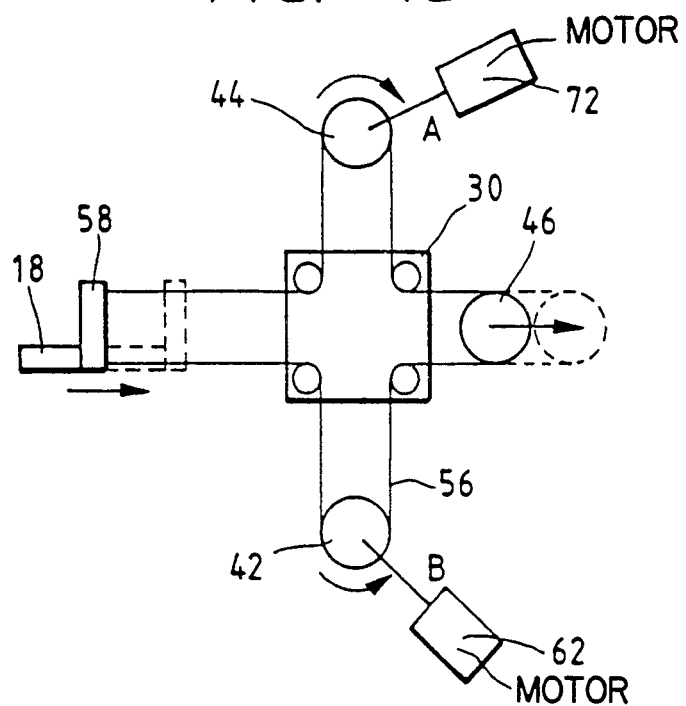
Figure 6B:
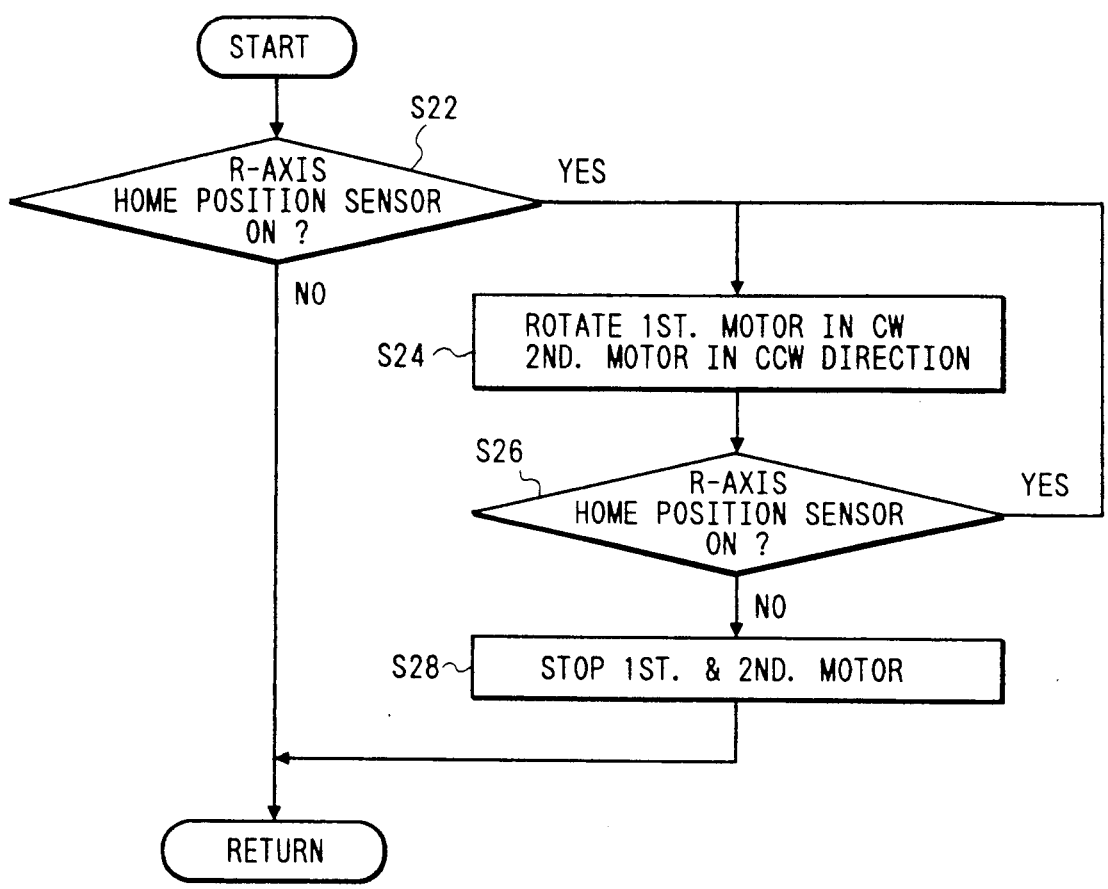
Figure 6C:
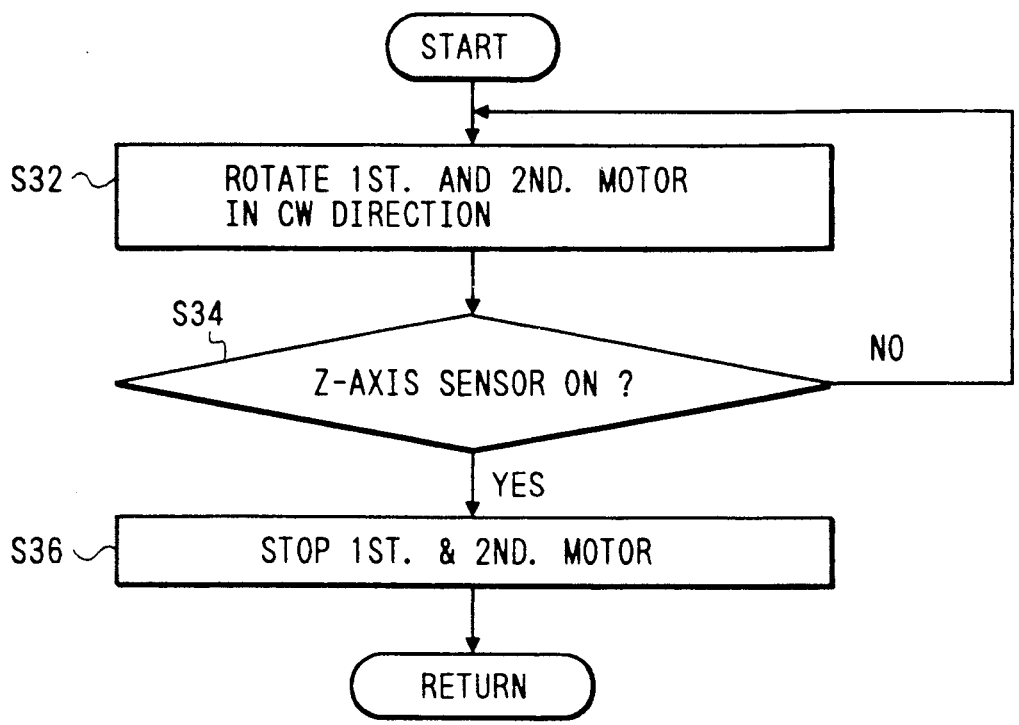
Figure 6D:
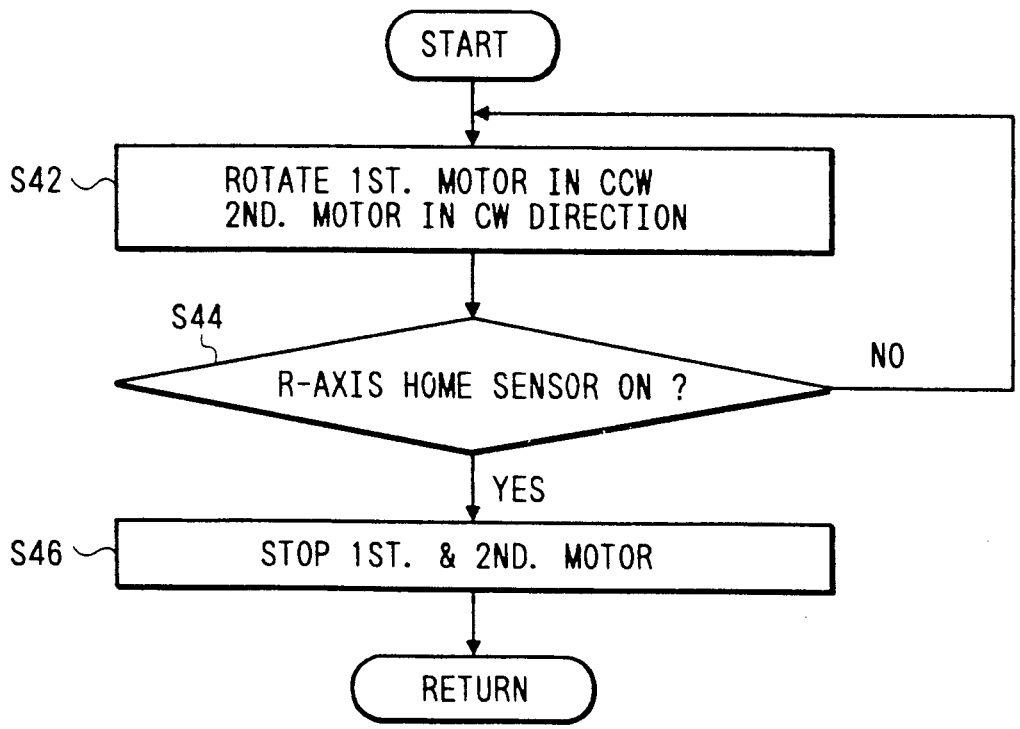
Figure 6E:
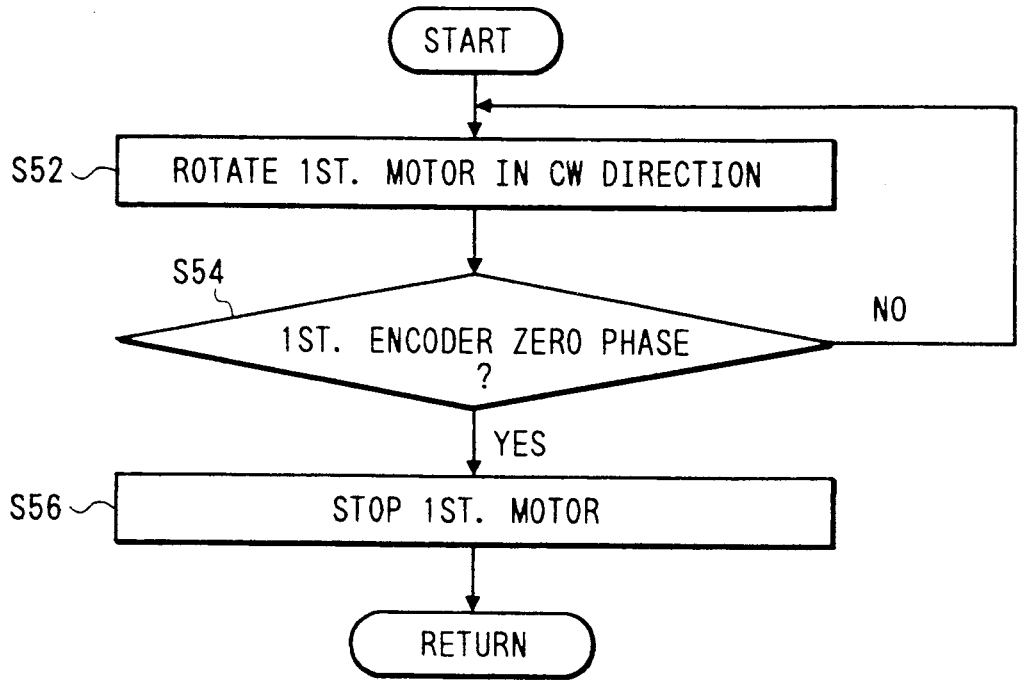
Figure 6F:
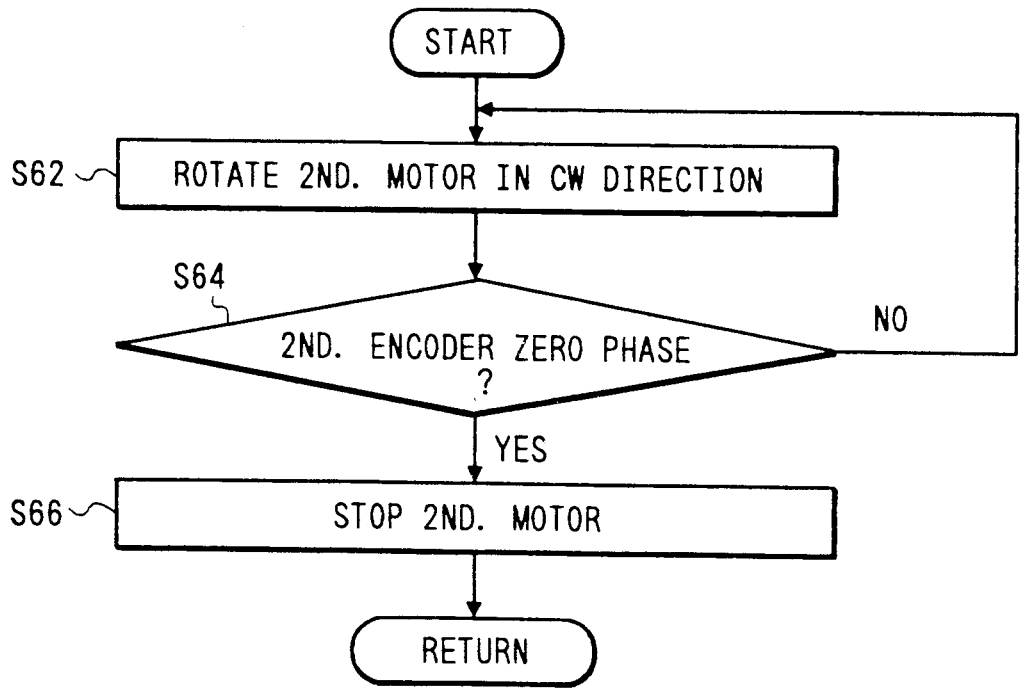

When the mounting plate 18 is to be retracted to the right along the R-axis, the control unit 82 synchronously rotates the first driving motor 62 counterclockwise and the second driving motor 72 clockwise. As a result, in a state opposite to the state wherein the mounting plate 18 projects to the left, the lengths of the portions of the timing belt 56 between the first and fourth intermediate rollers 48 and 54 and the left movable block 38 are similarly decreased, and the lengths of the portions between the driven roller 46 and the second and third intermediate rollers 50 and 52 are similarly increased. In this manner, as shown in FIG. 4D, the second guide shafts 34a and 34b are moved to the right relative to the slide block 30, i.e., the mounting plate 18 is retracted to the right along the R-axis.

When the mounting plate 18 is to be moved obliquely downward to the right, the control unit 82 rotates only the first driving motor 62 counterclockwise while the second driving motor 72 is kept OFF. As a result, the slide block 30 is moved downward, and the second guide shafts 34a and 34b are retracted to the right. In this manner, the mounting plate 18 is moved obliquely downward to the right at an inclination angle of 45 degrees.

When the mounting plate 18 is to be moved obliquely upward to the left, the control unit 82 rotates only the first driving motor 62 clockwise while the second driving motor 72 is kept OFF. As a result, the slide block 30 is moved upward, and the second guide shafts 34a and 34b project to the left. In this manner, the mounting plate 18 is moved obliquely upward to the left at an inclination angle of 45 degrees.

When the mounting plate 18 is to be moved obliquely downward to the left, the control unit 82 rotates only the second driving motor 72 counterclockwise while the first driving motor 62 is kept OFF. As a result, the slide block 30 is moved downward, and the second guide shafts 34a and 34b project to the left. In this manner, the mounting plate 18 is moved obliquely downward to the left at an inclination angle of 45 degrees.

When the mounting plate 18 is to be moved obliquely upward to the right, the control unit 82 rotates only the second driving motor 72 while the first driving motor 62 is kept OFF. As a result, the slide block 30 is moved upward, and the second guide shafts 34a and 34b are retracted to the right. In this manner, the mounting plate 18 is moved obliquely upward to the right at an inclination angle of 45 degrees.

When the mounting plate 18 is to be moved obliquely downward to the right at an arbitrary inclination angle (e.g., an angle smaller than 45 degrees with respect to the horizontal line), the control unit 82 rotates the second driving motor 72 clockwise, and rotates the first driving motor 62 counterclockwise. In this case, the driving amount of the second driving motor 72 is set to be smaller than that of the first driving motor 62. As a result, the slide block 30 is moved obliquely downward to the right at an inclination angle defined based on a ratio of the driving amounts of the first and second driving motors 62 and 72.

Similarly, when the mounting plate 18 is to be moved in a predetermined direction at an arbitrary inclination angle, the control unit 82 appropriately sets the rotation directions and rotation amounts of the first and second driving motors 62 and 72, thus achieving the above-mentioned movement operation.

The table below summarizes the driving control modes of the first and second driving motors 62 and 72 in the control unit 82, and movement operations of the mounting plate 18 based on the driving control.

TABLE

| Rotation Direction of First Driving Motor | Rotation Direction of Second Driving Motor | Moving Direction of Mounting Plate |
| --- | --- | --- |
| Counterclockwise | Counterclockwise | ↓ |
| Clockwise | Clockwise | ↑ |
| Clockwise | Counterclockwise | → |
| Counterclockwise | Clockwise | ← |
| Counterclockwise | OFF | |
| Clockwise | OFF | |
| OFF | Counterclockwise | |
| OFF | Clockwise | |

More specifically, in the moving apparatus 16 with the above arrangement of this embodiment, the first and second driving motors 62 and 72 are disposed in a common state with respect to the R- and Z-axes as compared to a conventional arrangement wherein driving motors for respectively moving an object in the R- and Z-axis directions are exclusively arranged for the R- and Z-axes. In this embodiment, the rotation directions and the rotation amounts of the two driving motors 62 and 72 are appropriately selected, so that the mounting plate 18 as an object to be moved can be moved to an arbitrary position via an arbitrary path, as shown in the Table above.

In particular, in this embodiment, the driving forces of the first and second driving motors 62 and 72 are transmitted through the timing belt in place of expensive ball screw shafts used in the prior art. As a result, cost of the apparatus as a whole can be reduced.

In this embodiment, the first and second driving motors 62 and 72 are mounted on the base 22 and the upper stationary block 26, and the weights of these first and second driving motors 62 and 72 will not serve as moving loads. Portions to be actually moved are only the slide block 30, the left movable block 58, the mounting plate 18 attached to the left movable block 58, and the finger device 20 attached to the left movable block 58. In this manner, the driving capacities of the first and second motors 62 and 72 can be small, and cost for these motors can be reduced.

Since the total weight of portions to be moved can be reduced, a response time of a driving operation can be shortened, and movement performance can be improved, resulting in a short operation time.

Origin Detection Control

An origin detection control operation in the control unit 82 in the moving apparatus 16 with the above arrangement will be described below with reference to the flow charts shown in FIG. 5 and FIGS. 6A to 6F.

The main routine of the origin detection control operation of this embodiment will be described below with reference to FIG. 5.

As shown in FIG. 5, when the origin detection control operation is started, the slide block 30 is moved (downward) until the Z-axis home position sensor 88 reaches a position where it temporarily escapes the corresponding Z-axis sensor dog 96 in step S10. In step S20, the second guide shafts 34a and 34b are pushed out from the slide block 30 until the R-axis home position sensor 86 reaches a position where it temporarily escape escapes the corresponding R-axis sensor dog, thereby moving the mounting plate 18 to the left in FIG. 1.

In this manner, after the Z- and R-axis home position sensors 88 and 86 are turned off, the slide block 30 is moved (upward) to a position where the Z-axis home position sensor 88 is turned on by the Z-axis sensor dog 96 in step S30. In step S40, the second guide shafts 34a and 34b are retracted to the slide block 30 to a position where the R-axis home position sensor 86 is turned by the R-axis sensor dog 94, thus moving the mounting plate 18 to the right in FIG. 1. In steps S30 and S40, home positions for the Z- and R-axes are defined, respectively.

Thereafter, in step S50, the first driving motor 62 is rotated clockwise until the zero phase of the first rotary encoder 90 connected to the first driving motor 62 is turned on. In step S60, the second driving motor 72 is rotated clockwise until the zero phase of the second rotary encoder 92 connected to the second driving motor 72 is turned on.

In this embodiment, in steps S50 and S60, positions where the slide block 30 and the second guide shafts 34a and 34b are stopped by stopping the driving operations of the first and second driving motors 62 and 72 are defined as origin positions on the Z- and R-axes, respectively.

More specifically, although home positions themselves associated with the Z- and R-axes can be accurately defined, a pivot position of a rotary encoder cannot be accurately grasped unless a zero phase serving as a measurement reference of a rotation angle in the rotary encoder is detected and is turned on. Therefore, it is impossible to detect a position as an absolute value. For this reason, in this embodiment, the driving motors 62 and 72 are rotated clockwise from the corresponding home positions, and a position where the zero phase is turned on first is defined as an origin position. Thus, this origin position is defined (detected) as an absolute value in the corresponding rotary encoder.

The steps in the above-mentioned main routine will be described in detail below with reference to FIGS. 6A to 6F.

Step S10 will be described below. When step S10 is started, it is checked in step S12 if the Z-axis home position sensor 88 is ON. If NO in step S12, the flow advances to step S20 as the next procedure described above. However, if YES in step S12, i.e., if it is determined that the Z-axis home position sensor 88 is ON, both the first and second driving motors 62 and 72 are rotated counterclockwise in step S14. Upon execution of step S14, the slide block 30 is moved immediately downward along the Z-axis.

Step S14 is repeated until it is determined in step S16 that the Z-axis home position sensor 88 is not ON. If it is detected that the Z-axis home position sensor 88 is not ON, i.e., is turned off, the counterclockwise rotation operations of the first and second driving motors 62 and 72 are stopped, and the control returns to the main routine. In this manner, in step S10, the slide block 30 is moved (downward) until the Z-axis home position sensor 88 reaches a position where it is temporarily escaped from the corresponding Z-axis sensor dog 96.

Step S20 will be described below. When step S20 is started, it is checked in step S22 if the R-axis home position sensor 86 is ON. If NO in step S22, the flow advances to step S30 as the next procedure described above. However, if YES in step S22, i.e., if it is determined that the Z-axis home position sensor 88 is ON, the first and second driving motors 62 and 72 are respectively driven in clockwise and counterclockwise directions in step S24. Upon execution of step S24, the second guide shafts 34a and 34b are moved (pushed out) from the slide block 30 to the left along the R-axis.

Step S24 is repetitively executed until it is determined in step S26 that the R-axis home position sensor is not ON. If it is detected that the R-axis home position sensor 86 is not ON, i.e., is turned off, the clockwise and counterclockwise rotation operations of the first and second driving motors 62 and 72 are stopped in step S28, and the control returns to the main routine. In this manner, in step S20, the second guide shafts 34a and 34b are moved from the slide block 30 to the left until the R-axis home position sensor 86 reaches a position where it temporarily escapes the corresponding R-axis sensor dog 94.

Step S30 will be described below. When step S30 is started, both the first and second driving motors 62 and 72 are rotated clockwise in step S32. The rotation operations of the motors are continued until the Z-axis home position sensor 88 is turned on in step S34. If it is determined in step S34 that the Z-axis home position sensor 88 is turned on, the rotation operations of the first and second driving motors 62 and 72 are stopped in step S36, and the control returns to the main routine.

Step S40 will be described below. When step S40 is started, the first and second driving motors 62 and 72 are rotated respectively in counterclockwise and clockwise directions. The rotation operations of the motors are continued until the R-axis home position sensor 86 is turned on in step S44. If it is determined in step S44 that the R-axis home position sensor 86 is turned on, the rotation operations of the first and second driving motors 62 and 72 are stopped in step S46, and the control returns to the main routine.

Step S50 will be described below. When step S50 is started, the first driving motor 62 is rotated clockwise in step S52. The rotation operation is continued until the zero phase in the first rotary encoder 90 is turned on in step S54. If it is detected in step S54 that the zero phase of the first rotary encoder 90 is turned on, the rotation operation of the first driving motor 62 is stopped, and the control returns to the main routine.

Finally, step S60 will be described. When step S60 is started, the second driving motor 72 is rotated clockwise in step S62. The rotation operation is continued until the zero phase of the second rotary encoder 92 is turned on in step S64. If it is detected in step S64 that the zero phase of the second rotary encoder 92 is turned on, the rotation operation of the second driving motor 72 is stopped in step S66, and the control returns to the main routine.

As described in detail above, in this embodiment, since the Z- and R-axis origin detection mechanisms 98 and 100 are arranged in addition to the moving apparatus 16 having a unique arrangement, precise origin detection can be executed by a low-cost system.

The present invention is not limited to the arrangement of the above embodiment, and various changes and modifications may be made within the spirit and scope of the invention.

For example, in the above embodiment, the mounting plate 18 as an object to be moved is moved in a vertical plane. However, the present invention is not limited to such an arrangement. For example, the mounting plate 18 may be moved in a horizontal plane. In this case, the first guide shafts 24a and 24b extend along the X-axis, and the second guide shafts 34a and 34b extend along the Y-axis.

When the mounting plate 18 is to be moved in the horizontal plane, the present invention is operated quite in the same manner as in the case wherein it is moved in the vertical plane as in the above embodiment. When the mounting plate 18 is to be moved in the horizontal plane, the slide block 30 will never be dropped by its weight when a power supply is stopped, and the above-mentioned brake mechanisms can be omitted.

In the above embodiment, in order to prevent the slide block 30 from moving downward, i.e., dropping occurring when a power supply to the first and second driving motors 62 and 72 is stopped, the first and second driving motors 62 and 72 incorporate the brake mechanisms for stopping rotation of the corresponding driving shafts. However, the present invention is not limited to the above arrangement. For example, the first and second driving rollers 42 and 44 connected to the driving shafts of the first and second driving motors 62 and 72 may comprise brake mechanisms, or a brake mechanism may be attached to a shaft portion for axially supporting the driven roller 46.

In the first embodiment described above, the R-axis origin detection mechanism 98 comprises the R-axis home position sensor 86 attached to the left movable block 38, and the R-axis sensor dog 94 attached to the slide block 30. The present invention is not limited to this. For example, the R-axis home position sensor 86 may be attached to the right movable block 36, or the mounting positions of the R-axis home position sensor 86 and the R-axis sensor dog 94 may be reversed to those described above.

In the above embodiment, the Z-axis origin detection mechanism 100 comprises the Z-axis home position sensor 88 attached to the upper stationary block 26, and the Z-axis sensor dog 96 attached to the slide block 30. However, the present invention is not limited to this. For example, the Z-axis home position sensor 88 may be attached to the base 22, and the mounting positions of the Z-axis home position sensor 88 and the Z-axis sensor dog 96 may be reversed to those described above.

In the above embodiment, two, i.e., the first and second driving motors 62 and 72 are arranged as driving sources. However, the present invention is not limited to this. For example, the present invention may be applied to an arrangement comprising one driving motor.

As described above, an orthogonal two-axis moving apparatus according to the present invention comprises a first guide member which extends in one direction and is attached to a stationary position, a slide block which is slidably supported by the first guide member, and is movable in one direction, a second guide member which extends in the other direction perpendicular to the one direction, and is supported by the slide block to be movable in the other direction, first and second rollers pivotally supported on two ends of the first guide member, a third roller pivotally supported on one end of the second guide member, intermediate rollers pivotally supported on four corner portions of the slide block, a coupling belt, two ends of which are fixed to the other end of the second guide member, and which is looped in a cross shape between the first to third rollers and the four intermediate rollers, a first origin detection means for detecting an origin position of the slide block along the one direction, and a second origin detection means for detecting an origin position of the second guide member along the other direction.

The orthogonal two-axis moving apparatus according to the present invention further comprises first and second stationary blocks, respectively attached to two ends of the first guide member, for pivotally supporting the first and second rollers, a first movable block, attached to one end of the second guide block, for rotatably supporting the third roller, and a second movable block which is attached to the other end of the second guide member, and to which the two ends of the coupling belt are fixed. The first origin detection means is arranged between the slide block and the first or second stationary block, and the second origin detection means is arranged between the slide block and the first or second movable block.

In the orthogonal two-axis moving apparatus according to the present invention, the first and second rollers are rotated by first and second driving motors respectively attached to the first and second stationary blocks. First and second rotary encoders for detecting rotation amounts of the corresponding motors are respectively attached to the first and second driving motors.

In the orthogonal two-axis moving apparatus according to the present invention, the first origin detection means comprises a first home position sensor attached to the first or second stationary block, and a first to-be-detected member, arranged on the slide block, for, when the slide block comes closer to the stationary block where the first home position sensor is arranged, turning on the first home position sensor.

In the orthogonal two-axis moving apparatus according to the present invention, the first origin detection means comprises a control means for controlling the first and second driving motors to move the slide block so that the first home position sensor temporarily escapes a position where it is not turned on by the first to-be-detected member, and then to move the slide block to a position where the first home position sensor is turned on by the first to-be-detected member, and thereafter, and for controlling the first and second driving motors so that the zero phases of the first and second rotary encoders are turned on.

In the orthogonal two-axis moving apparatus according to the present invention, the second origin detection means comprises a second home position sensor attached to the first or second movable block, and a second to-be-detected member, attached to the slide block, for, when the slide block comes closer to the movable block where the second home position sensor is attached, turning on the second home position sensor.

In the orthogonal two-axis moving apparatus according to the present invention, the second origin detection means comprises a control means for controlling the first and second driving motors to move the slide block so that the second home position sensor temporarily escapes a position where it is not turned on by the second to-be-detected member, and then to move the slide block to a position where the second home position sensor is turned on by the second to-be-detected member, and thereafter, and for controlling the first and second driving motors so that the zero phases of the first and second rotary encoders are turned on.

Therefore, according to the present invention, a low-cost orthogonal two-axis moving apparatus which has good movement performance and can reliably detect origins with inexpensive mechanisms can be provided.

Second Embodiment

A structure of the second embodiment of an orthogonal two-axis moving apparatus according to the present invention, which is applied to an assembly robot, will be described in detail below with reference to FIGS. 7 to 10D.

Figure 7:
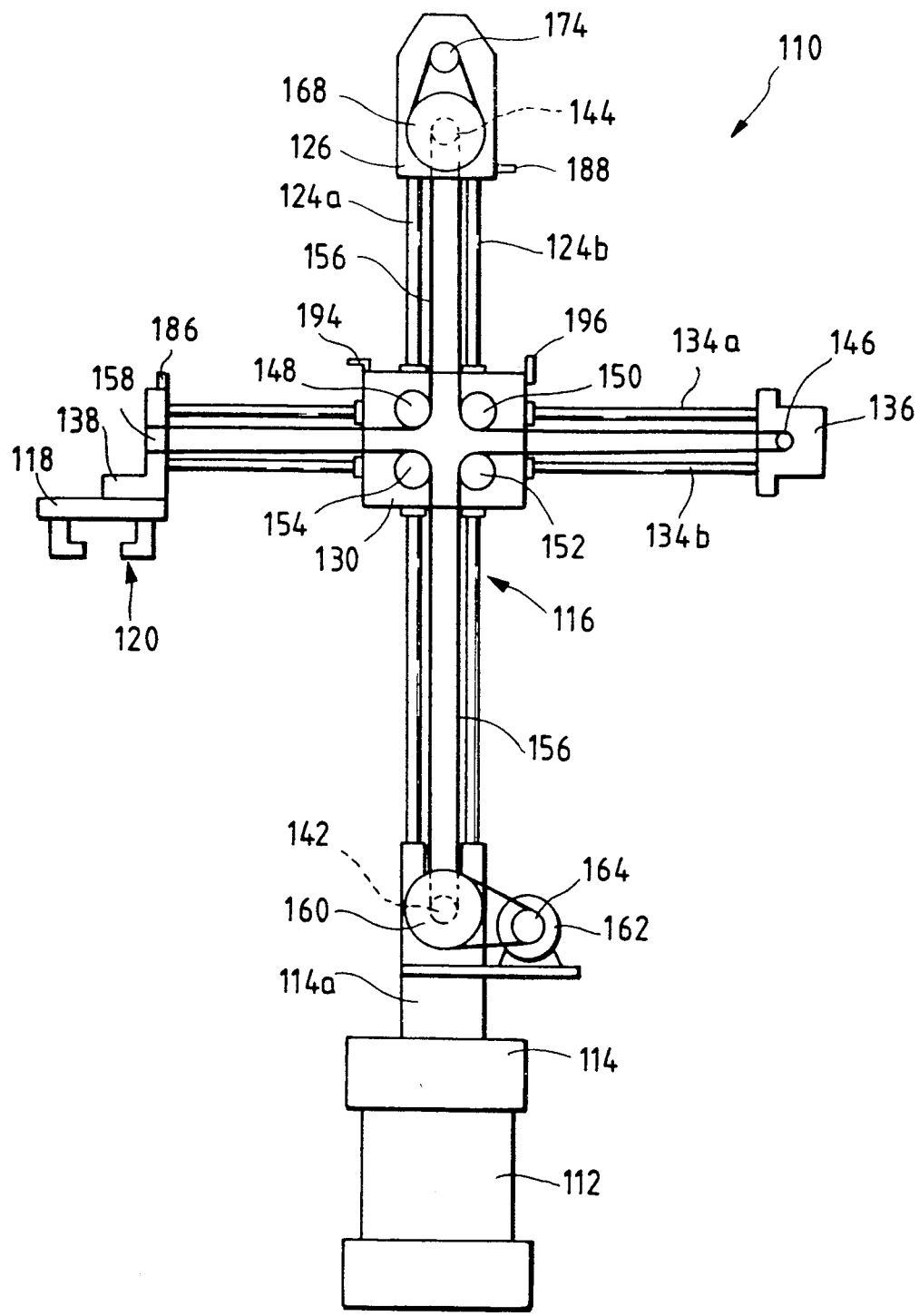
FIG. 7 is a schematic front view showing a structure of an assembly robot to which the second embodiment of an orthogonal two-axis moving apparatus according to the present invention is applied.

As shown in FIG. 7, an assembly robot 110 mainly comprises a main motor 112 mounted on a foundation (not shown), a reduction gear mechanism 114 connected to the upper portion of the main motor 112 and comprising a driving shaft 114a which projects upward and is rotated about a vertical axis, an orthogonal two-axis moving apparatus (to be simply referred to as a moving apparatus hereinafter) 116, as the characteristic feature of the present invention, which is rotated by the driving shaft 114a of the reduction gear mechanism 114 about the vertical axis, a finger mounting plate 118 attached to the left end in FIG. 7 of the moving apparatus 116, and a finger device 120 attached to the finger mounting plate 118.

Figure 8:
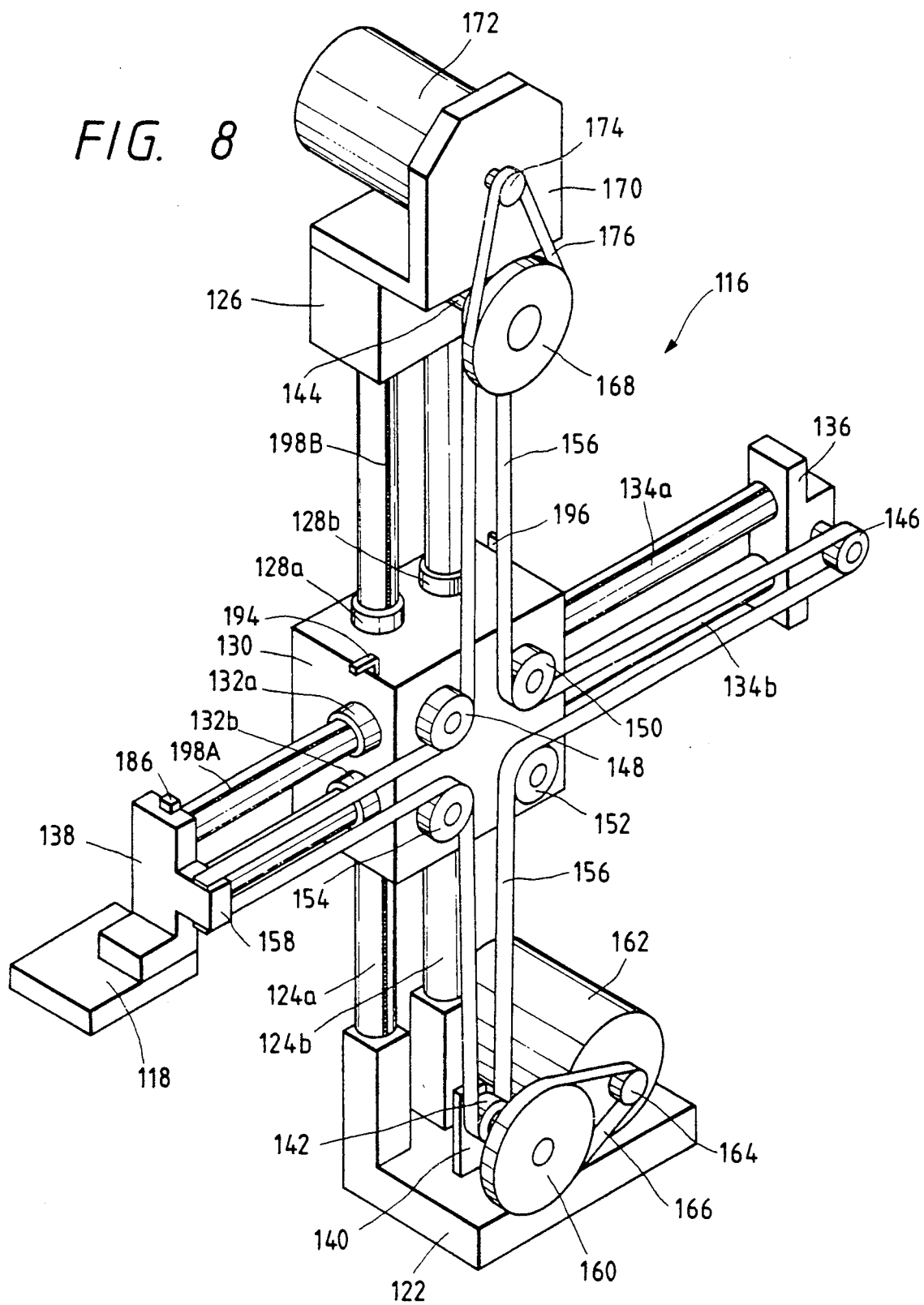
FIG. 8 is a perspective view of a structure of the orthogonal two-axis moving apparatus shown in FIG. 7.

The structure of the moving apparatus 116 will be described in detail below with reference to FIG. 8.

The moving apparatus 116 comprises a base 122 fixed to the upper end of the driving shaft 114a of the reduction gear mechanism 114 described above, two first guide shafts 124a and 124b which stand upright (i.e., extend in a Z-axis direction) on the base 122, and an upper stationary block 126 fixed to the upper ends of the first guide shafts 124a and 124b. A slide block 130 is slidably supported in the Z-axis direction while the first guide shafts 124a and 124b extend through the slide block 130 via first slide bushings 128a and 128b. In other words, the slide block 130 is vertically slidably supported by the pair of first guide shafts 124a and 124b.

A pair of second guide shafts 134a and 134b are supported by the slide block 130 to be slidable in a horizontal direction (R-axis direction) while extending through it via second slide bushings 132a and 132b. A right movable block 136 is attached to one-end portions, i.e., the right end portions (FIG. 8) of these second guide shafts 134a and 134b. A left movable block 138 is attached to the other-end portions, i.e., the left end portions (FIG. 8) of the shafts 134a and 134b. The above-mentioned finger mounting plate 118 is fixed to the lower surface of the left movable block 138.

With this arrangement, the finger mounting plate 118 can be moved to an arbitrary position within a vertical plane including two orthogonal axes, i.e., R and Z axes. In particular, as shown in FIG. 7, since the moving apparatus 116 is attached to the driving shaft 114a which is pivoted about the vertical axis, the finger mounting plate 118, and hence, the finger device 120 attached to the finger mounting plate 118 can be moved to an arbitrary position within a predetermined radius (i.e., an R-axis direction stroke) having the main motor 112 as the center.

A driving mechanism for moving the finger mounting plate 118 to an arbitrary position within the vertical plane in the above-mentioned structure will be described below.

In this driving mechanism, a first driving roller 142 is axially supported on the base 122 via a mounting stay 140 to be pivotal about an axis perpendicular to the vertical plane. A second driving roller 144 is axially supported by the upper stationary block 126 in a similar rotatable state. On the other hand, a driven roller 146 is axially supported by the right movable block 136 in a similar rotatable state.

The slide block 130 is formed into a substantially square shape when viewed from the front side. Four intermediate rollers 148, 150, 152, and 154 are rotatably and axially supported on the four corners of the front surface of the slide block 130 in the same state as the first and second driving rollers 142 and 144. The first intermediate roller 148 is located at the upper left corner in FIG. 8, the second intermediate roller 150 is located at the upper right corner in FIG. 8, the third intermediate roller 152 is located at the lower right corner in FIG. 8, and the fourth intermediate roller 154 is located at the lower left corner in FIG. 8.

The first and second driving rollers 142 and 144, and the driven roller 146 respectively comprise toothed rollers on outer peripheral surfaces of which teeth are formed. The first to fourth intermediate rollers 148 to 154 comprise so-called idle rollers, outer peripheral surfaces of which are formed to be smooth.

A coupling belt 156 is wound around these first and second driving rollers 142 and 144, the driven roller 146, and the first to fourth intermediate rollers 148 to 154 in a cross shape. The coupling belt 156 comprises a toothed timing belt. In the second embodiment, the coupling belt 156 is wound while the toothed surface faces inward.

More specifically, the coupling belt 156 is wound around the inside outer peripheral surface of the first intermediate roller 148 while one end of the coupling belt 156 is locked by the upper surface of a locking portion 158 integrally formed on the left movable block 138, and is then wound around the outside outer peripheral surface of the second driving roller 144, the outside outer peripheral surface of the driven roller 146, the inside outer peripheral surface of the third intermediate roller 152, the outside outer peripheral surface of the first driving roller 142, and the inside outer peripheral surface of the fourth intermediate roller 154 in turn. Then, the belt 156 is extended while the other end is locked by the lower surface of the locking portion 158 described above.

A large-diameter driven pulley 160 is coaxially fixed to the first driving roller 142. A first driving motor 162 having a reversibly rotatable driving shaft which is rotated about an axis of rotation parallel to that of the driven pulley 160 is mounted on the above-mentioned base 122. A driving pulley 164 is coaxially fixed to the driving shaft of the first driving motor 162. An endless belt 166 is looped between the driving and driven pulleys 164 and 160. With this structure, when the first driving motor 162 is started, the first driving roller 142 can be rotated in one of clockwise or counterclockwise directions.

A large-diameter driven pulley 168 is coaxially fixed to the second driving roller 144. A second driving motor 172 having a reversibly rotatable driving shaft which is rotated about an axis of rotation parallel to that of the driven pulley 168 is mounted on the upper stationary block 126 via a mounting stay 170. A driving pulley 174 is coaxially fixed to the driving shaft of the second driving motor 172. An endless belt 176 is looped between the driving and driven pulleys 174 and 168. With this structure, when the second driving motor 172 is started, the second driving roller 144 can be rotated in one of clockwise or counterclockwise directions.

The first and second driving motors 162 and 172 each incorporates a brake mechanism for braking the corresponding driving shaft when a power supply is stopped. The brake mechanism immediately cancels its brake operation in response to a motor servo operation. With this brake mechanism, when a power switch is turned off upon completion of a daily work, the slide block 130 can be reliably prevented from being dropped downward by its weight.

When the power supply is accidentally stopped during an operation due to, e.g., a power failure, if the brake mechanisms do not brake the corresponding driving shafts, an article gripped by the finger device 120 collides against, e.g., a floor and is damaged upon downward movement of the slide block 130, and the finger device 120 itself is also damaged. In the second embodiment, however, the brake mechanisms are operated when a power supply is stopped, and stop rotation of the driving shafts of the driving motors 162 and 172. Therefore, articles can be reliably prevented from damage.

Figure 9:
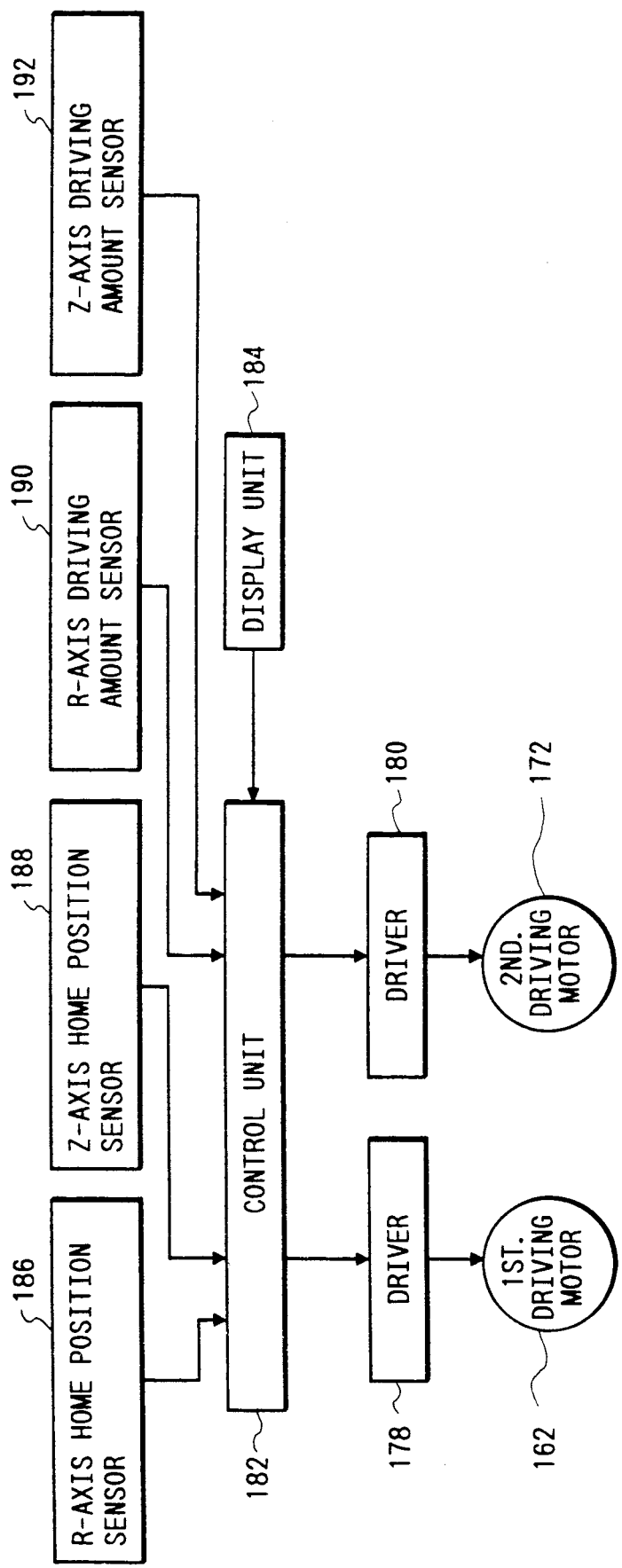
FIG. 9 is a block diagram showing an arrangement of a control system for the orthogonal two-axis moving apparatus.

As shown in FIG. 9, the first and second driving motors 162 and 172 are connected to a control unit 182 through corresponding drivers 178 and 180. The control unit 182 moves an article gripped by the finger device 120 from a start point to an end point on the basis of a prestored control program. The control unit 182 is connected to a teaching unit 184 for teaching the start and end points, and other necessary information.

The control unit 182 is connected to an R-axis home position sensor 186, a Z-axis home position sensor 188, an R-axis driving amount sensor 190, and a Z-axis driving amount sensor 192 so as to detect the present position of the central position of the mounting plate 118 as an object to be moved.

The R- and Z-axis home position sensors 186 and 188 are respectively attached to the right end portion of the upper surface of the left movable block 138 and the lower end portion of the right side surface of the upper stationary block 126, as shown in FIG. 7. An R-axis sensor dog 194 is mounted on the left end portion of the upper surface of the slide block 130. When the second guide shafts 134a and 134b are maximally displaced to the right in FIG. 7, in other words, when the mounting plate 118 is maximally retracted, the R-axis sensor dog 194 opposes the R-axis home position sensor 186 and turns it on. A Z-axis sensor dog 196 is mounted on the upper end portion of the right side surface of the slide block 130. When the slide block 130 is maximally displaced upward, the Z-axis sensor dog 196 opposes the Z-axis home position sensor 188, and turns it on.

Since the R- and Z-axis home position sensors 186 and 188 are mounted in this manner, in the second embodiment, the control unit 182 detects a position where the mounting plate 118 is retracted to the slide block 130 and is displaced at its uppermost position, as an origin as a reference position in a moving vertical plane.

Each of the R- and Z-axis driving amount sensors 190 and 192 comprises a photocoupler consisting of a set of a light-emitting element and a light-receiving element. These sensors are arranged at positions facing corresponding linear scales 198A and 198B in the slide block 130. The R-axis linear scale 198A is formed on the outer surface of the upper second guide shaft 134a to extend along the R-axis, as shown in FIG. 8. The Z-axis linear scale 138B is formed on the outer surface of the left first guide shaft 124a to extend along the Z-axis.

In this manner, the R-axis driving amount sensor 190 and the R-axis linear scale 198A constitute an R-axis linear encoder, and the Z-axis driving amount sensor 192 and the Z-axis linear scale 198B constitute a Z-axis linear encoder.

Since the R- and Z-axis linear encoders are constituted in this manner, the driving amounts of the mounting plate 118 along the R- and Z-axis directions can be measured as absolute values, respectively, and are very accurately detected. More specifically, the rotation amounts of the driving shafts of the first and second driving motors 162 and 172 as driving sources are detected through the rotary encoders, so that the driving amounts of the mounting plate 118 as an object to be moved in the R- and Z-axis directions can be obtained by calculations. In this case, however, calculation processing includes calculation errors, and the rotation amounts of the driving shafts cannot often be accurately converted to driving amounts due to, e.g., elongation of the timing belt 156. Thus, precision of the detected values is lower than that in a case utilizing the linear encoders of the second embodiment.

A control sequence of a moving operation in the control unit 182 in the moving apparatus 116 with the above-mentioned arrangement will be described below.

When the mounting plate 118 is to be moved downward along the Z-axis, the control unit 182 synchronously rotates the first and second driving motors 162 and 172 counterclockwise.

Upon counterclockwise rotation of the first driving motor 162, since the two ends of the timing belt 156 are fixed to the left movable block 138, the length of the timing belt 156 between the left movable block 138 and the fourth intermediate roller 154 is left unchanged, and the length of the timing belt 156 between the first driving roller 142 and the fourth intermediate roller 154 is decreased. On the other hand, upon counterclockwise rotation of the second driving motor 172, the length of the timing belt 156 between the left movable block 138 and the first intermediate roller 148 is left unchanged, and the length of the timing belt 156 between the second driving roller 144 and the first intermediate roller 148 is increased.

A portion of the timing belt 156 between the first driving roller 142 and the third intermediate roller 152 is fed toward a portion between the third intermediate roller 152 and the driven roller 146. A portion of the timing belt 156 between the third intermediate roller 152 and the driven roller 146 is fed toward a portion between the driven roller 146 and the second intermediate roller 150. A portion of the timing belt 156 between the driven roller 146 and the second intermediate roller 150 is fed toward a portion between the second driving roller 144 and the second intermediate roller 150. A portion of the timing belt 156 between the second driving roller 144 and the second intermediate roller 150 is fed toward a portion between the second driving roller 144 and the first intermediate roller 148.

The driving amounts of the first and second driving motors 162 and 172 are set to be equal to each other since these motors are synchronous with each other. Therefore, these feed amounts are equal to each other.

Figure 10A:
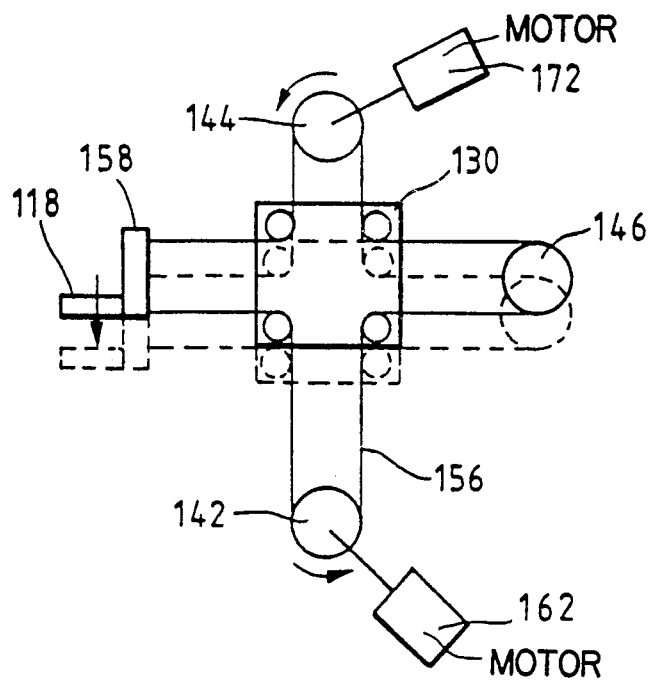
FIGS. 10A to 10D are schematic front views respectively showing four moving states of a mounting plate according to different driving states of first and second driving motors.

In this manner, the lengths of the portions between the first and fourth intermediate rollers 148 and 154 and the left movable block 138 and the lengths of the portions between the driven roller 146 and the second and third intermediate rollers 150 and 152 are left unchanged, the lengths of the portions of the timing belt 156 between the first driving roller 142 and the third and fourth intermediate rollers 152 and 154 are similarly decreased, and the lengths of the portions of the timing belt 156 between the second driven roller 144 and the first and second intermediate rollers 148 and 150 are similarly increased. As a result, as shown in FIG. 10A, the slide block 130 is moved vertically downward, i.e., the mounting plate 118 is moved downward along the Z-axis.

Figure 10B:
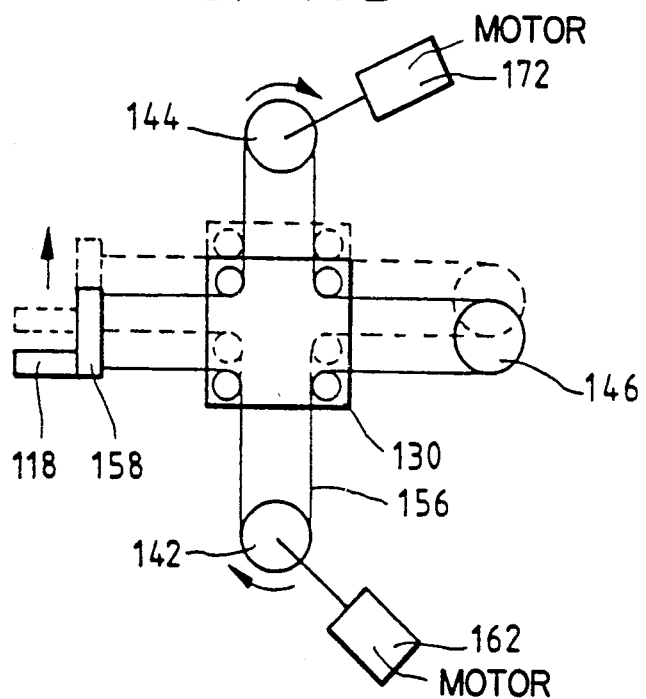

When the mounting plate 118 is to be moved upward along the Z-axis, the control unit 182 synchronously rotates the first and second driving motors 162 and 172 clockwise. As a result, in a state opposite to the state wherein the motors are rotated counterclockwise, lengths of the portions of the timing belt 156 between the first driving roller 142 and the third and fourth intermediate rollers 152 and 154 are similarly increased, and the lengths of the portions of the timing belt 156 between the second driving roller 144 and the first and second intermediate rollers 148 and 150 are similarly decreased. As a result, as shown in FIG. 10B, the slide block 130 is moved vertically upward, i.e., the mounting plate 118 is moved upward along the Z-axis.

When the mounting plate 118 is to project to the left along the R-axis, the control unit 182 synchronously rotates the first driving motor 162 clockwise and the second driving motor 172 counterclockwise.

Upon clockwise rotation of the first driving motor 162, a portion of the timing belt 156 between the driven roller 146 and the third intermediate roller 152 is fed toward a portion between the third intermediate roller 152 and the first driving roller 142. A portion of the timing belt 156 between the third intermediate roller 152 and the first driving roller 142 is fed toward a portion between the first driving roller 142 and the fourth intermediate roller 154. A portion of the timing belt 156 between the first driving roller 142 and the fourth intermediate roller 154 is fed to a portion between the fourth intermediate roller 154 and the left movable block 138. In this manner, the length of the portion of the timing belt 156 between the fourth intermediate roller 154 and the left movable block 138 is increased.

However, upon counterclockwise rotation of the second driving motor 172, a portion of the timing belt 156 between the driven roller 146 and the second intermediate roller 150 is fed toward a portion between the second intermediate roller 150 and the second driving roller 144. A portion of the timing belt 156 between the second intermediate roller and the second driving roller 144 is fed toward a portion between the second driving roller 144 and the first intermediate roller 148. A portion of the timing belt 156 between the second driving roller 144 and the first intermediate roller 148 is fed toward a portion between the first intermediate roller 148 and the left movable block 138. In this manner, the length of the portion of the timing belt 156 between the first intermediate roller 148 and the left movable block 138 is increased.

The driving amounts of the first and second driving motors 162 and 172 are set to be equal to each other since these motors are synchronous with each other. Therefore, these feed amounts are equal to each other.

Figure 10C:
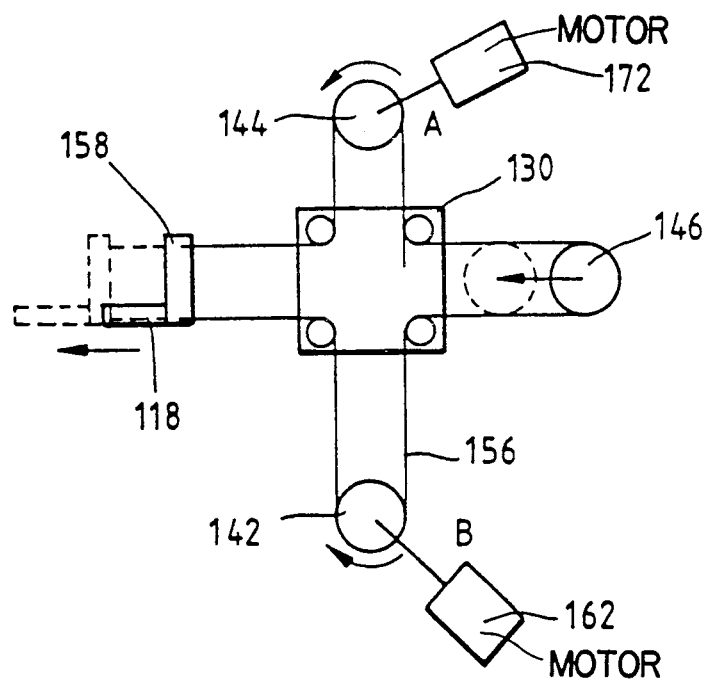

In this manner, the lengths of the portions of the timing belt 156 between the first driving roller 142 and the third and fourth intermediate rollers 152 and 154 and the lengths of the portions of the timing belt 156 between the second driving roller 144 and the first and second intermediate rollers 148 and 150 are similarly left unchanged, the lengths of the portions of the timing belt 156 between the first and fourth intermediate rollers 148 and 154 and the left movable block 138 are similarly increased, and the lengths of the portions of the timing belt 156 between the driven roller 146 and the second and third intermediate rollers 150 and 152 are similarly decreased. As a result, as shown in FIG. 10C, the second guide shafts 134a and 134b are moved to the left relative to the slide block 130, i.e., the mounting plate 118 projects to the left along the R-axis.

Figure 10D:
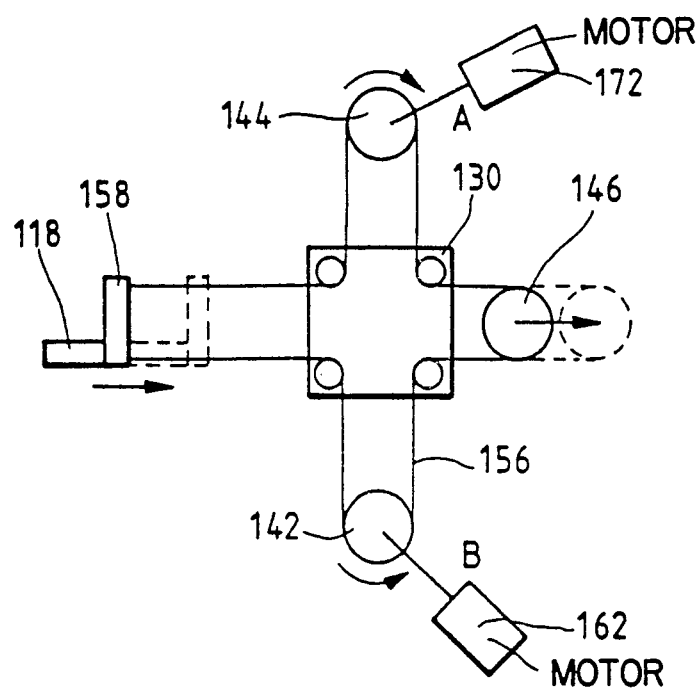

When the mounting plate 118 is to be retracted to the right along the R-axis, the control unit 182 synchronously rotates the first driving motor 162 counterclockwise and the second driving motor 172 clockwise. As a result, in a state opposite to the state wherein the mounting plate 118 projects to the left, the lengths of the portions of the timing belt 156 between the first and fourth intermediate rollers 148 and 154 and the left movable block 138 are similarly decreased, and the lengths of the portions between the driven roller 146 and the second and third intermediate rollers 150 and 152 are similarly increased. In this manner, as shown in FIG. 10D, the second guide shafts 134a and 134b are moved to the right relative to the slide block 130, i.e., the mounting plate 118 is retracted to the right along the R-axis.

When the mounting plate 118 is to be moved obliquely downward to the right, the control unit 182 rotates only the first driving motor 162 counterclockwise while the second driving motor 172 is kept OFF. As a result, the slide block 130 is moved downward, and the second guide shafts 134a and 134b are retracted to the right. In this manner, the mounting plate 118 is moved obliquely downward to the right at an inclination angle of 45 degrees.

When the mounting plate 118 is to be moved obliquely upward to the left, the control unit 182 rotates only the first driving motor 162 clockwise while the second driving motor 172 is kept OFF. As a result, the slide block 130 is moved upward, and the second guide shafts 134a and 134b project to the left. In this manner, the mounting plate 118 is moved obliquely upward to the left at an inclination angle of 45 degrees.

When the mounting plate 118 is to be moved obliquely downward to the left, the control unit 182 rotates only the second driving motor 172 counterclockwise while the first driving motor 162 is kept OFF. As a result, the slide block 130 is moved downward, and the second guide shafts 134a and 134b project to the left. In this manner, the mounting plate 118 is moved obliquely downward to the left at an inclination angle of 45 degrees.

When the mounting plate 118 is to be moved obliquely upward to the right, the control unit 182 rotates only the second driving motor 172 while the first driving motor 162 is kept OFF. As a result, the slide block 130 is moved upward, and the second guide shafts 134a and 134b are retracted to the right. In this manner, the mounting plate 118 is moved obliquely upward to the right at an inclination angle of 45 degrees.

When the mounting plate 118 is to be moved obliquely downward to the right at an arbitrary inclination angle (e.g., an angle smaller than 45 degrees with respect to the horizontal line), the control unit 182 rotates the second driving motor 172 clockwise, and rotates the first driving motor 162 counterclockwise. In this case, the driving amount of the second driving motor 172 is set to be smaller than that of the first driving motor 162. As a result, the slide block 130 is moved obliquely downward to the right at an inclination angle defined based on a ratio of the driving amounts of the first and second driving motors 162 and 172.

Similarly, when the mounting plate 118 is to be moved in a predetermined direction at an arbitrary inclination angle, the control unit 182 appropriately sets the rotation directions and rotation amounts of the first and second driving motors 162 and 172, thus achieving the above-mentioned movement operation.

The table below summarizes the driving control modes of the first and second driving motors 162 and 172 in the control unit 182, and movement operations of the mounting plate 118 based on the driving control.

TABLE

| Rotation Direction of First Driving Motor | Rotation Direction of Second Driving Motor | Moving Direction of Mounting Plate |
|---|---|---|
| Counterclockwise | Counterclockwise | ↓ |
| Clockwise | Clockwise | ↑ |
| Clockwise | Counterclockwise | ← |
| Counterclockwise | Clockwise | → |
| Counterclockwise | OFF | ↘ |
| Clockwise | OFF | ↖ |
| OFF | Counterclockwise | ↙ |
| OFF | Clockwise | ↗ |

More specifically, in the moving apparatus 116 with the above arrangement of the second embodiment, the first and second driving motors 162 and 172 are disposed in a common state with respect to the R- and Z-axes as compared to a conventional arrangement wherein driving motors for respectively moving an object in the R- and Z-axis directions are exclusively arranged for the R- and Z-axes. In the second embodiment, the rotation directions and the rotation amounts of the two driving motors 162 and 172 are appropriately selected, so that the mounting plate 118 as an object to be moved can be moved to an arbitrary position via an arbitrary path, as shown in the Table above.

In particular, in the second embodiment, the driving forces of the first and second driving motors 162 and 172 are transmitted through the timing belt in place of expensive ball screw shafts unlike in the prior art. As a result, the cost of the apparatus as a whole can be reduced.

In the second embodiment, the first and second driving motors 162 and 172 are mounted on the base 122 and the upper stationary block 126, and the weights of these first and second driving motors 162 and 172 will not serve as moving loads. Portions to be actually moved are only the slide block 130, the left movable block 158, the mounting plate 118 attached to the left movable block 158, and the finger device 120 attached to the left movable block 158. In this manner, the driving capacities of the first and second motors 162 and 172 can be small. When the mounting plate 118 is to be moved in the R- and Z-axis directions, it is driven in cooperation of the two motors. Thus, as compared to a conventional arrangement wherein an object to be moved is moved by one motor in one direction, a driving capacity per motor can be reduced. In this manner, according to the second embodiment, cost of the motors and their control unit can be decreased.

Since the total weight of portions to be moved can be reduced, a response time of a driving operation can be shortened, and movement performance can be improved, resulting in a short operation time.

The present invention is not limited to the arrangement of the second embodiment, and various changes and modifications may be made within the spirit and scope of the invention.

For example, in the second embodiment, the mounting plate 118 as an object to be moved is moved in a vertical plane. However, the present invention is not limited to such an arrangement. For example, the mounting plate 118 may be moved in a horizontal plane. In this case, the first guide shafts 124a and 124b extend along the X-axis, and the second guide shafts 134a and 134b extend along the Y-axis.

When the mounting plate 118 is to be moved in the horizontal plane, the present invention is operated quite in the same manner as in the case wherein it is moved in the vertical plane like in the second embodiment. When the mounting plate 118 is moved in the horizontal plane, the slide block 130 will never be dropped by its weight when a power supply is stopped, and the above-mentioned brake mechanisms can be omitted.

In the second embodiment, in order to prevent the slide block 130 from moving downward, i.e., dropping occurring when a power supply to the first and second driving motors 162 and 172 is stopped, the first and second driving motors 162 and 172 incorporate the brake mechanisms for stopping rotation of the corresponding driving shafts. However, the present invention is not limited to the above arrangement. For example, the first and second driving rollers 142 and 144 connected to the driving shafts of the first and second driving motors 162 and 172 may comprise brake mechanisms, or a brake mechanism may be attached to a shaft portion 146a for axially supporting the driven roller 146, as shown in FIG. 11 as a modification.

Figure 11:
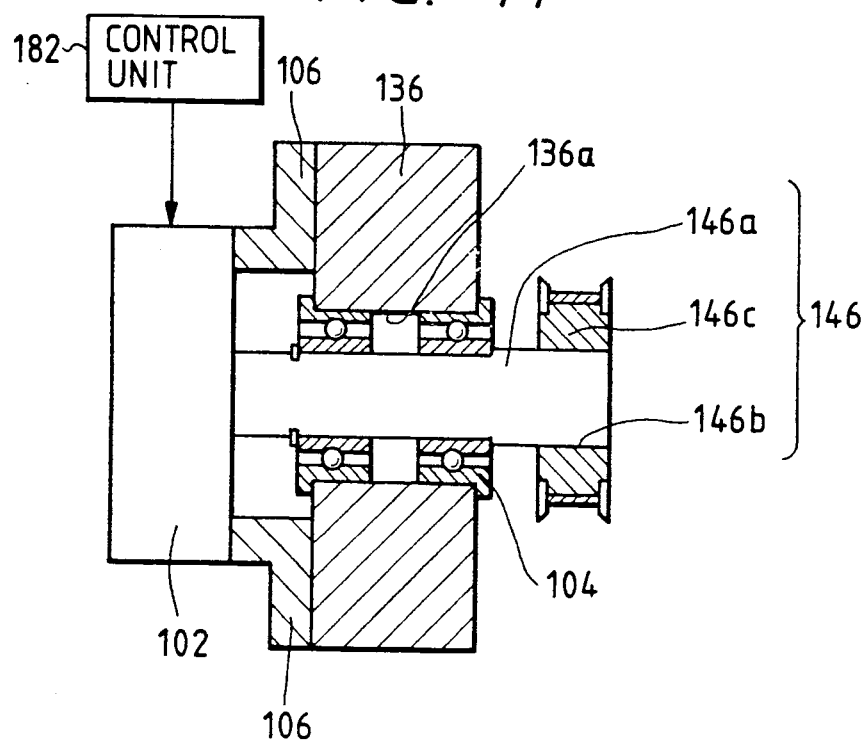
FIG. 11 is a sectional view showing a modification of a brake mechanism in the second embodiment of a moving apparatus according to the present invention.

More specifically, in the modification shown in FIG. 11, the driven roller 146 is constituted by the shaft portion 146a, and a roller body 146c which is coaxially fixed to the distal end of the shaft portion 146a to be integrally rotated through a key 146b. The shaft portion 146a is rotatably supported through a bearing 104 to extend through a through hole 136a formed in the right movable block 136. The shaft portion 146a projects further outwardly from the lower surface of the right movable block 136, and its projecting end enters a brake mechanism 102 attached to the lower surface of the right movable block 136 via a stay 106.

The brake mechanism 102 is connected to the above-mentioned control unit 182. When a power switch is turned on and a motor servo operation is started, the control unit 182 outputs an OFF signal for disabling a brake operation to the brake mechanism 102. When power supply is stopped, the control unit 182 supplies an ON signal for enabling a brake operation to the brake mechanism 102.

With this modification, as compared to a case wherein the brake mechanisms are arranged on the driving shafts of the first and second driving rollers 142 and 144, the number of brake mechanisms can be one, and cost can be reduced. As compared to a case wherein the first and second driving motors 162 and 172 incorporating the brake mechanisms are used, since such driving motors incorporating brake mechanisms are expensive, the brake mechanism 102 can be attached to the driven roller 146 to reduce manufacturing cost.

In the above embodiment, two, i.e., the first and second driving motors 162 and 172 are arranged as driving sources. However, the present invention is not limited to this. For example, the present invention may be applied to an arrangement comprising one driving motor.

Figure 12:
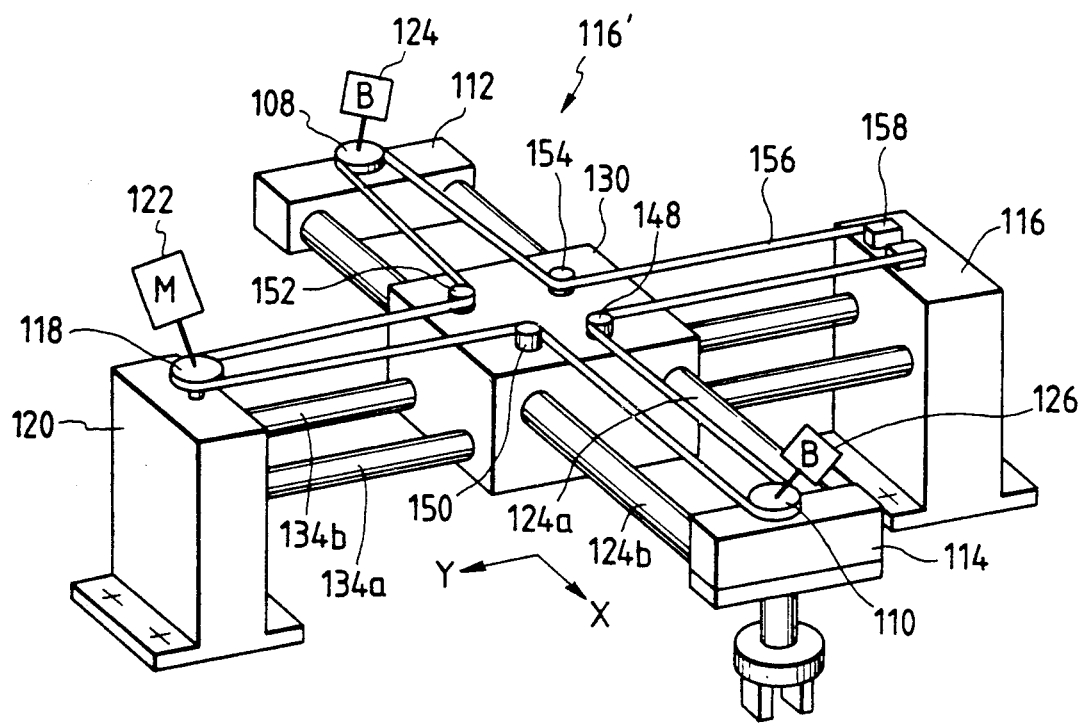
FIG. 12 is a perspective view showing a structure of the second example of the second embodiment of an orthogonal two-axis moving apparatus according to the present invention.

A structure of the second example of the second embodiment, which comprises only one driving motor as a driving source will be described below with reference to FIGS. 12 to 13C. The same reference numerals in this example denote the same parts as in the first example, and a detailed description thereof will be omitted.

In a moving apparatus 116, of the second example, the mounting plate 118 is moved in a horizontal plane unlike in the moving apparatus 116 of the first example. That is, the first guide shafts 124a and 124b extend along the X-axis, and the second guide shafts 134a and 134b extend along the Y-axis.

Rollers which serve as the first and second driving rollers 142 and 144 in the first example serve as first and second driven rollers 108 and 110 in the second example. The base 122 which rotatably supports the first driving roller 142 serves as a first movable block 112 for rotatably supporting a first driven roller 108, and the upper stationary block 126 which rotatably supports the second driving roller 144 serves as a second movable block 114 for rotatably supporting a second driven roller 110. In the second example, the mounting plate 118 for mounting the finger device 120 is attached to the second movable block 114.

The left movable block 138 comprising the locking portion 158 to which the two ends of the timing belt 156 are fixed in the first example is fixed on a foundation (not shown) as a first stationary block 116. The driven roller 146 in the first example serves as only one driving roller 118. The right movable block 136 which pivotally supports the driven roller 146 in the first example is fixed on the above-mentioned foundation as a second stationary block 120 in the second example.

In the second example, a driving motor 122 for rotating the driving roller 118 is mounted on the second stationary block 120.

In the second example, since a moving range is restricted in the horizontal panel, the slide block 130 will never be dropped by its weight when power supply to the driving motor 122 is stopped. Therefore, a brake mechanism having the same function as in the first example is unnecessary. However, in the second example, first and second brake mechanisms 124 and 126 must be arranged on the rotation shafts of the first and second driven rollers 108 and 110 as means for selectively switching the moving direction of the mounting plate 118.

These brake mechanisms 124 and 126 have the same arrangement as the brake mechanism 102 described in the modification. L- In the moving apparatus 116' in the second example with the above structure, a moving control operation in the control unit 182 will be described below with reference to FIGS. 13A to 13C.

Figure 13A:
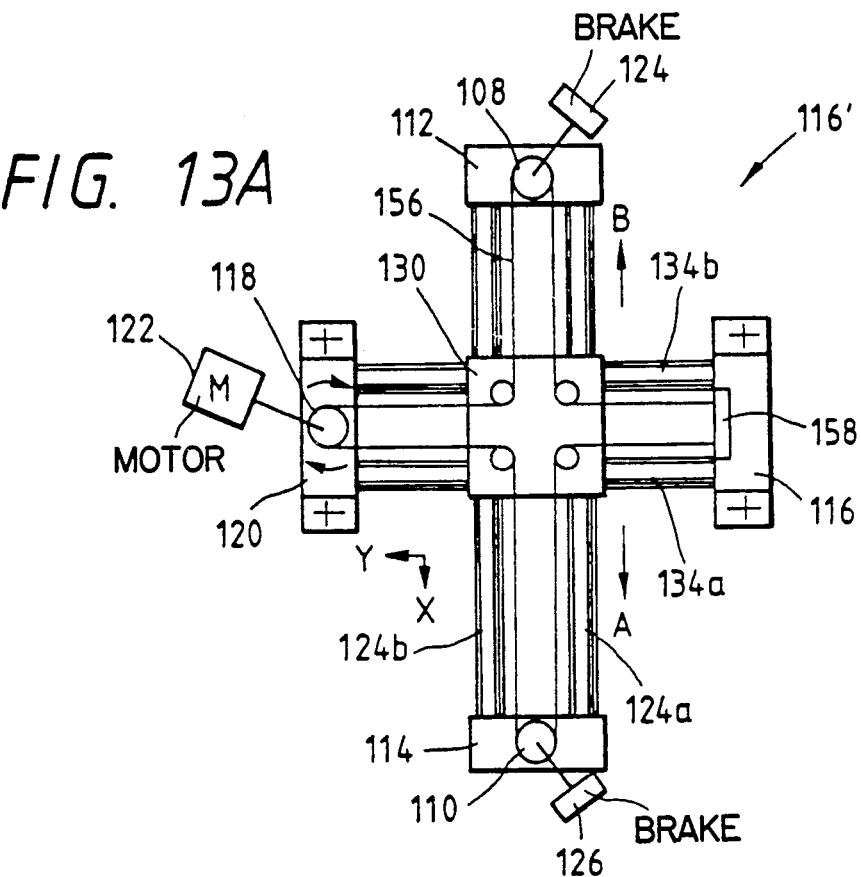

When the mounting plate 118 is to be moved to project from the slide block 130 along the X-axis, as indicated by an arrow A, the control unit 182 sets the first and second brake mechanisms 124 and 126 in a free state, i.e., in a brake disabled state, and rotates the driving motor 122 counterclockwise, as shown in FIG. 13A. When the mounting plate 118 is to be moved to be retracted to the slide block 130 along the X-axis, as indicated by an arrow B, the control unit 182 rotates the driving motor 122 counterclockwise in the similar brake disabled state.

In this manner, when the first and second brake mechanisms 124 and 126 are set in the free state, i.e., in the brake disabled state, the rotation direction of the driving motor 122 is selected, so that the mounting plate 118 can be vertically moved in a direction of the arrow A or B, as shown in FIG. 13A.

Figure 13B:
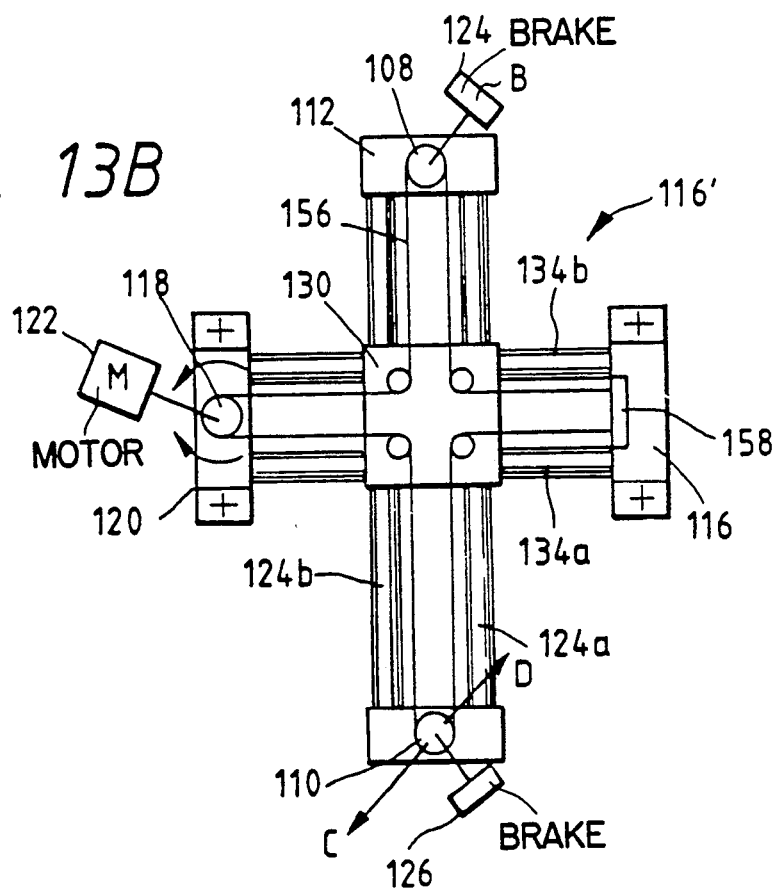

When the mounting plate 118 is to be moved obliquely downward to the left, as indicated by an arrow C, the control unit 182 sets the first brake mechanism 124 in a brake enabled state, sets the second brake mechanism 126 in a free state, and rotates the driving motor 122 counterclockwise, as shown in FIG. 13B. When the mounting plate 118 is to be moved obliquely upward to the right, as indicated by an arrow D, the control unit 182 rotates the driving motor 122 clockwise in the same brake setup states described above.

In this manner, when the first brake mechanism 124 is set in the brake enabled state and the second brake mechanism 126 is set in the free state, the rotation direction of the driving motor 122 is selected, so that the mounting plate 118 can be moved obliquely at an angle of 45 degrees in a direction of the arrow C or D, as shown in FIG. 13B.

When the mounting plate 118 is to be moved obliquely downward to the right, as indicated by an arrow E, the control unit 182 sets the first brake mechanism 124 in a free state, sets the second brake mechanism 126 in the brake enabled state, and rotates the driving motor 126 counterclockwise, as shown in FIG. 13C. When the mounting plate is to be moved obliquely upward to the left, as indicated by an arrow F, the control unit 182 rotates the driving motor 122 clockwise in the same brake setup states as above.

In this manner, when the first brake mechanism 124 is set in the free state and the second brake mechanism 126 is set in the brake enabled state, the rotation direction of the driving motor 122 is selected, so that the mounting plate 118 can be obliquely moved at an angle of 45 degrees in a direction of the arrow E or F, as shown in FIG. 13C.

As described above, in the second example, although a moving direction is slightly regulated, that is, although it is impossible to move the mounting plate 118 in only the extending direction of the second guide shafts 134a and 134b and the inclination angle of an oblique movement is limited to 45 degrees, only one driving motor can be used as designated by reference numeral 122 when the mounting plate 118 need only have such moving modes, and cost can be satisfactorily reduced.

As described above, an orthogonal two-axis moving apparatus according to the present invention comprises a first guide member which extends in one direction and is attached to a stationary position, a slide block which is slidably supported by the first guide member, and is movable in one direction, a second guide member which extends in the other direction perpendicular to the one direction, and is supported by the slide block to be movable in the other direction, first and second rollers pivotally supported on two ends of the first guide member, a third roller pivotally supported on one end of the second guide member, intermediate rollers pivotally supported on four corner portions of the slide block, and a coupling belt, two ends of which are fixed to the other end of the second guide member, and which is looped in a cross shape between the first to third rollers and the four intermediate rollers.

In the orthogonal two-axis moving apparatus according to the present invention, first and second driving motors are respectively attached to the two ends of the first guide member, and the first and second rollers are driven by the first and second driving motors, respectively.

In the orthogonal two-axis moving apparatus according to the present invention, the first and second driving motors respectively comprise brake mechanisms for locking rotation of the corresponding driving shafts when power supply is stopped.

In the orthogonal two-axis moving apparatus according to the present invention, a brake mechanism which is operated to lock rotation of the third roller when power supply to the first and second driving motors is stopped is attached to the third roller.

In the orthogonal two-axis moving apparatus according to the present invention, the first to third rollers comprise toothed pulleys, the coupling belt comprises a timing belt on an inner surface of which teeth are formed, and the four intermediate rollers comprise idle rollers for guiding a flat outer surface of the timing belt An orthogonal two-axis moving apparatus according to the present invention comprises a first guide member which extends in one direction and is attached to a stationary position, a slide block which is slidably supported by the first guide member, and is movable in one direction, a second guide member which extends in the other direction perpendicular to the one direction, and is supported by the slide block to be movable in the other direction, a first roller pivotally supported on one end of the first guide member, second and third rollers pivotally supported on the two ends of the second guide members, respectively, intermediate rollers pivotally supported on the four corner portions of the slide block, and a coupling belt, two ends of which are fixed to the other end of the first guide member, and which is looped in a cross shape between the first to third rollers and the four intermediate rollers.

In the orthogonal two-axis moving apparatus according to the present invention, a driving motor is attached to one end of the first guide member. The first roller is driven by the driving motor. Brake mechanisms which are selectively operated are attached to the second and third rollers.

According to the present invention, therefore, a low-cost orthogonal two-axis moving apparatus having good movement performance can be provided.

Third Embodiment

A structure of the first example of the third embodiment of an orthogonal two-axis moving apparatus according to the present invention, which is applied to an assembly robot, will be described in detail below with reference to FIGS. 14 to 19.

Figure 14:
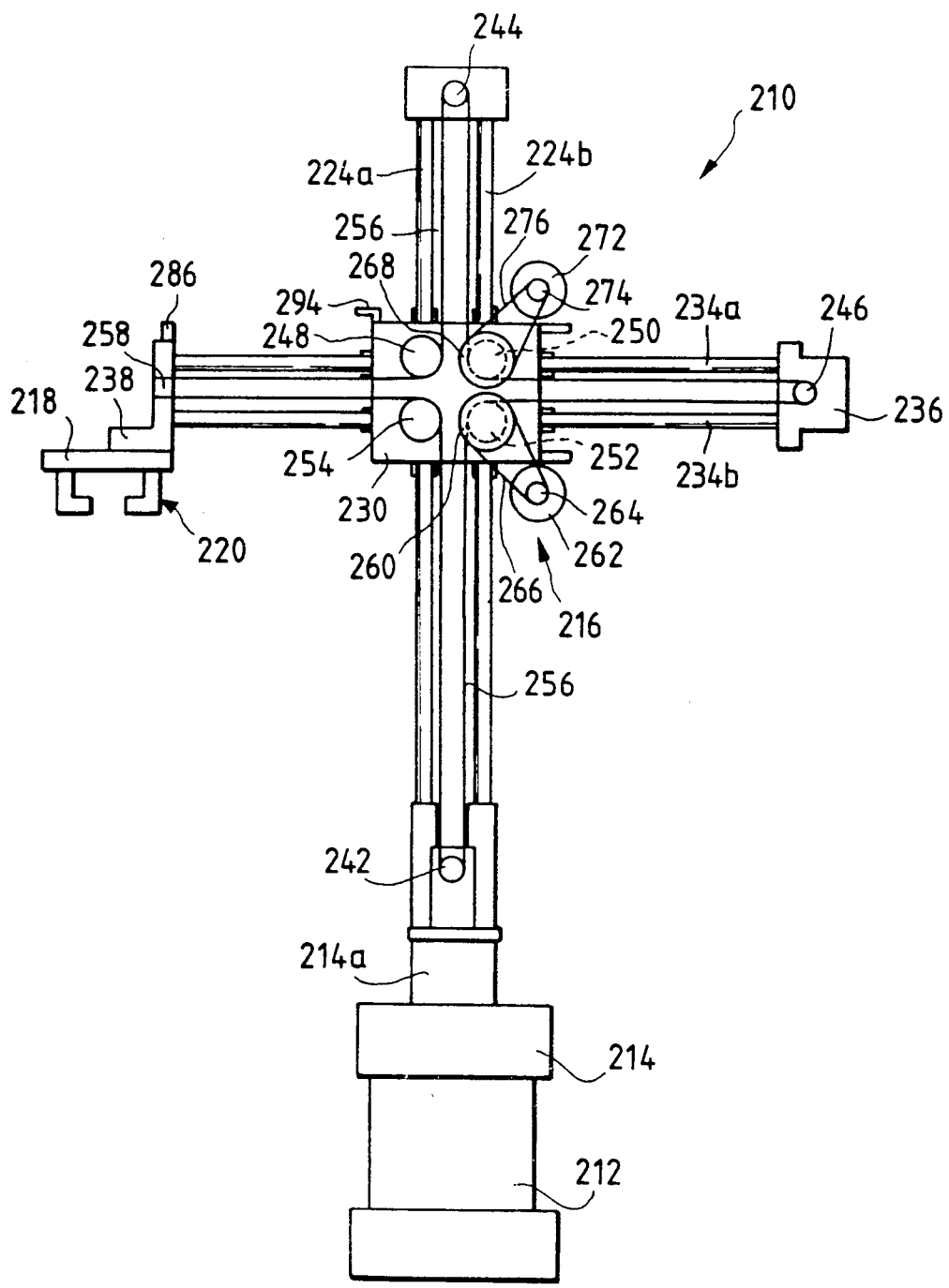
FIG. 14 is a schematic front view showing a structure of an assembly robot to which the third embodiment of an orthogonal two-axis moving apparatus according to the present invention is applied.

As shown in FIG. 14, an assembly robot 210 mainly comprises a main motor 212 mounted on a foundation (not shown), a reduction gear mechanism 214 connected to the upper portion of the main motor 212 and comprising a driving shaft 214a which projects upward and is rotated about a vertical axis, an orthogonal two-axis moving apparatus (to be simply referred to as a moving apparatus hereinafter) 216, as the characteristic feature of the present invention, which is rotated by the driving shaft 214a of the reduction gear mechanism 214 about the vertical axis, a finger mounting plate 218 attached to the left end in FIG. 14 of the moving apparatus 216, and a finger device 220 attached to the finger mounting plate 218.

The structure of the moving apparatus 216 will be described in detail below with reference to FIG. 15.

The moving apparatus 216 is constituted to be able to move the mounting plate 218 within the vertical plane. More specifically, the apparatus 216 comprises a base 222 as a lower stationary block fixed to the upper end of the driving shaft 214a of the reduction gear mechanism 214 described above, two first guide shafts 224a and 224b which stand upright (i.e., extend in a Z-axis direction) on the base 222, and an upper stationary block 226 fixed to the upper ends of the first guide shafts 224a and 224b. A slide block 230 is slidably supported in the Z-axis direction while the first guide shafts 224a and 224b extend through the slide block 230 via first slide bushings 228a and 228b. In other words, the slide block 230 is vertically slidably supported by the pair of first guide shafts 224a and 224b.

A pair of second guide shafts 234a and 234b are supported by the slide block 230 to be slidable in a horizontal direction (R-axis direction) while extending through it via second slide bushings 232a and 232b. A right movable block 236 is attached to one-end portions, i.e., the right end portions (FIG. 15) of these second guide shafts 234a and 234b. A left movable block 238 is attached to the other-end portions, i.e., the left end portions (FIG. 15) of the shafts 234a and 234b. The above-mentioned finger mounting plate 218 is fixed to the lower surface of the left movable block 238.

With this arrangement, the finger mounting plate 218 can be moved to an arbitrary position within a vertical plane including two orthogonal axes, i.e., R and Z axes. In particular, as shown in FIG. 14, since the moving apparatus 216 is attached to the driving shaft 214a which is pivoted about the vertical axis, the finger mounting plate 218 and hence, the finger device 220 attached to the finger mounting plate 218 can be moved to an arbitrary position within a predetermined radius (i.e., an R-axis direction stroke) having the main motor 212 as the center.

A driving mechanism for moving the finger mounting plate 218 to an arbitrary position within the vertical plane in the above-mentioned structure will be described below.

In this driving mechanism, a first driven roller 242 is axially supported on the base 22 via a mounting stay 240 to be pivotal about an axis perpendicular to the vertical plane. A second driven roller 244 is directly axially supported by the upper stationary block 226 in a similar rotatable support state. On the other hand, a third driven roller 246 is axially supported by the right movable block 236 in a similar rotatable state.

The slide block 230 is formed into a substantially square shape when viewed from the front side. Four intermediate rollers 248, 250, 252, and 254 are rotatably and axially supported on the four corners of the front surface of the slide block 230 in the same state as the first and second driven rollers 242 and 244. The first intermediate roller 248 is located at the upper left corner in FIG. 15, the second intermediate roller 250 is located at the upper right corner in FIG. 15, the third intermediate roller 252 is located at the lower right corner in FIG. 15, and the fourth intermediate roller 254 is located at the lower left corner in FIG. 15.

The outer surfaces of the first to third driven rollers 242, 244, and 246 are formed to be flat, and the first to fourth intermediate rollers 248, 250, 252, and 254 comprise toothed rollers on the outer surfaces of which teeth are formed.

A coupling belt 256 is wound around these first to third driven rollers 242, 244, and 246, and the first to fourth intermediate rollers 248, 250, 252, and 254 in a cross shape. The coupling belt 256 comprises a toothed timing belt. In this example, the coupling belt 256 is wound while the toothed surface faces outward.

More specifically, the coupling belt 256 is wound around the inside outer peripheral surface of the first intermediate roller 248 while one end of the coupling belt 256 is locked by the upper surface of a locking portion 258 integrally formed on the left movable block 238, and is then wound around the outside outer peripheral surface of the second driven roller 244, the inside outer peripheral surface of the second intermediate roller 250, the outside outer peripheral surface of the third driven roller 246, the inside outer peripheral surface of the third intermediate roller 252, the outside outer peripheral surface of the first driven roller 242, and the inside outer peripheral surface of the fourth intermediate roller 254 in turn. Then, the belt 256 is extended while the other end is locked by the lower surface of the locking portion 258 described above.

In this example, the third and second intermediate roller 252 and 250 respectively serve as first and second driving rollers. More specifically, a large-diameter driven pulley 260 is coaxially fixed to the third intermediate roller 252 as the first driving roller. A first driving motor 262 having a reversibly rotatable driving shaft which is rotated about an axis of rotation parallel to that of the driven pulley 260 is mounted on a support stay 230a integrally formed on the lower portion of the right side surface of the slide block 230 described above. A driving pulley 264 is coaxially fixed to the driving shaft of the firs driving motor 262. An endless belt 266 is looped between the driving and driven pulleys 264 and 260. With this arrangement, when the first driving motor 262 is started, the third intermediate roller 252 can be rotated in one of clockwise or counterclockwise directions.

A large-diameter driven pulley 268 is coaxially fixed to the second intermediate roller 250 serving as the second driving roller. A second driving motor 272 having a reversibly rotatable driving shaft which is rotated about an axis of rotation parallel to that of the driven pulley 268 is mounted on a support stay 230b integrally formed on the upper portion of the right side surface of the slide block 230. A driving pulley 274 is coaxially fixed to the driving shaft of the second driving motor 272. An endless belt 276 is looped between the driving and driven pulleys 274 and 268. With this structure, when the second driving motor 272 is started, the second intermediate roller 250 can be rotated in one of clockwise or counterclockwise directions.

The first and second driving motors 262 and 272 adopt ones each incorporating a brake mechanism for braking the corresponding driving shaft when power supply is stopped.

Figure 16:
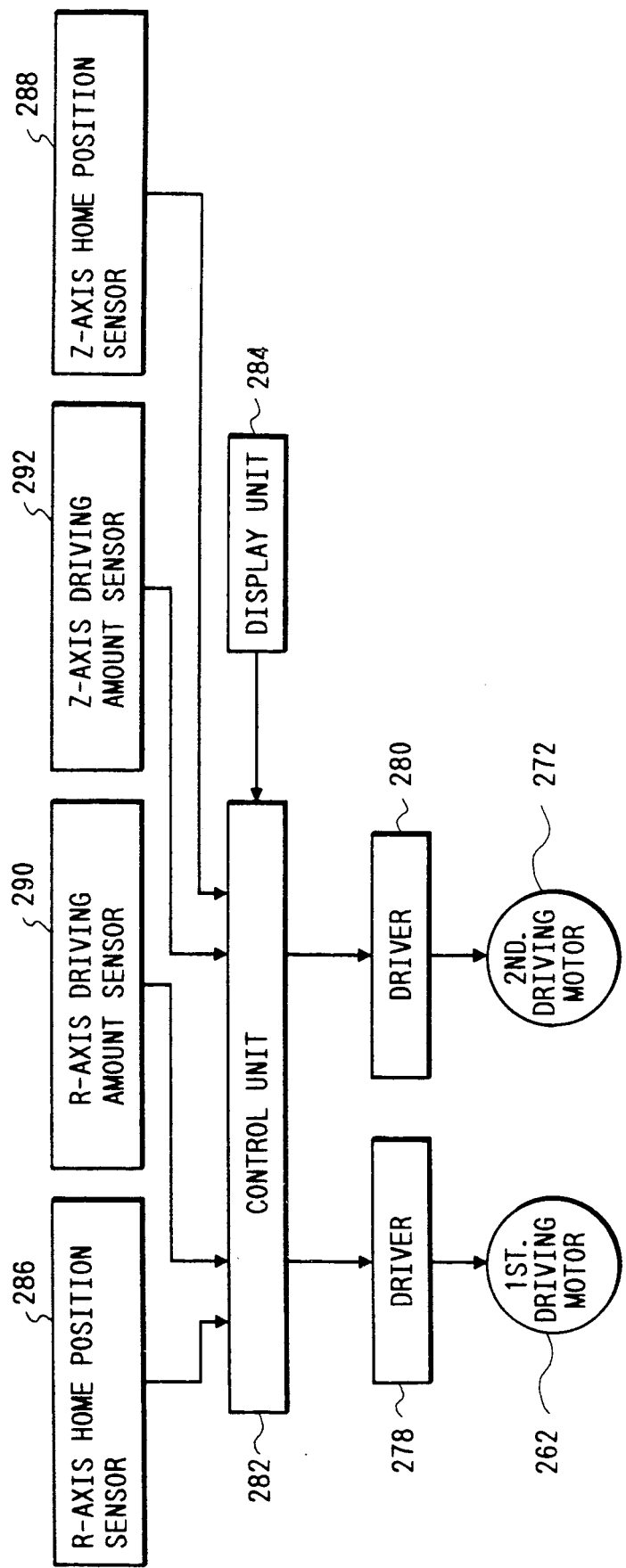
FIG. 16 is a block diagram showing an arrangement of a control system for the orthogonal two-axis moving apparatus.

As shown in FIG. 16, the first and second driving motors 262 and 272 are connected to a control unit 282 through corresponding drivers 278 and 280. The control unit 282 moves an article gripped by the finger device 220 from a start point to an end point on the basis of a prestored control program. The control unit 282 is connected to a teaching unit 284 for teaching the start and end points, and other necessary information.

The control unit 282 is connected to an R-axis home position sensor 286, a Z-axis home position sensor 288, an R-axis driving amount sensor 290, and a Z-axis driving amount sensor 292 so as to detect the present position of the central position of the mounting plate 218 as an object to be moved.

Figure 15:
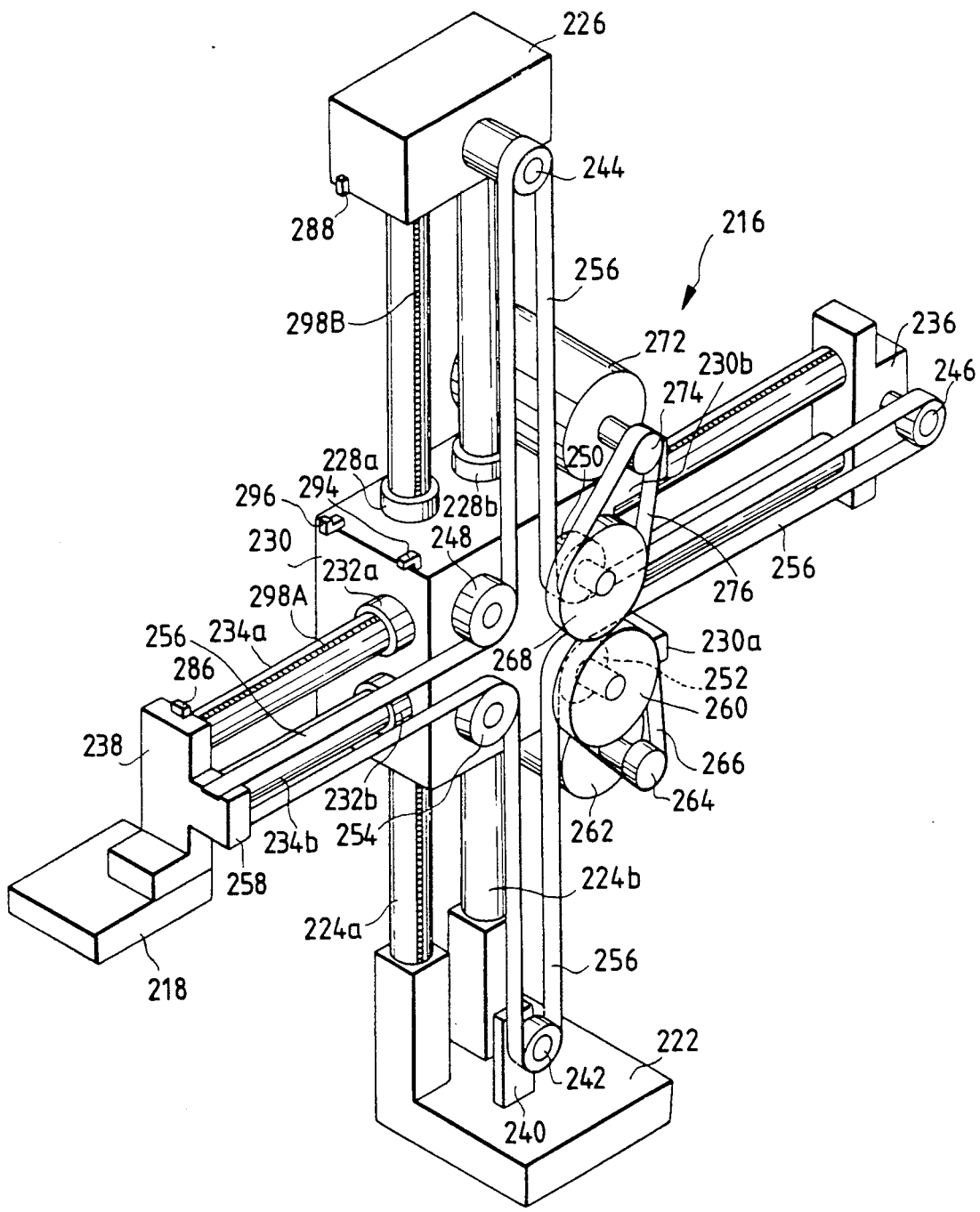
FIG. 15 is a perspective view of a structure of the orthogonal two-axis moving apparatus shown in FIG. 14.

The R- and Z-axis home position sensors 286 and 288 are respectively attached to the right end portion of the upper surface of the left movable block 238 and the lower end portion of the left side surface of the upper stationary block 226, as shown in FIGS. 14 and 15. An R-axis sensor dog 294 is mounted on the left end portion of the upper surface of the slide block 230. When the second guide shafts 234a and 234b are maximally displaced to the right in FIG. 14, in other words, when the mounting plate 218 is maximally retracted, the R-axis sensor dog 294 opposes the R-axis home position sensor 286 and turns it on. A Z-axis sensor dog 296 is mounted on the upper end portion of the left side surface of the slide block 230. When the slide block 230 is maximally displaced upward, the Z-axis sensor dog 296 opposes the Z-axis home position sensor 288, and turns it on.

Since the R- and Z-axis home position sensors 286 and 288 are mounted in this manner, in this example, the control unit 282 detects a position where the mounting plate 218 is most retracted toward the slide block 230 and is displaced at its uppermost position, as an origin as a reference position in a moving vertical plane.

Each of the R- and Z-axis driving amount sensors 290 and 292 comprises a photocoupler consisting of a set of a light-emitting element and a light-receiving element. These sensors are arranged at positions facing corresponding linear scales 298A and 298B in the slide block 230. The R-axis linear scale 298A is formed on the outer surface of the upper second guide shaft 234a to extend along the R-axis, as shown in FIG. 15. The Z-axis linear scale 238B is formed on the outer surface of the left first guide shaft 224a to extend along the Z-axis.

In this manner, the R-axis driving amount sensor 290 and the R-axis linear scale 298A constitute an R-axis linear encoder, and the Z-axis driving amount sensor 292 and the Z-axis linear scale 298B constitute a Z-axis linear encoder.

Since the R- and Z-axis linear encoders are constituted in this manner, the driving amounts of the mounting plate 218 along the R- and Z-axis directions can be measured as absolute values, respectively, and are very accurately detected. More specifically, the rotation amounts of the driving shafts of the first and second driving motors 262 and 272 as driving sources are detected through the rotary encoders, so that the driving amounts of the mounting plate 218 as an object to be moved in the R- and Z-axis directions can be obtained by calculations. In this case, however, calculation processing includes calculation errors, and the rotation amounts of the driving shafts cannot often be accurately converted to driving amounts due to, e.g., elongation of the timing belt 256. Thus, precision of the detected values is lower than that in a case utilizing the linear encoders of this example.

A control sequence of a moving operation in the control unit 282 in the moving apparatus 216 with the above-mentioned arrangement will be described below.

When the mounting plate 218 is to be moved downward along the Z-axis, the control unit 282 synchronously rotates the first and second driving motors 262 and 272 clockwise.

Upon clockwise rotation of the third intermediate roller 252, a portion of the timing belt 256 between the first driven roller 242 and the third intermediate roller 252 is fed toward a portion between the third intermediate roller 252 and the third driven roller 246, and a portion of the timing roller 256 between the third intermediate roller 252 and the third driven roller 246 is fed toward a portion between the third driven roller 246 and the second intermediate roller 250. Upon clockwise rotation of the third driven roller 246, a portion of the timing belt 256 between the third driven roller 246 and the second intermediate roller 250 is fed toward a portion between the second driven roller 244 and the second intermediate roller 250, and a portion of the timing belt 256 between the second driven roller 244 and the second intermediate roller 250 is fed toward a portion between the second driven roller 244 and the first intermediate roller 248.

Since the two ends of the timing belt 256 are fixed to the left movable block 238, the length of the timing belt 256 between the left movable block 238 and the fourth intermediate roller 254 is left unchanged. As a result, the lengths of the portions of the timing belt 156 between the first driven roller 242 and the third and fourth intermediate rollers 252 and 254 are decreased. On the other hand, the length of the portion of the timing belt 256 between the left movable block 238 and the first intermediate roller 248 is left unchanged, and the lengths of the portions of the timing belt 256 between the second driven roller 244 and the first and second intermediate rollers 248 and 250 are increased.

The driving amounts of the first and second driving motors 262 and 272 are set to be equal to each other since these motors are synchronous with each other. Therefore, these feed amounts are equal to each other.

Figure 17A:
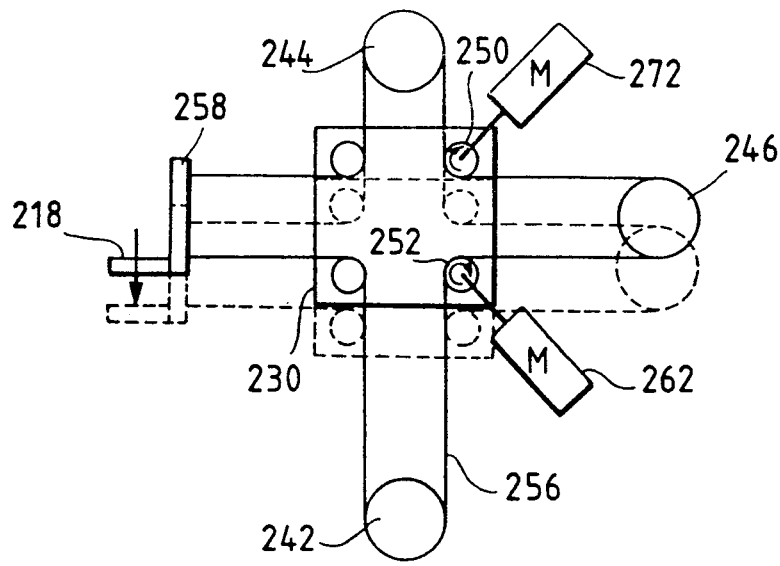
FIGS. 17A to 17D are schematic front views respectively showing four moving states of a mounting plate according to different driving states of first and second driving motors.

In this manner, the lengths of portions of the timing belt 256 between the slide block 230 and the left movable block 238, and the lengths of portions of the timing belt 256 between the right movable block 236 and the slide block 230 are similarly left unchanged. Meanwhile, the lengths of portions of the timing belt 256 between the base 222 and the slide block 230 are decreased, and the lengths of portions of the timing belt 256 between the upper stationary block 226 and the slide block 230 are similarly increased. As a result, the slide block 230 is moved immediately downward, i.e., the mounting plate 218 is moved downward along the Z-axis, as shown in FIG. 17A.

Figure 17B:
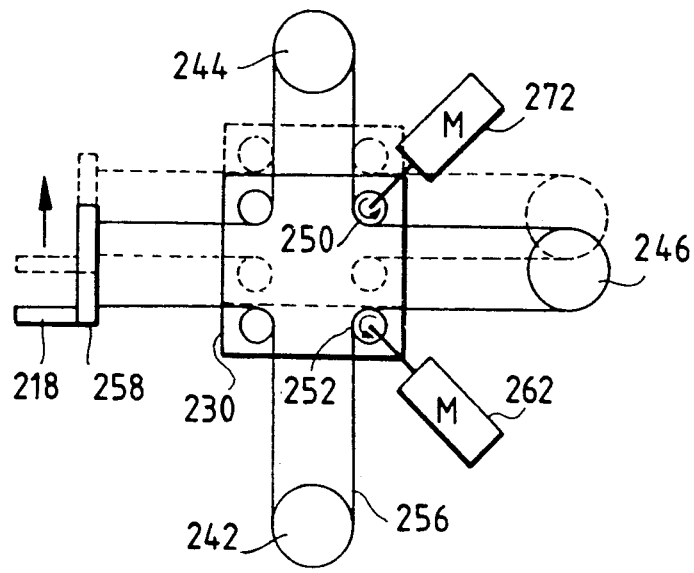

When the mounting plate 218 is to be moved upward along the Z-axis, the control unit 282 synchronously rotates the first and second driving motors 262 and 272 counterclockwise. As a result, in a state opposite to the state wherein the motors are rotated clockwise, the lengths of portions of the timing belt 256 between the base 222 and the slide block 230 are similarly increased, and the lengths of portions of the timing belt 256 between the upper stationary block 226 and the slide block 230 are similarly decreased. As a result, the slide block 230 is moved vertically upward, i.e., the mounting plate 218 is moved upward along the Z-axis, as shown in FIG. 17B.

When the mounting plate 218 is to project to the left along the R-axis the control unit 282 synchronously rotates the first driving motor 262 counterclockwise and the second driving motor 272 clockwise, respectively.

When the third intermediate roller 254 is rotated counterclockwise upon counterclockwise rotation of the first driving motor 262, a portion of the timing belt 256 between the third driven roller 246 and the third intermediate roller 252 is fed toward a portion between the third intermediate roller 252 and the first driven roller 242, a portion of the timing belt 256 between the third intermediate roller 252 and the first driven roller 242 is fed toward a portion between the first driven roller 242 and the fourth intermediate roller 254, and a portion of the timing belt 256 between the first driven roller 242 and the fourth intermediate roller 254 is fed toward a portion between the fourth intermediate roller 254 and the left movable block 238. In this manner, the length of the portion of the timing belt 256 between the fourth intermediate roller 254 and the left movable block 238 is increased.

However, when the second intermediate roller 250 is rotated clockwise upon clockwise rotation of the second driving motor 272, a portion of the timing belt 256 between the third driven roller 246 and the second intermediate roller 250 is fed toward a portion between the second intermediate roller 250 and the second driven roller 244, a portion of the timing belt 256 between the second intermediate roller and the second driven roller 244 is fed toward a portion between the second driven roller 244 and the first intermediate roller 248, and a portion of the timing belt 256 between the second driven roller 244 and the first intermediate roller 248 is fed toward a portion between the first intermediate roller 248 an the left movable block 238. In this manner, the length of the portion of the timing belt 256 between the first intermediate roller 248 and the left movable block 238 is increased.

The driving amounts of the first and second driving motors 262 and 272 are set to be equal to each other since these motors are synchronous with each other. Therefore, these feed amounts are equal to each other.

Figure 17C:
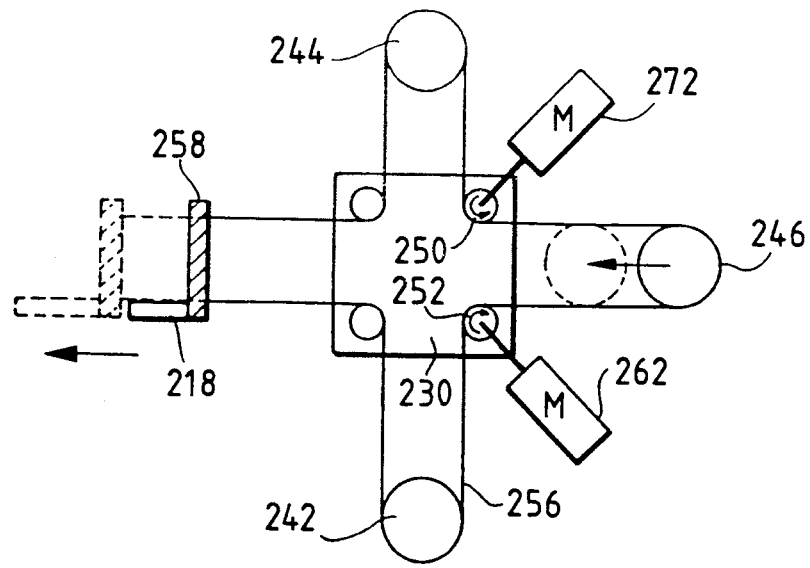

In this manner, the lengths of the portions of the timing belt 256 between the base 222 and the slide block 230 and the lengths of the portions of the timing belt 256 between the upper stationary block 226 and the slide block 230 ar similarly left unchanged. The lengths of the portions of the timing belt 256 between the slide block 230 and the left movable block 238 are increased, and the lengths of the portions of the timing belt 256 between the right movable block 236 and the slide block 230 are decreased. As a result, the second guide shafts 234a and 234b project to the left from the slide block 230, i.e., the mounting plate 218 is moved to the left along the R-axis, as shown in FIG. 17C.

Figure 17D:
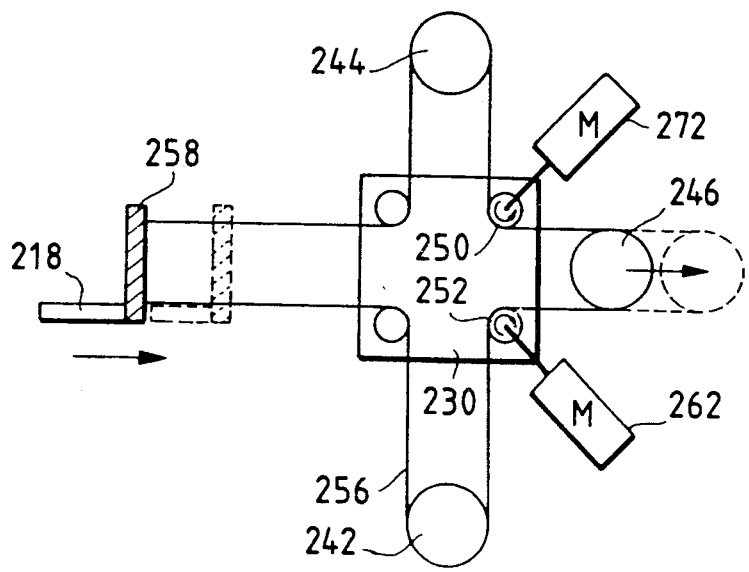

When the mounting plate 218 is to be retracted to the right along the R-axis, the control unit 282 synchronously rotates the first driving motor 262 clockwise and the second driving motor 272 counterclockwise, respectively. As a result, in a state opposite to the state wherein the mounting plate 118 projects to the left, the lengths of the portions of the timing belt 256 between the slide block 230 and the left movable block 238 are decreased, and the lengths of the portions of the timing belt 256 between the right movable block 236 and the slide block 230 are increased. As a result, the second guide shafts 234a and 234b are retracted to the right with respect to the slide block 230, as shown in FIG. 17D, i.e., the mounting plate 218 is moved to the right along the R-axis When the mounting plate 218 is to be moved obliquely downward to the right, the control unit 282 rotates only the first driving motor 262 clockwise while the second driving motor 272 is kept OFF. As a result, the second guide shafts 234a and 234b are retracted to the right while the slide block 230 is moved downward. In this manner, the mounting plate 218 is moved obliquely downward to the right at an inclination angle of about 26.5 degrees.

When the mounting plate 218 is to be moved obliquely upward to the left, the control unit 282 rotates only the first driving motor 262 while the second driving motor 272 is kept OFF. As a result, the second guide shafts 234a and 234b project to the left while the slide block 230 is moved upward. In this manner, the mounting plate 218 is moved obliquely upward to the left at an inclination angle of about 26.5 degrees as an angle of depression.

When the mounting plate 218 is to be moved obliquely downward to the left, the control unit 218 rotates only the second driving motor 272 clockwise while the first driving motor 262 is kept OFF. As a result, the second guide shafts 234a and 234b project to the left while the slide block 230 is moved downward. In this manner, the mounting plate 218 is moved obliquely downward to the left at an inclination angle of about 26.5 degrees as an angle of depression.

When the mounting plate 218 is to be moved obliquely upward to the right, the control unit 218 rotates only the second driving motor 272 counterclockwise while the first driving motor 262 is kept OFF. As a result, the second guide shafts 234a and 234b are retracted to the right while the slide block 230 is moved upward. In this manner, the mounting plate 218 is moved obliquely upward to the right at an inclination angle of about 26.5 degrees as an angle of depression.

When the mounting plate 218 is moved obliquely downward to the right at an arbitrary inclination angle (e.g., an angle smaller than 45 degrees with respect to the horizontal line), the control unit 218 rotates the second driving motor 272 counterclockwise, while it rotates the first driving motor 262 clockwise. In this case, the driving amount of the second driving motor 272 is set to be smaller than that of the first driving motor 262. As a result, the slide block 230 is moved obliquely downward to the right at an inclination angle defined based on a ratio of the driving amounts of the first and second driving motors 262 and 272.

Similarly, when the mounting plate 218 is to be moved in a predetermined direction at an arbitrary inclination angle, the control unit 282 appropriately sets the rotation directions and rotation amounts of the first and second driving motors 262 and 272, thus achieving the above-mentioned movement operation.

The table below summarizes the driving control modes of the first and second driving motors 262 and 272 in the control unit 282, and movement operations of the mounting plate 218 based on the driving control.

TABLE

| Rotation Direction of First Driving Motor | Rotation Direction of Second Driving Motor | Moving Direction of Mounting Plate |
| --- | --- | --- |
| Clockwise | Clockwise | ↓ |
| Counterclockwise | Counterclockwise | ↑ |
| Counterclockwise | Clockwise | ← |
| Clockwise | Counterclockwise | → |
| Clockwise | OFF | ↘ |
| Counterclockwise | OFF | ↖ |
| OFF | Clockwise | ↙ |
| OFF | Counterclockwise | ↗ |

Driving amounts in the respective driving directions are as follows when the feed amount of the motor is represented by 1:

Downward direction ( ↓ ): 1/2
Upward direction ( ↑ ): 1/2
Left direction (←): 1
Right direction (→): 1
Right downward direction (↘): distance corresponding to a line segment connecting a start point and a point advanced therefrom downward by 1/4 and to the right by 1/2 by a straight line
Left upward direction (↖): distance corresponding to a line segment connecting a start point and a point advanced therefrom upward by λ/4 and to the left by λ/2 by a straight line
Left downward direction ( ): distance corresponding to a line segment connecting a start point and a point advanced therefrom downward by 1/4 and to the left by 1/2 by a straight line
Right upward direction (↗): distance corresponding to a line segment connecting a start point and a point advanced therefrom upward by 1/4 and to the right by 1/2 by a straight line More specifically, in the moving apparatus 216 with the above arrangement of the first example, the first and second driving motors 262 and 272 are disposed in a common state with respect to the R- and Z-axes as compared to a conventional arrangement wherein driving motors for respectively moving an object in the R- and Z-axis directions are exclusively arranged for the R- and Z-axes. In the first example, the rotation directions and the rotation amounts of the two driving motors 262 and 272 are appropriately selected, so that the mounting plate 218 as an object to be moved can be moved to an arbitrary position via an arbitrary path, as shown in the Table above.

In particular, in the first example, the driving forces of the first and second driving motors 262 and 272 are transmitted through the timing belt in place of expensive ball screw shafts unlike in the prior art. As a result, cost of the apparatus as a whole can be reduced.

The present invention is not limited to the arrangement of the first example of the third embodiment, and various changes and modifications may be made within the spirit and scope of the invention.

For example, in the first example, the mounting plate 218 as an object to be moved is moved in a vertical plane. However, the present invention is not limited to such an arrangement. For example, the mounting plate 218 may be moved in a horizontal plane. In this case, the first guide shafts 224a and 224b extend along the X-axis, and the second guide shafts 234a and 234b extend along the Y-axis.

When the mounting plate 218 is to be moved in the horizontal plane, the present invention is operated quite in the same manner as in the case wherein it is moved in the vertical plane like in the first example. When the mounting plate 218 is moved in the horizontal plane, the slide block 230 will never be dropped by its weight when power supply is stopped, and the above-mentioned brake mechanisms can be omitted.

In the first example, in order to prevent the slide block 230 from moving downward, i.e., dropping occurring when power supply to the first and second driving motors 262 and 272 is stopped, the first and second driving motors 262 and 272 incorporate the brake mechanisms for stopping rotation of the corresponding driving shafts. However, the present invention is not limited to the above arrangement. For example, the first and second driven rollers 242 and 244 connected to the driving shafts of the first and second driving motors 262 and 272 may comprise brake mechanisms, or a brake mechanism may be attached to a shaft portion 246a for axially supporting the driven roller 246.

In the first example, a single timing belt 256 is looped in a cross shape on the first intermediate roller 248, the second driven roller 244, the second intermediate roller 250 as the second driving roller, the third driven roller 246, the third intermediate roller 252 as the first driving roller, the first driven roller 242, and the fourth intermediate roller 252 in turn without forming folded portions. However, the present invention is not limited to this structure, and may be applied to a cross-shaped structure comprising folded portions.

Figure 18:
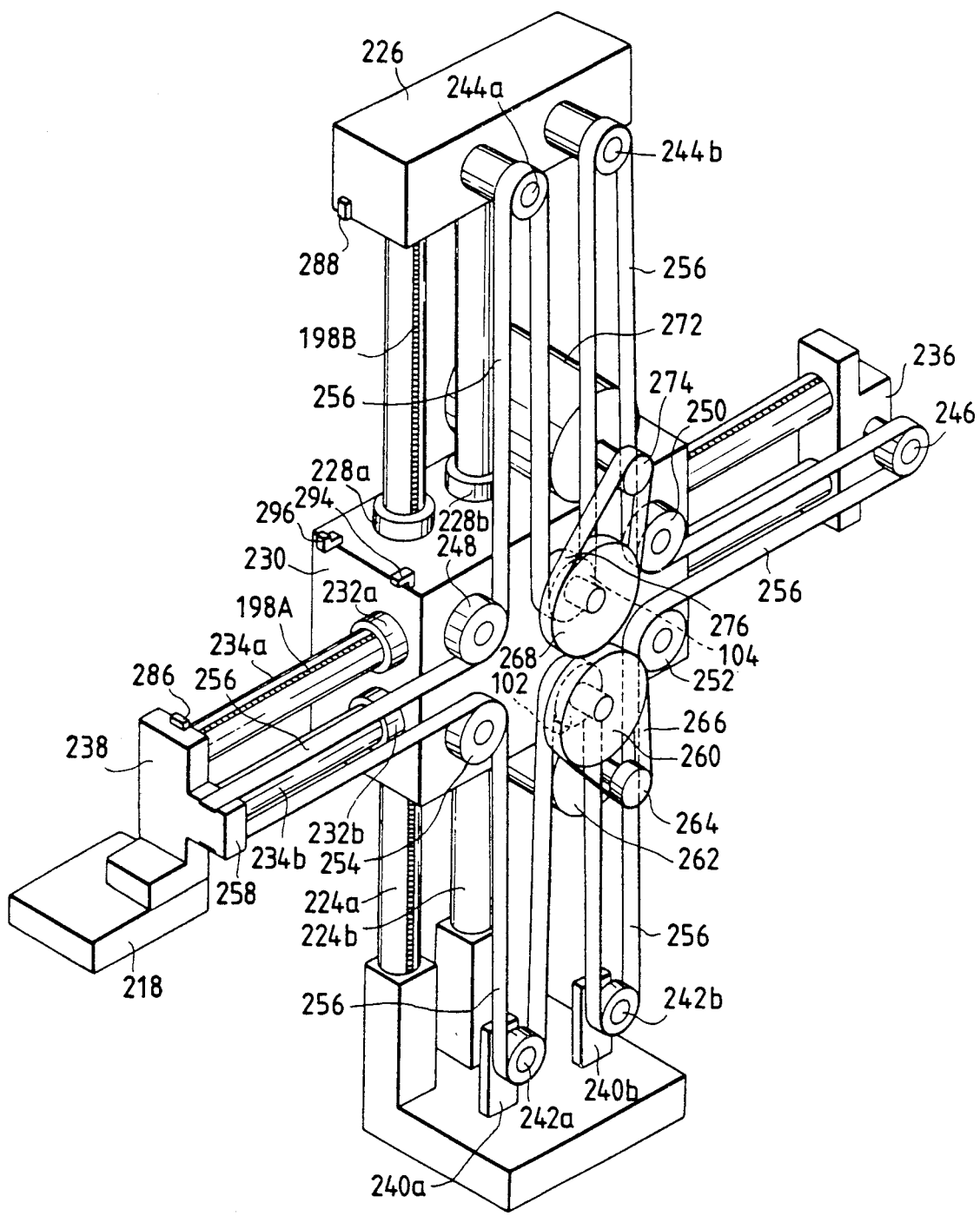
FIG. 18 is a perspective view showing a structure of the second example of the third embodiment of a moving apparatus according to the present invention.

A structure of the second example of the third embodiment wherein the timing belt 256 is looped in a cross shape having folded portions will be described below with reference to FIG. 18. In the following description, the same reference numerals denote the same parts as in the first example described above, and a detailed description thereof will be omitted.

In the second example, a first driving roller 202 is pivotally and axially supported on the upper central portion of the slide block 230 to be located at the center between the first and second intermediate rollers 248 and 250 A second driving roller 204 is pivotally and axially supported on the lower central portion of the slide block 230 to be located at the center between the third and fourth intermediate rollers 252 and 254. In the second example, the first driven pulley 260 described in the first example is coaxially fixed to the first driving roller 202, and the second driven pulley 268 is coaxially fixed to the second driving roller 204.

The first and second driving rollers 202 and 204 comprise toothed pulleys on the outer surfaces of which teeth are formed, as in the first to fourth intermediate rollers 248, 250, 252, and 254.

A pair of first driven rollers 242a and 242b are pivotally and axially supported on corresponding mounting stays 240a and 240b so as to be juxtaposed on the base 222 as the lower stationary block to be separated in the horizontal direction. The left first driven roller 242a in FIG. 18 is located immediately below a portion between the first driving roller 202 and the fourth intermediate roller 254. The right first driven roller 242b in FIG. 18 is located immediately below a portion between the first driving roller 202 and the third intermediate roller 252.

A pair of second parallel driven rollers 244a and 244b are pivotally and axially supported on the upper stationary block 226 to be separated in the horizontal direction. The left second driven roller 244a in FIG. 18 is located immediately above a portion between the second driving roller 204 and the first intermediate roller 248. The right second driven roller 244b in FIG. 18 is located immediately above a portion between the second driving roller 204 and the second intermediate roller 250.

In the second example, one end of the timing belt 256 is fixed to the upper surface of the locking portion 258, and is sequentially looped on the inside outer peripheral surface of the first intermediate roller 248, the outside outer peripheral surface of the left second driven roller 244a, the inside outer peripheral surface of the second driving roller 204, the outside outer peripheral surface of the right second driven roller 244b, the inside outer peripheral surface of the second intermediate roller 250, the outside outer peripheral surface of the third driven roller 246, the inside outer peripheral surface of the third intermediate roller 252, the outside outer peripheral surface of the right first driven roller 242b, the inside outer peripheral surface of the first driving roller 202, the outside outer peripheral surface of the left first driven roller 242a, and the inside outer peripheral surface of the fourth intermediate roller 242. Then, the other end of the belt 256 is fixed to the lower surface of the locking portion 258.

More specifically, the timing belt 256 is looped in a substantially cross shape to be folded inwardly in its upper and lower portions.

Since the second example has the structure described above, the same operation as in the first example can be performed. In particular, in the second example, winding angles of the timing belt 256 on the driving rollers 202 and 204 can be about twice those in the first example. Therefore, transmission efficiency of a driving force can be improved.

In the second example, each winding angle of the timing belt 256 on the first and second driving rollers 202 and 204 is 180 degrees. This value is twice that of the first example since each winding angle of the timing belt 256 on the third and second intermediate rollers 252 and 250 is 90 degrees. Therefore, the rotation forces from the first and second driving rollers 202 and 204 can be more reliably transmitted to the timing belt 256.

In the second example, a direction to increase a transmission torque is limited to the Z-axis direction. However, the present invention is not limited to this. For example, a transmission torque may be increased in the R-axis direction although a speed is decreased, as shown in FIG. 19 as the third example.

A structure of the third example of the third embodiment will be described below with reference to FIG. 19. In the following description, the same reference numerals denote the same parts as in the second example described above, and a detailed description thereof will be omitted.

Figure 19:
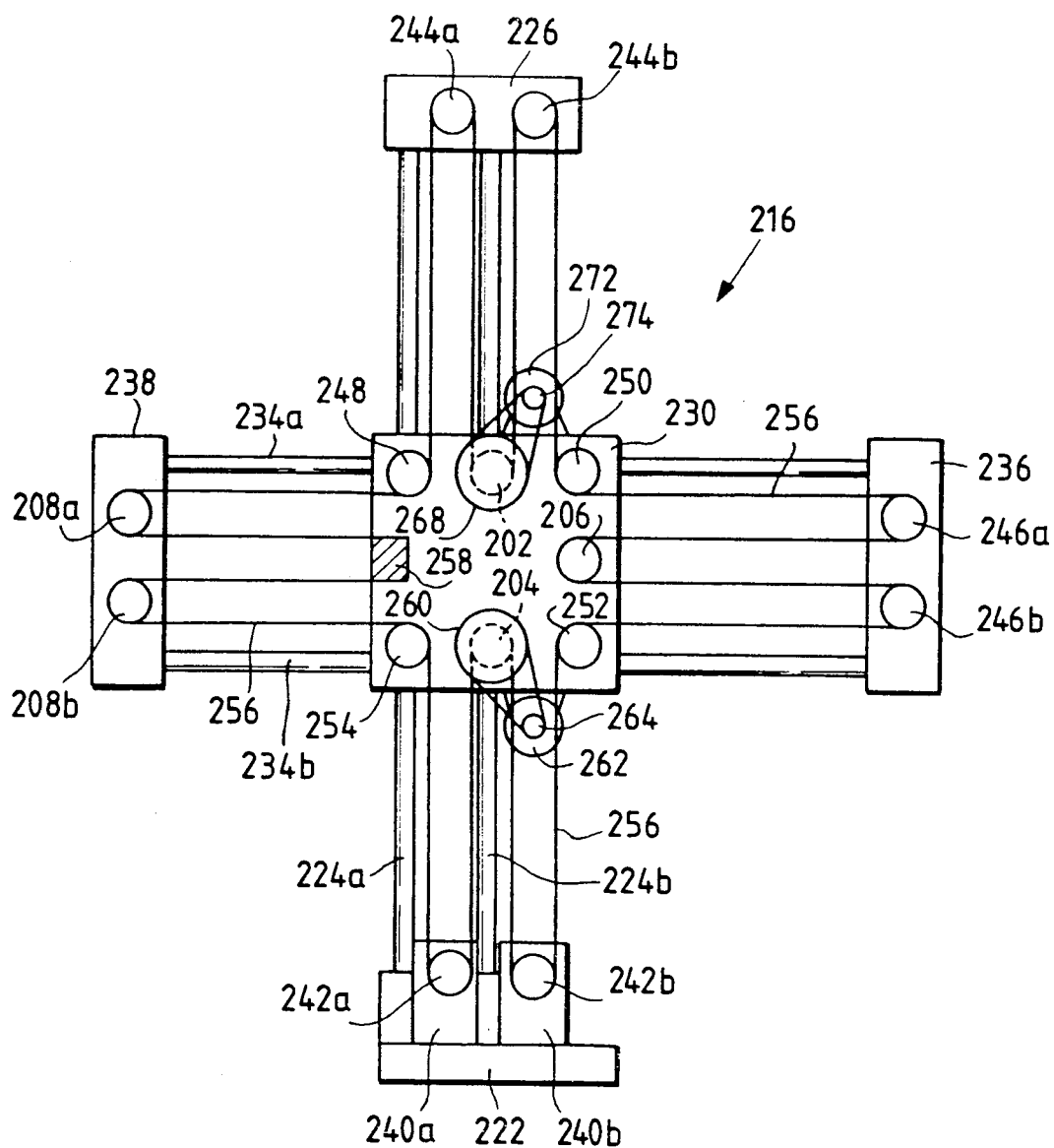
FIG. 19 is a front view showing a structure of the third example of the third embodiment of an orthogonal two-axis moving apparatus according to the present invention.

In the third example, as shown in FIG. 19, a fifth intermediate roller 206 is pivotally and axially supported on the central right portion of the slide block 230 to be located at the center between the second and third intermediate rollers 250 and 252. The locking portion 258 is integrally formed on the central left portion of the slide block 230 to be located at the center between the first and fourth intermediate rollers 248 and 254. In the third example, the first and second driving rollers 202 and 204 are independently arranged, as has been described in the second example.

Note that the fifth intermediate roller 206 comprises a toothed pulley on the outer surface of which teeth are formed, as in the first to fourth intermediate rollers 248, 250, 252, and 254.

A pair of parallel third driven rollers 246a and 246b are pivotally and axially supported on the right movable block 236 to be separated in the vertical direction. The upper third driven roller 246a in FIG. 19 is located on the immediately right side of a portion between the second and fifth intermediate rollers 250 and 206. The lower third driven roller 246b in FIG. 19 is located on the immediately right side of a portion between the fifth and third intermediate rollers 206 and 252.

A pair of parallel fourth driven rollers 208a and 208b are pivotally and axially supported on the left movable block 238 to be separated in the vertical direction. The upper fourth driven roller 208a in FIG. 19 is located on the immediately left side of a portion between the first intermediate roller 248 and the locking portion 258. The lower fourth driven roller 208b in FIG. 19 is located on the immediately left side of a portion between the locking portion 258 and the fourth intermediate roller 254.

In the third example, one end of the timing belt 256 is fixed to the upper surface of the locking portion 258, and is looped, in turn, on the outside outer peripheral surface of the first intermediate roller 248, the outside outer peripheral surface of the left second driven roller 244a, the inside outer peripheral surface of the second driving roller 204, the outside outer peripheral surface of the right second driven roller 244b, the inside outer peripheral surface of the second intermediate roller 250, the outside outer peripheral surface of the upper third driven roller 246a, the inside outer peripheral surface of the fifth intermediate roller 206, the outside outer peripheral surface of the lower third driven roller 246b, the inside outer peripheral surface of the third intermediate roller 252, the outside outer peripheral surface of the right first driven roller 242b, the inside outer peripheral surface of the first driving roller 202, the outside outer peripheral surface of the left first driven roller 242a, the inside outer peripheral surface of the fourth intermediate roller 254, and the outside outer peripheral surface of the lower fourth driven roller 208b. Then, the other end of the belt 256 is fixed to the lower surface of the locking portion 258.

That is, the timing belt 256 is looped in a substantially cross shape to be folded inwardly in its upper, lower, right, and left portions.

Since the third example is arranged as described above, when the slide block 230 is to be moved along the Z-axis (vertically), the first and second driving rollers 202 and 204 serve as so-called pulleys, while when the second guide shafts 234a and 234b are to be moved along the R-axis (horizontally), the fifth intermediate roller 206 serves as a so-called pulley. As a result, if a moving speed of the slide block 230 along Z-axis is defined as $V_Z$, a transmission torque along the Z-axis is defined as $T_Z$, a moving speed along the R-axis is defined as $V_R$, and a transmission torque along the R-axis is defined as $T_R$ with respect to the maximum rotation speeds of the first and second driving rollers in the first example (i.e., the third and second intermediate rollers 252 and 250), although a moving speed of the slide block along the Z-axis with respect to the maximum rotation speeds of the first and second driving rollers 202 and 204 in the third example (equal to those in the first example) becomes half ($=V_Z/2$) that in the first example, its transmission torque can be doubled ($=2 \cdot T_Z$), while although a moving speed along the R-axis becomes half ($=V_R/2$) that in the first example, its transmission torque can be doubled ($=2 \cdot T_R$).

In this manner, in the third example, high transmission torques can be obtained along the two axes, i.e., Z- and R-axes, and this example is suitable for a case wherein a heavy article is to be moved.

As described in detail above, an orthogonal two-axis moving apparatus according to the present invention comprises a first guide member which extends in one direction and is attached to a stationary position, a slide block which is slidably supported by the first guide member, and is movable in one direction, a second guide member which extends in the other direction perpendicular to the one direction, and is supported by the slide block to be movable in the other direction, first and second driven rollers pivotally supported on two ends of the first guide member, a third driven roller pivotally supported on one end of the second guide member, intermediate rollers pivotally supported on four corner portions of the slide block, a coupling belt, two ends of which are fixed to the other end of the second guide member, and which is looped in a cross shape between the first to third driven rollers and the four intermediate rollers, and first and second driving motors for respectively driving two out of the four intermediate rollers, which two rollers are located on one end portion side of the second guide member.

In the orthogonal two-axis moving apparatus according to the present invention, the four intermediate rollers comprise toothed pulleys, the coupling belt comprises a timing belt on an outer surface of which teeth are formed, and the first to third driven rollers comprise idle rollers for guiding a flat inner surface of the timing belt.

An orthogonal two-axis moving apparatus according to the present invention comprises a first guide member which extends in one direction and is attached to a stationary position, a slide block which is slidably supported by the first guide member, and is movable in one direction, a second guide member which extends in the other direction perpendicular to the one direction, and is supported by the slide block to be movable in the other direction, a pair of first driven rollers pivotally supported and juxtaposed on one end of the first guide member, a pair of second driven rollers pivotally supported and juxtaposed on the other end of the first guide member, a third driven roller pivotally supported on one end of the second guide member, intermediate rollers pivotally supported on the four corner portions of the slide block, first and second driving rollers attached to the slide block, and pivotally supported on portions between corresponding pairs of the intermediate rollers which pairs are adjacent in the other direction, a coupling belt, two ends of which are fixed to the other end of the first guide member, which is looped in a substantially cross shape between the first to third rollers and the four intermediate rollers, and middle portions along the one direction of which are folded at the first and second driving rollers, and first and second driving motors, attached to the slide block, for rotating the first and second driving rollers.

An orthogonal two-axis moving apparatus according to the present invention comprises a first guide member which extends in one direction and is attached to a stationary position, a slide block which is slidably supported by the first guide member, and is movable in one direction, a second guide member which extends in the other direction perpendicular to the one direction, and is supported by the slide block to be movable in the other direction, a pair of first driven rollers pivotally supported and juxtaposed on one end of the first guide member, a pair of second driven rollers pivotally supported and juxtaposed on the other end of the first guide member, a pair of third driven rollers pivotally supported and juxtaposed on one end of the second guide member, a pair of fourth driven rollers pivotally supported and juxtaposed on the other end of the second guide member, eight intermediate rollers pivotally supported on four corner portions and portions between adjacent corners of the slide block, a coupling belt, two ends of which are fixed to the other end portion side of the slide block, which is looped in a cross shape between the first to fourth driven rollers and the eight intermediate rollers, and four outward middle portions of which are respectively folded, and first and second driving motors for rotating a middle pair of intermediate rollers of three pairs of intermediate rollers which are separated from i each other in the one direction.

Therefore, according to the present invention, a low-cost orthogonal two-axis moving apparatus which can convey a heavy article can be provided.

Fourth Embodiment

The structure of the fourth embodiment of an orthogonal two-axis moving apparatus according to the present invention, which is applied to an assembly robot will be described below with reference to FIGS. 20 to 28.

Figure 20:
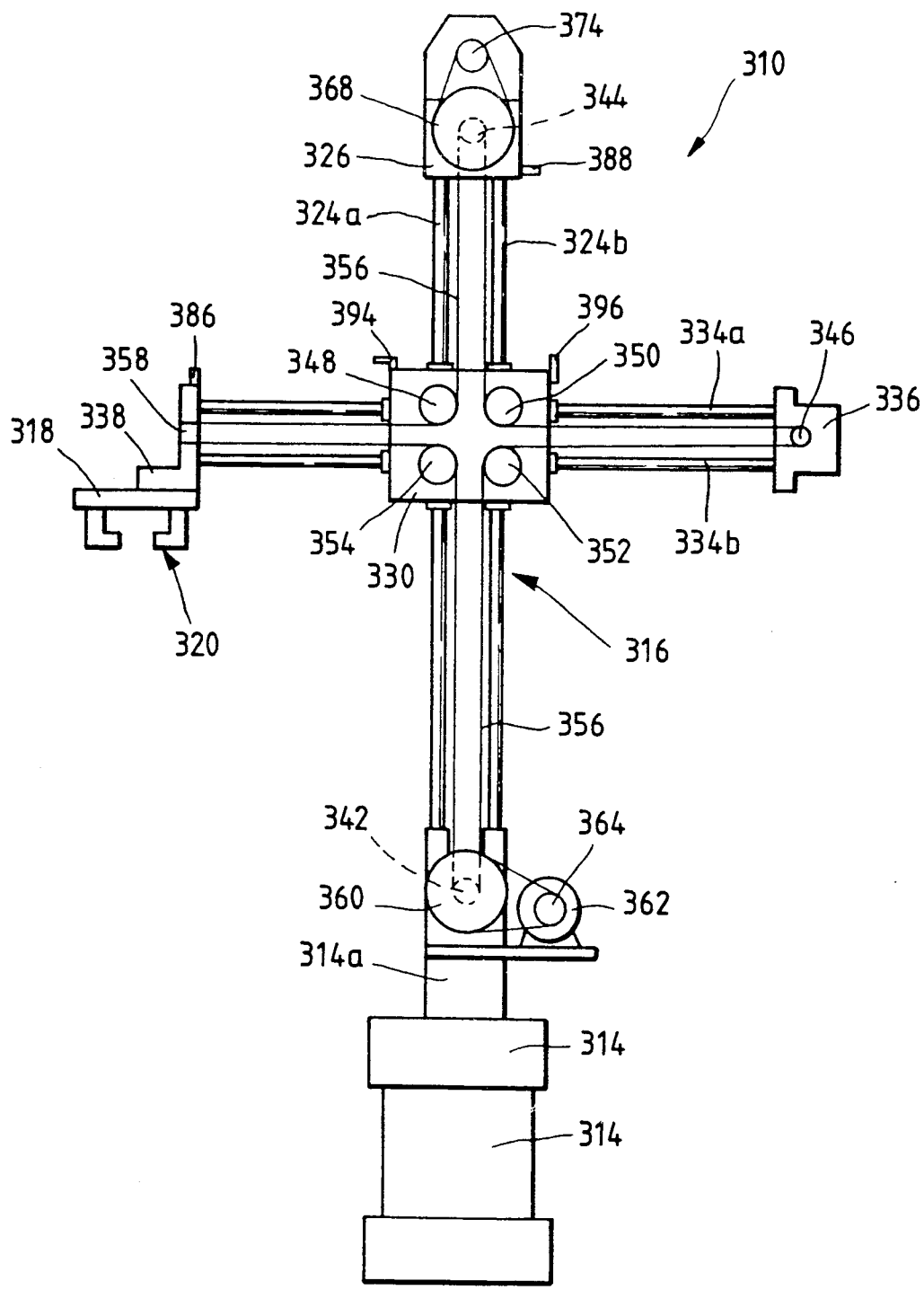
FIG. 20 is a schematic front view showing a structure of an assembly robot to which the fourth embodiment of an orthogonal two-axis moving apparatus according to the present invention is applied.

As shown in FIG. 20, an assembly robot 310 mainly comprises a main motor 312 mounted on a foundation (not shown), a reduction gear mechanism 314 connected to the upper portion of the main motor 312 and comprising a driving shaft 314a which projects upward and is rotated about a vertical axis, an orthogonal two-axis moving apparatus (to be simply referred to as a moving apparatus hereinafter) 316, as the characteristic feature of the present invention, which is rotated by the driving shaft 314a of the reduction gear mechanism 314 about the vertical axis, a finger mounting plate 318 attached to the left end in FIG. 20 of the moving apparatus 316, and a finger device 320 attached to the finger mounting plate 318.

The structure of the moving apparatus 316 will be described in detail below with reference to FIG. 21.

The moving apparatus 316 comprises a base 322 fixed to the upper end of the driving shaft 314a of the reduction gear mechanism 314 described above, two first guide shafts 324 a and 324b which stand upright (i.e., extend in a Z-axis direction) on the base 322, and an upper stationary block 326 fixed to the upper ends of the first guide shafts 324a and 324 b. A slide block 330 is slidably supported in the Z-axis direction while the first guide shafts 324a and 324b extend through the slide block 330 via first slide bushings 328a and 328b. In other words, the slide block 330 is vertically slidably supported by the pair of first guide shafts 324a and 324b.

A pair of second guide shafts 334a and 334b are supported by the slide block 330 to be slidable in a horizontal direction (R-axis direction) while extending through it via second slide bushings 332a and 332b. A right movable block 336 is attached to one-end portions, i.e., the right end portions (FIG. 21) of these second guide shafts 334a and 334b. A left movable block 338 is attached to the other-end portions, i.e., the left end portions (FIG. 21) of the shafts 334a and 334b. The above-mentioned finger mounting plate 318 is fixed to the lower surface of the left movable block 338.

With this arrangement, the finger mounting plate 318 can be moved to an arbitrary position within a vertical plane including two orthogonal axes, i.e., R and Z axes. In particular, as shown in FIG. 20, since the moving apparatus 316 is attached to the driving shaft 314a which is pivoted about the vertical axis, the finger mounting plate 318, and hence, the finger device 320 attached to the finger mounting plate 318 can be moved to an arbitrary position within a predetermined radius (i.e., an R-axis direction stroke) having the main motor 312 as the center.

A driving mechanism for moving the finger mounting plate 318 to an arbitrary position within the vertical plane in the above-mentioned structure will be described below.

In this driving mechanism, a first driving roller 342 is axially supported on the base 322 via a mounting stay 340 to be pivotal about an axis perpendicular to the vertical plane. A second driving roller 344 is axially supported by the upper stationary block 326 in a similar rotatable state. On the other hand, a driven roller 346 is axially supported by the right movable block 336 is a similar rotatable state.

The slide block 330 is formed into a substantially square shape when viewed from the front side. Four intermediate rollers 348, 350, 351, and 354 are rotatably and axially supported on the four corners of the front surface of the slide bock 30 in the same state as the first and second driving rollers 342 and 344. The first intermediate roller 348 is located at the upper left corner in FIG. 21, the second intermediate roller 350 is located at the upper right corner in FIG. 21, the third intermediate roller 352 is located at the lower right corner in FIG. 21, and the fourth intermediate roller 354 is located at the lower left corner in FIG. 21.

The first and second driving rollers 342 and 344, and the driven roller 346 respectively comprise toothed rollers on outer peripheral surfaces of which teeth are formed. The first to fourth intermediate rollers 348 to 354 comprise so-called idle rollers, outer peripheral surfaces of which are formed to be flat.

A coupling belt 356 is wound around these first and second driving rollers 342 and 344, the driven roller 346, and the first to fourth intermediate rollers 348 to 354 in a cross shape. The coupling belt 356 comprises a toothed timing belt. In the fourth embodiment, the coupling belt 356 is wound while the toothed surface faces inward.

More specifically, the coupling belt 356 is wound around the inside outer peripheral surface of the first intermediate roller 348 while one end of the coupling belt 356 is locked by the upper surface of a locking portion 358 integrally formed on the left movable block 338, and is then wound around the outside outer peripheral surface of the second driving roller 344, the outside outer peripheral surface of the driven roller 346, the inside outer peripheral surface of the third intermediate roller 352, the outside outer peripheral surface of the first driving roller 342, and the inside outer peripheral surface of the fourth intermediate roller 354 in turn. Then, the belt 356 is extended while the other end is locked by the lower surface of the locking portion 358 described above.

A large-diameter driven pulley 360 is coaxially fixed to the first driving roller 342. A first driving motor 362 having a reversibly rotatable driving shaft which is rotated about an axis of rotation parallel to that of the driven pulley 360 is mounted on the above-mentioned base 322. A driving pulley 364 is coaxially fixed to the driving shaft of the first driving motor 362. An endless belt 366 is looped between the driving and driven pulleys 364 and 360. With this structure, when the first driving motor 362 is started, the first driving roller 342 can be rotated in one of clockwise or counterclockwise directions.

A large-diameter driven pulley 368 is coaxially fixed to the second driving roller 344. A second driving motor 372 having a reversibly rotatable driving shaft which is rotated about an axis of rotation parallel to that of the driven pulley 368 is mounted on the upper stationary block 326 via a mounting stay 370. A driving pulley 374 is coaxially fixed to the driving shaft of the second driving motor 372. An endless belt 376 is looped between the driving and driven pulleys 374 and 368. With this structure, when the second driving motor 372 is started, the second driving roller 344 can be rotated in one of clockwise or counterclockwise directions.

As shown in FIG. 22, the first and second driving motors 362 and 372 are connected to a control unit 382 through corresponding drivers 378 and 380. The control unit 382 moves an article gripped by the finger device 320 from a start point to an end point on the basis of a prestored control program. The control unit 382 is connected to a teaching unit 384 for teaching the start and end points, and other necessary information.

The control unit 382 is connected to an R-axis home position sensor 386, a Z-axis home position sensor 388, an R-axis driving amount sensor 390, and a Z-axis driving amount sensor 392 so as to detect the present position of the central position of the mounting plate 318 as an object to be moved.

The R- and Z-axis home position sensors 386 and 388 are respectively attached to the right end portion of the upper surface of the left movable block 338 and the lower end portion of the right side surface of the upper stationary block 326, as shown in FIG. 20. An R-axis sensor dog 394 is mounted on the left end portion of the upper surface of the slide block 330. When the second guide shafts 334a and 334b are maximally displaced to the right in FIG. 20, in other words, when the mounting plate 318 is maximally retracted, the R-axis sensor dog 394 opposes the R-axis home position sensor 386 and turns it on. A Z-axis sensor dog 396 is mounted on the upper end portion of the right side surface of the slide block 330. When the slide block 330 is maximally displaced upward, the Z-axis sensor dog 396 opposes the Z-axis home position sensor 388, and turns it on.

Since the R- and Z-axis home position sensors 386 and 388 are mounted in this manner, in this embodiment, the control unit 382 detects a position where the mounting plate 318 is most retracted toward the slide block 330 and is displaced at its uppermost position, as an origin as a reference position in a moving vertical plane.

Each of the R- and Z-axis driving amount sensors 390 and 392 comprises a photocoupler consisting of a set of a light-emitting element and a light-receiving element. These sensors are arranged at positions facing corresponding linear scales 398A and 398B in the slide block 330. The R-axis linear scale 398A is formed on the outer surface of the upper second guide shaft 334a to extend along the R-axis, as shown in FIG. 21. The Z-axis linear scale 338B is formed on the outer surface of the left first guide shaft 324a to extend along the Z-axis.

In this manner, the R-axis driving amount sensor 390 and the R-axis linear scale 398A constitute an R-axis linear encoder, and the Z-axis driving amount sensor 392 and the Z-axis linear scale 398B constitute a Z-axis linear encoder.

Since the R- and Z-axis linear encoders are constituted in this manner, the driving amounts of the mounting plate 318 along the R- and Z-axis directions can be measured as absolute values, respectively, and are very accurately detected. More specifically, the rotation amounts of the driving shafts of the first and second driving motors 362 and 372 as driving sources are detected through the rotary encoders, so that the driving amounts of the mounting plate 318 as an object to be moved in the R- and Z-axis directions can be obtained by calculations. In this case, however, calculation processing includes calculation errors, and the rotation amounts of the driving shafts cannot often be accurately converted to driving amounts due to, e.g., elongation of the timing belt 356. Thus, precision of the detected values is lower than that in a case utilizing the linear encoders of this embodiment.

A control sequence of a moving operation in the control unit 382 in the moving apparatus 316 with the above-mentioned arrangement will be described below.

When the mounting plate 318 is to be moved downward along the Z-axis, the control unit 382 synchronously rotates the first and second driving motors 362 and 372 counterclockwise.

Upon counterclockwise rotation of the first driving motor 362, since the two ends of the timing belt 356 are fixed to the left movable block 338, the length of the timing belt 356 between the left movable block 338 and the fourth intermediate roller 354 is left unchanged, and the length of the timing belt 356 between the first driving roller 342 and the fourth intermediate roller 354 is decreased. On the other hand, upon counterclockwise rotation of the second driving motor 372, the length of the timing belt 356 between the left movable block 338 and the first intermediate roller 348 is left unchanged, and the length of the timing belt 356 between the second driving roller 344 and the first intermediate roller 348 is increased.

A portion of the timing belt 356 between the first driving roller 342 and the third intermediate roller 352 is fed toward a portion between the third intermediate roller 352 and the driven roller 346. A portion of the timing belt 356 between the third intermediate roller 352 and the driven roller 346 is fed toward a portion between the driven roller 346 and the second intermediate roller 350. A portion of the timing belt 356 between the driven roller 346 and the second intermediate roller 350 is fed toward a portion between the second driving roller 344 and the second intermediate roller 350. A portion of the timing belt 356 between the second driving roller 344 and the second intermediate roller 350 is fed toward a portion between the second driving roller 344 and the first intermediate roller 348.

The driving amounts of the first and second driving motors 362 and 372 are set to be equal to each other since these motors are synchronous with each other. Therefore, these feed amounts are equal to each other.

Figure 23A:
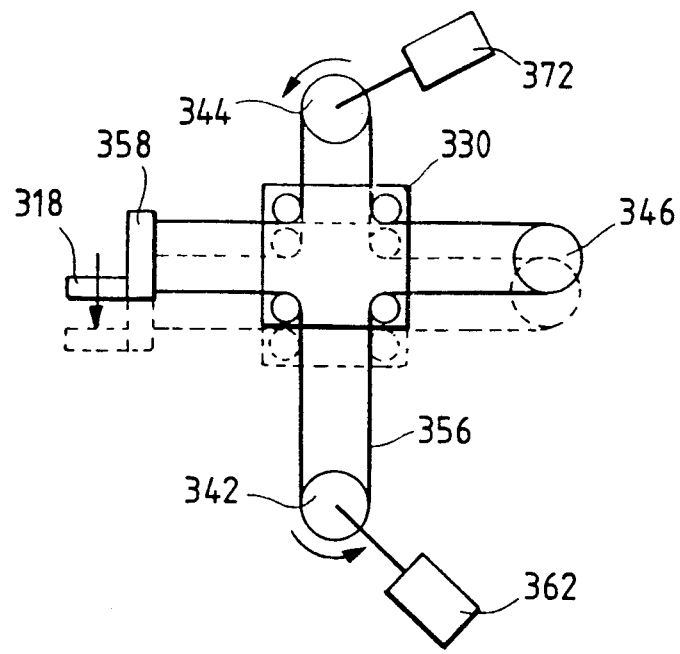
FIGS. 23A to 23D are schematic front views respectively showing four moving states of a mounting plate according to different driving states of first and second driving motors.

In this manner, the lengths of the portions between the first and fourth intermediate rollers 348 and 354 and the left movable block 338 and the lengths of the portions between the driven roller 346 and the second and third intermediate rollers 350 and 352 are left unchanged, the lengths of the portions of the timing belt 356 between the first driving roller 342 and the third and fourth intermediate rollers 352 and 354 are similarly decreased, and the lengths of the portions of the timing belt 356 between the second driven roller 344 and the first and second intermediate rollers 348 and 350 are similarly increased. As a result, as shown in FIG. 23A, the slide block 330 is moved vertically downward, i.e., the mounting plate 318 is moved downward along the Z-axis.

Figure 23B:
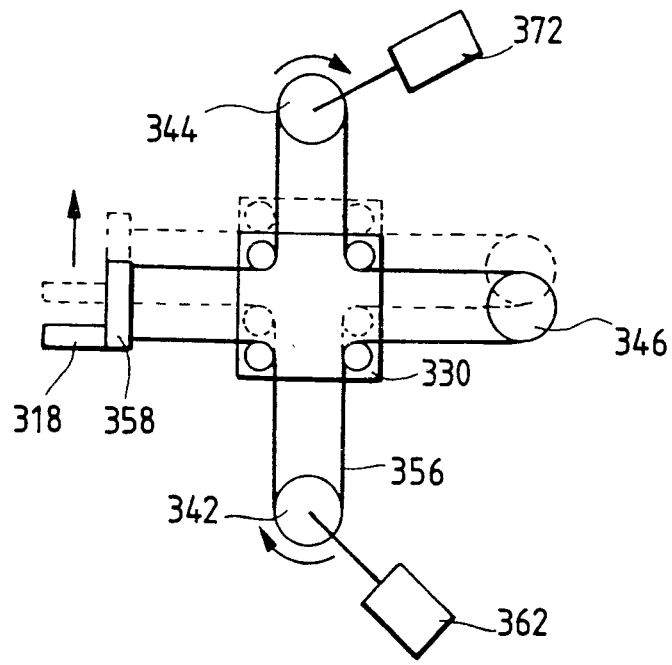

When the mounting plate 318 is to be moved upward along the Z-axis, the control unit 382 synchronously rotates the first and second driving motors 362 and 372 clockwise. As a result, in a state opposite to the state wherein the motors are rotated counterclockwise, length of the portions of the timing belt 356 between the first driving roller 342 and the third and fourth intermediate rollers 352 and 354 are similarly increased, and the lengths of the portions of the timing belt 356 between the second driving roller 344 and the first and second intermediate rollers 348 and 350 are similarly decreased. As a result, as shown in FIG. 23B, the slide block 330 is moved vertically upward, i.e., the mounting plate 318 is moved upward along the Z-axis.

When the mounting plate 318 is to project to the left along the R-axis, the control unit 382 synchronously rotates the first driving motor 362 clockwise and the second driving motor 372 counterclockwise. Upon clockwise rotation of the first driving motor 362, a portion of the timing belt 356 between the driven roller 346 and the third intermediate roller 352 is fed toward a portion between the third intermediate roller 352 and the first driving roller 342. A portion of the timing belt 356 between the third intermediate roller 352 and the first driving roller 342 is fed toward a portion between the first driving roller 342 and the fourth intermediate roller 354. A portion of the timing belt 356 between the first driving roller 342 and the fourth intermediate roller 354 is fed to a portion between the fourth intermediate roller 354 and the left movable block 338. In this manner, the length of the portion of the timing belt 356 between the fourth intermediate roller 354 and the left movable block 338 is increased.

However, upon counterclockwise rotation of the second driving motor 372, a portion of the timing belt 356 between the driven roller 346 and the second intermediate roller 350 is fed toward a portion between the second intermediate roller 350 and the second driving roller 344. A portion of the timing belt 356 between the second intermediate roller and the second driving roller 344 is fed toward a portion between the second driving roller 344 and the first intermediate roller 348. A portion of the timing belt 356 between the second driving roller 344 and the first intermediate roller 348 is fed toward a portion between the first intermediate roller 348 and the left movable block 338. In this manner, the length of the portion of the timing belt 356 between the first intermediate roller 348 and the left movable block 338 is increased.

The driving amounts of the first and second driving motors 362 and 372 are set to be equal to each other since these motors are synchronous with each other. Therefore, these feed amounts are equal to each other.

Figure 23C:
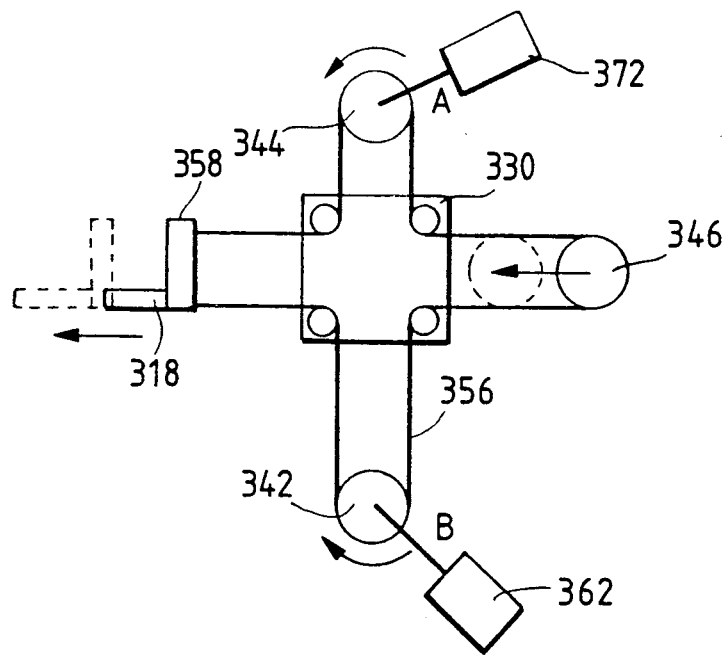

In this manner, the lengths of the portions of the timing belt 356 between the first driving roller 342 and the third and fourth intermediate rollers 352 and 354 and the lengths of the portions of the timing belt 356 between the second driving roller 344 and the first and second intermediate rollers 348 and 350 are similarly left unchanged, the lengths of the portions of the timing belt 356 between the first and fourth intermediate rollers 348 and 354 and the left movable block 338 are similarly increased, and the lengths of the portions of the timing belt 356 between the driven roller 346 and the second and third intermediate rollers 350 and 352 are similarly decreased. As a result, as shown in FIG. 23C, the second guide shafts 334a and 334b are moved to the left relative to the slide block 330, i.e., the mounting plate 318 projects to the left along the R-axis.

Figure 23D:
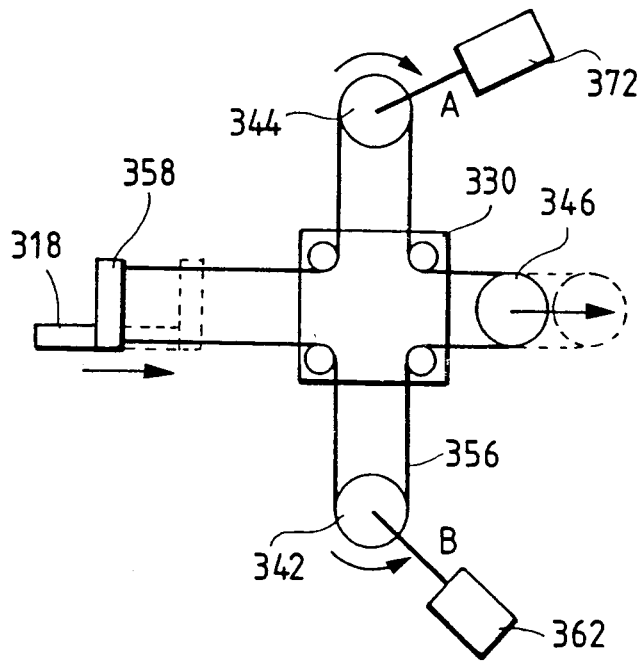

When the mounting plate 318 is to be retracted to the right along the R-axis, the control unit 382 synchronously rotates the first driving motor 362 counterclockwise and the second driving motor 372 clockwise. As a result, in a state opposite to the state wherein the mounting plate 318 projects to the left, the lengths of the portions of the timing belt 356 between the first and fourth intermediate rollers 348 and 354 and the left movable block 338 are similarly decreased, and the lengths of the portions between the driven roller 346 and the second and third intermediate rollers 350 and 352 are similarly increased. In this manner, as shown in FIG. 23D, the second guide shafts 334a and 334b are moved to the right relative to the slide block 330, i.e., the mounting plate 318 is retracted to the right along the R-axis, as shown in FIG. 23D.

When the mounting plate 318 is to be moved obliquely downward to the right, the control unit 382 rotates only the first driving motor 362 counterclockwise while the second driving motor 372 is kept OFF. As a result, the slide block 330 is moved downward, and the second guide shafts 334a and 334b are retracted to the right. In this manner, the mounting plate 318 is moved obliquely downward to the right at an inclination angle of 45 degrees.

When the mounting plate 318 is to be moved obliquely upward to the left, the control unit 382 rotates only the first driving motor 362 clockwise while the second driving motor 372 is kept OFF. As a result, the slide block 330 is moved upward, and the second guide shafts 334a and 334b project to the left. In this manner, the mounting plate 318 is moved obliquely upward to the left at an inclination angle of 45 degrees.

When the mounting plate 318 is to be moved obliquely downward to the left, the control unit 382 rotates only the second driving motor 372 counterclockwise while the first driving motor 362 is kept OFF. As a result, the slide block 330 is moved downward, and the second guide shafts 334a and 334b project to the left. In this manner, the mounting plate 318 is moved obliquely downward to the left at an inclination angle of 45 degrees.

When the mounting plate 318 is to be moved obliquely upward to the right, the control unit 382 rotates only the second driving motor 372 while the first driving motor 362 is kept OFF. As a result, the slide block 330 is moved upward, and the second guide shafts 334a and 334b are retracted to the right. In this manner, the mounting plate 318 is moved obliquely upward to the right at an inclination angle of 45 degrees.

When the mounting plate 318 is to be moved obliquely downward to the right at an arbitrary inclination angle (e.g., an angle smaller than 45 degrees with respect to the horizontal line), the control unit 382 rotates the second driving motor 372 clockwise, and rotates the first driving motor 362 counterclockwise. In this case, the driving amount of the second driving motor 372 is set to be smaller than that of the first driving motor 362. As a result, the slide block 330 is moved obliquely downward to the right at an inclination angle defined based on a ratio of the driving amounts of the first and second driving motors 362 and 372.

Similarly, when the mounting plate 318 is to be moved in a predetermined direction at an arbitrary inclination angle, the control unit 382 appropriately sets the rotation directions and rotation amounts of the first and second driving motors 362 and 372, thus achieving the above-mentioned movement operation.

The table below summarizes the driving control modes of the first and second driving motors 362 and 372 in the control unit 382, and movement operations of the mounting plate 318 based on the driving control.

TABLE

| Rotation Direction of First Driving Motor | Rotation Direction of Second Driving Motor | Moving Direction of Mounting Plate |
|---|---|---|
| Counterclockwise | Counterclockwise | ↓ |
| Clockwise | Clockwise | ↑ |
| Clockwise | Counterclockwise | ← |
| Counterclockwise | Clockwise | → |
| Counterclockwise | OFF | |
| Clockwise | OFF | |
| OFF | Counterclockwise | |
| OFF | Clockwise | |

More specifically, in the moving apparatus 316 with the above arrangement of this embodiment, the first and second driving motors 362 and 372 are disposed in a common state with respect to the R- and Z-axes as compared to a conventional arrangement wherein driving motors for respectively moving an object in the R- and Z-axis directions are exclusively arranged for the R- and Z-axes. As a result, a driving torque per driving motor can be decreased, and the driving motors 362 and 372 can be rendered compact, resulting a decrease in cost. In this embodiment, the rotation directions and the rotation amounts of the two driving motors 362 and 372 are appropriately selected, so that the mounting plate 318 as an object to be moved can be moved to an arbitrary position via an arbitrary path, as shown in the Table above. In particular, in this embodiment, the driving forces of the first and second driving motors 362 and 372 are transmitted through the timing belt in place of expensive ball screw shafts unlike in the prior art. As a result, the cost of the apparatus as a whole can be reduced. In this embodiment, the first and second driving motors 362 and 372 are mounted on the base 322 and the upper stationary block 326, and the weights of these first and second driving motors 362 and 372 will not serve as moving loads. Portions to be actually moved are only the slide block 330, the left movable block 358, the mounting plate 318 attached to the left movable block 358, and the finger device 320 attached to the left movable block 358. In this manner, the driving capacities of the first and second motors 362 and 372 can be small, and the cost for these motors can be decreased.

Since the total weight of portions to be moved can be reduced, a response time of a driving operation can be shortened, and movement performance can be improved, resulting in a short operation time.

A control content of the above-mentioned control unit 382 when an article (not shown) gripped by the finger device 320 attached to the mounting plate 318 is conveyed in so-called gate motion or arch motion will be described below with reference to FIGS. 24 to 28.

Figure 24:
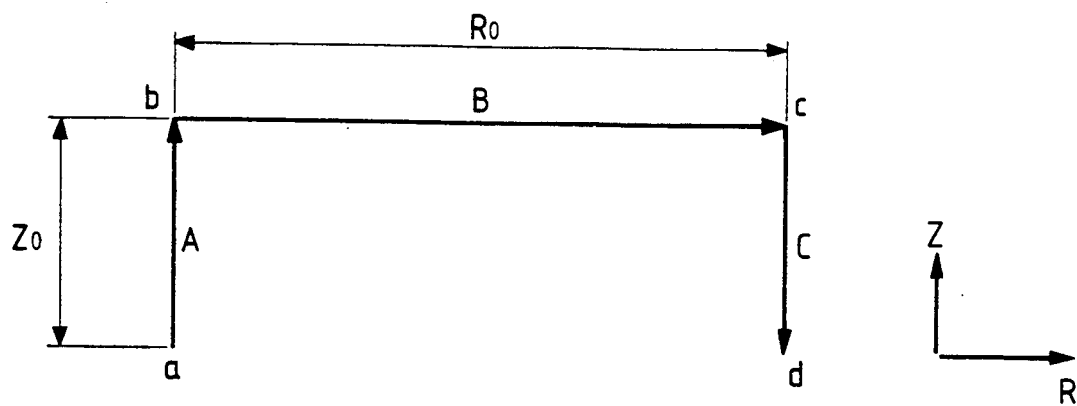
FIG. 24 is a view showing a moving state of a gate motion mode.
Figure 26:
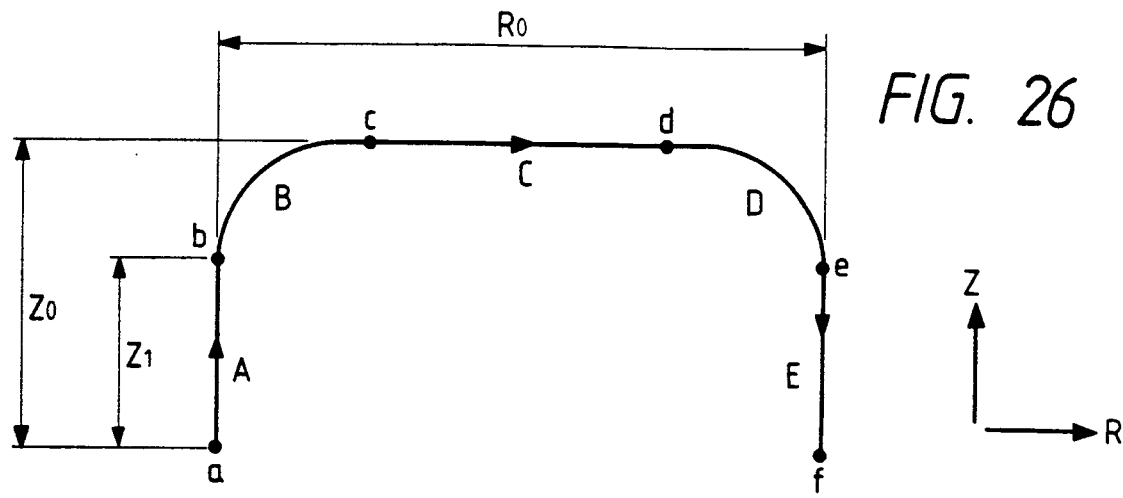
FIG. 26 is a view showing a moving state of an arch motion mode.

The "gate motion" means a moving mode for conveying an article from a start point a to an end point d along a linear path, as shown in FIG. 24. More specifically, in the gate motion mode, an article is moved along only the R- or Z-axis, and at a point b or c where a direction is changed, a moving speed is temporarily decreased to zero, thereby changing a moving direction. On the other hand, the "arch motion" mode is set as follows. That is, when an article is conveyed from a start point a to an end point f, the article is moved along a curved path, and its moving direction is changed by moving the article along a curved path without setting a moving speed to zero to change the direction, as shown in FIG. 26.

Control modes of the rotation speeds and directions of the first and second driving motors 362 and 372 in the control unit 382 when the gate motion mode shown in FIG. 24 is to be achieved will be described below with reference to FIG. 25. In the gate motion mode, as shown in FIG. 24, an article is moved upward from the start point a by a distance $Z_0$ along the Z-axis, as indicated by a moving range A in FIG. 24, and then changes a direction at the point b. As indicated by a moving range B, the article is moved by a distance $R_0$ along the R-axis, and then changes its direction at the point c. The article is then moved downward by the distance $Z_0$ along the Z-axis, as indicated by a moving range C, and reaches the end point d.

In the following description, a positive (+) rotation speed means one obtained when the motor is rotated clockwise, and a negative (−) rotation speed means one obtained when the motor is rotated counterclockwise.

Figure 25:
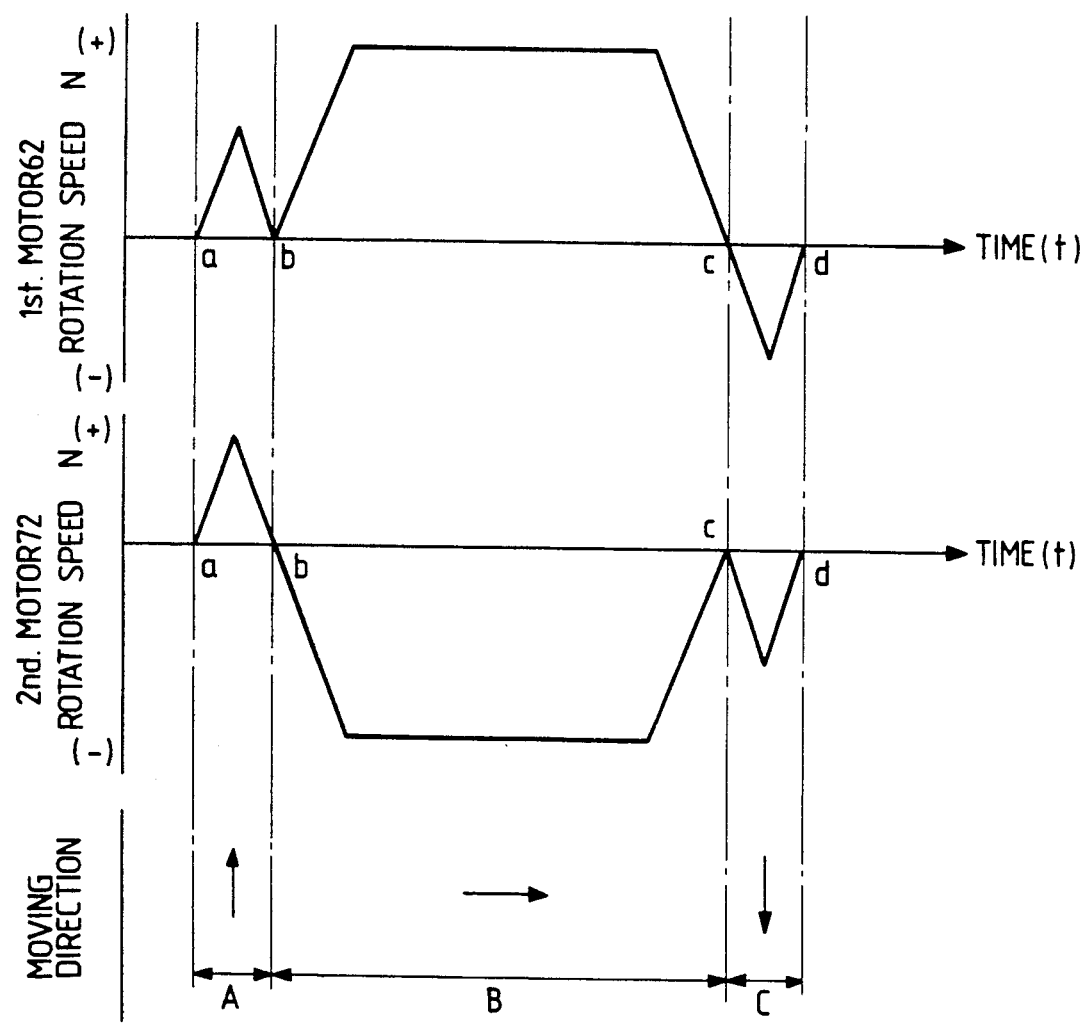
FIG. 25 is a chart showing speed patterns of first and second driving motors for achieving gate motion.

In order to achieve the gate motion mode, the control unit 382 rotates the first and second driving motors 362 and 272 clockwise in the same pattern in the moving range A from the start point a, and stops rotation at the point b, as shown in FIG. 25. As a result, in the moving range A, the mounting plate 318 is moved upward along the Z-axis. In the moving range B from the point b, the control unit 382 rotates the first driving motor 362 counterclockwise and the second driving motor 372 clockwise in the same pattern, and stops their rotation at the point c. As a result, in the moving range B, the mounting plate 318 is moved to the right in FIG. 24 along the R-axis in the moving range B. In the moving range C from the point c, the control unit 382 rotates the first and second driving motors 362 and 372 counterclockwise in the same pattern, and stops their rotation at the end point d. As a result, in the moving range C, the mounting plate 18 is moved downward along the Z-axis.

In this manner, when the control unit 382 rotates the first and second driving motors 362 and 372 in the speed patterns shown in FIG. 25, the mounting plate 318, i.e., an article gripped by the finger device 320 attached to the mounting plate 318 is conveyed from the start point a to the end point d in the gate motion mode, as shown in FIG. 24.

The relationship between the rotation speeds of the first and second driving motors 362 and 372 and the moving amounts $Z_0$ and $R_0$ in the gate motion mode is given as follows. That is, the moving amount along the Z-axis is defined by a value obtained by dividing a sum of the rotation amounts of the first and second driving motors 362 and 372 by 2, and the moving amount along the R-axis is defined by a value obtained by dividing a difference between the rotation amounts of the first and second driving motors 362 and 372 by 2. Therefore, $Z_0$ and $R_0$ are respectively given by:

$$Z_0 = \frac{\pi D}{60} \left( \frac{\Delta N_A + \Delta N_B}{2} \right) \times \frac{D_1}{D_0}$$

$$R_0 = \frac{\pi D}{60} \left( \frac{\Delta N_A + \Delta N_B}{2} \right) \times \frac{D_1}{D_0}$$

where D is the pitch diameter of each of the driving rollers 342 and 344, $\Delta N_A$ and $\Delta N_B$ are the rotation speeds (rotation angles) of the first and second driving motors 362 and 372. $D_0$ is the pitch diameter of the driven pulley 360, and $D_1$ is the pitch diameter of each of the driving pulleys 364 and 374.

Control modes of the rotation speeds and directions of the first and second driving motors 362 and 372 in the control unit 382 when the arch motion mode shown in FIG. 24 is to be achieved will be described below with reference to FIG. 27. In the arch motion mode, an article is linearly moved upward from the start point a along the Z-axis by the distance $Z_0$, as indicated by the moving range A. In the moving range B from the point b, the moving direction is gradually changed, and a moving state completely along the R-axis is attained at the point c. In the moving ranges A and B, a moving distance along the Z-axis is represented by $Z_1$. Therefore, the moving distance along the Z-axis in the moving range B is given by $(Z_1 - Z_0)$.

In the moving range C from the point c, the article is linearly moved by the distance $R_0$ along the R-axis, and a moving direction is gradually changed at the point d. At the point e, a moving state completely along only the Z-axis is attained. In the moving ranges B, C, and D, a moving distance along the R-axis is represented by $R_1$. As indicated by a moving range E from the point e, the article is moved downward along the Z-axis by the distance $Z_0$, and reaches the end point f.

Figure 27:
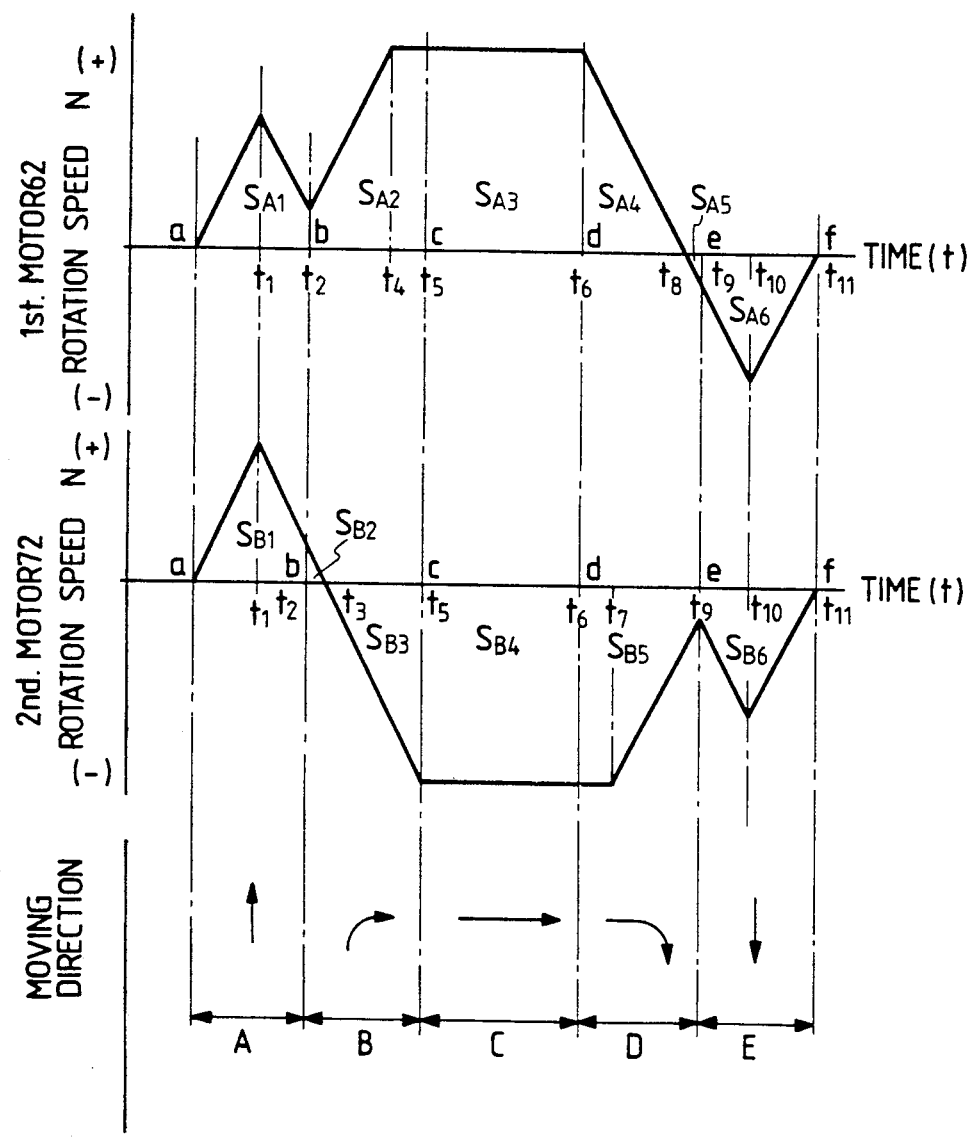
FIG. 27 is a chart showing speed patterns of first and second driving motors for achieving arch motion.
Figure 28:
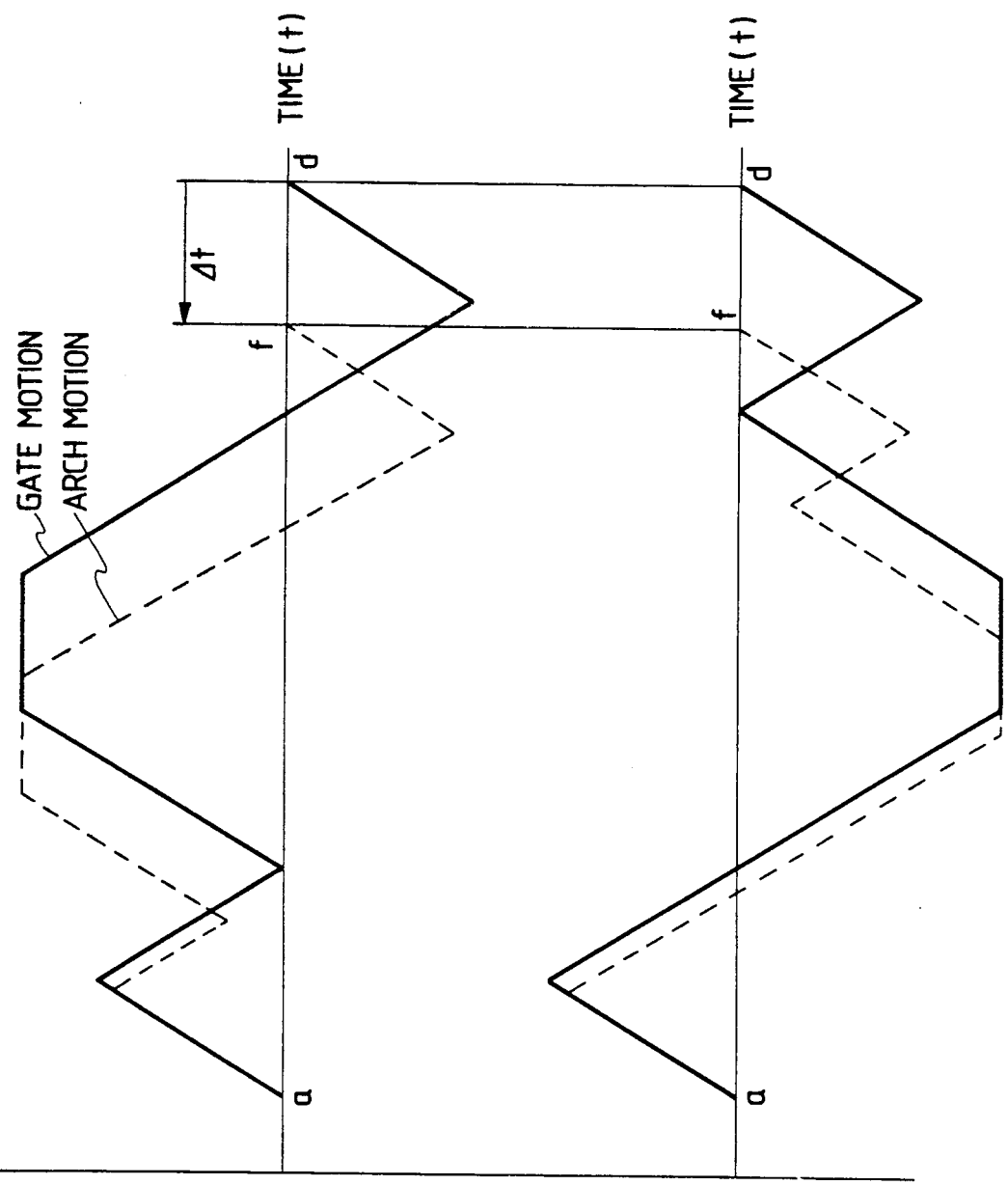
FIG. 28 is a chart showing a difference between tact times of gate motion and arch motion.
Figure 29:
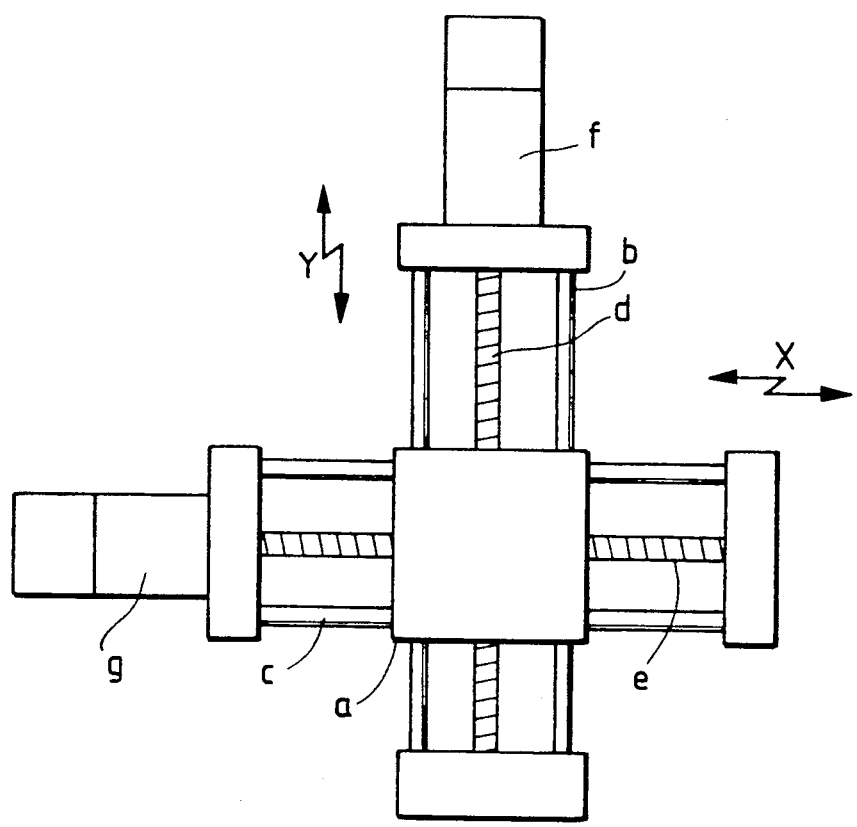
FIG. 29 is a schematic front view showing a structure of a conventional orthogonal two-axis moving apparatus.

In order to achieve the arch motion mode described above, the control unit 382 rotates the first and second driving motors 362 and 372 clockwise in the same pattern in the moving range A between the start point a and the point b, as shown in FIG. 27. The control unit 382 linearly increases the rotation speeds of the motors up to time $t_1$, and then linearly decreases them after time $t_1$. At time $t_2$ immediately before time $t_3$ at which the rotation speed of the second driving motor 372 becomes zero, the article reaches the point b. Note that a rotation speed at time $t_1$ is represented by $N_1$, and a rotation speed at time $t_2$ is represented by $N_2$.

After time $t_2$ when the article reaches the point b, the first driving motor 362 is rotated clockwise so that its rotation speed is increased again up to a maximum rotation speed $N_{MAX}$. At time $t_4$, the maximum rotation speed $N_{MAX}$ is reached, and thereafter, is maintained until time $t_6$ (to be described later). Meanwhile, the rotation speed of the second driving motor 372 reaches zero at time $t_3$, and thereafter, its rotation direction is switched. Thus, the motor 372 is rotated counterclockwise so that its rotation speed is increased up to the maximum rotation speed $N_{MAX}$. At time $t_5$ delayed from time $t_4$, the rotation speed of the motor 372 reaches the maximum rotation speed $N_{MAX}$, and the maximum rotation speed $N_{MAX}$ is maintained until time $t_7$ delayed from time $t_6$.

At time $t_5$ when the second driving motor 372 reaches the maximum rotation speed $N_{MAX}$, the article reaches the above-mentioned point c. More specifically, a region where the article is moved from time $t_2$ to time $t_5$ defines the moving range B.

On the other hand, at time $t_6$ when the first driving motor 362 is decelerated from the maximum rotation speed $N_{MAX}$, the article reaches the above-mentioned point d. More specifically, a state wherein the first and second driving motors 362 and 372 are rotated in the clockwise and counterclockwise directions at the maximum rotation speed $N_{MAX}$, respectively, defines the moving range C between the points c and d.

After the article reaches the point d, the rotation speed of the first driving motor 362 is gradually decreased, and reaches zero at time $t_8$. Furthermore, the rotation direction of the motor 362 is switched to the counterclockwise direction, and its rotation speed is gradually increased again. Meanwhile, the second driving motor 372 is kept rotated at the maximum rotation speed $N_{MAX}$ until time $t_7$ after time $t_6$ when the article passes by the point d. After time $t_7$, the rotation speed of the motor 372 is gradually decreased. At time $t_9$ when the rotation speed reaches the rotation speed $N_2$ after time $t_8$, the rotation speed of the motor 372 begins to increase. In this manner, at time $t_9$, the article reaches the point e.

After the article passes by the point e, the first, and second driving motors 362 and 372 are rotated counterclockwise. In this case, the rotation speeds of the motors are linearly increased until time $t_{10}$ when the rotation speed reaches the rotation speed $N_1$. After time $t_{10}$, the rotation speeds of the motors are linearly decreased. At time $t_{11}$ when the rotation speeds of both the first and second driving motors 362 and 372 reach zero, the article reaches the end point f.

In this manner, when the control unit 382 rotates the first and second driving motors 362 and 372 in the speed patterns shown in FIG. 27, the mounting plate 318, i.e., the article gripped by the finger device 320 attached to the mounting plate 318 can be conveyed from the start point a to the end point f in the arch motion mode, as shown in FIG. 26.

Times $t_1$ to $t_{11}$ that define this arch motion are given as follows in association with the rotation speeds $N_1$, $N_2$, and $N_{MAX}$ of the first and second driving motors 362 and 372, and the moving amounts $Z_0$ and $R_0$.

More specifically, in FIG. 27, for example, the rotation amount of the first driving motor 362 up to the point b is given by an area $S_{A1}$ which is surrounded by a change line of the rotation speed changed until me $t_2$, and the rotation amount of the second driving motor 372 up to the point b is given by an area $S_{B1}$ which is surrounded by a change line of the rotation speed changed until time $t_2$.

Similarly, the rotation amounts of the first driving motor 362 between the points b and c, between points c and d, between d and e, and between points e and f are respectively given by an area $S_{A2}$ from time $t_2$ to time $t_5$, a sum of areas $S_{A4}$ and $S_{A5}$ from time $t_6$ to time $t_9$, and an area $S_{A6}$ from time $t_9$ to time $t_{11}$. The above-mentioned rotation amounts of the second driving motor 372 are respectively given by a sum of areas $S_{B2}$ and $S_{B3}$, an area $S_{B4}$, an area $S_{B5}$, and an area $S_{B6}$.

A counterclockwise, i.e., $(-)$ rotation amount is defined as a negative value with respect to a clockwise, i.e., $(+)$ rotation amount.

As described above, the moving amount along the Z-axis is defined by the value obtained by dividing a sum of the rotation amounts of the first and second driving motors 362 and 372 by 2, and the moving amount along the R-axis is defined by a value obtained by dividing a difference between the rotation amounts of the first and second driving motors 362 and 372 by 2. Therefore, the total moving distance along the Z-axis, the linear moving distance $Z_1$ along the Z-axis, and the total moving distance $R_0$ along the R-axis are respectively given by:

$$Z_1 = \frac{\pi D}{60} \left( \frac{S_{A1} + S_{B1}}{2} \right) \times \frac{D_1}{D_0} \tag{1}$$

$$Z_0 = \frac{\pi D}{60} \left( \frac{S_{A1} + S_{A2}}{2} + \frac{S_{B1} + S_{B2} + S_{B3}}{2} \right) \times D_1/D_0 \tag{2}$$

$$R_0 = \frac{\pi D}{60} \left( \frac{S_{A2} + S_{A3} + S_{A4} + S_{A5}}{2} - \frac{S_{B2} + S_{B3} + S_{B4} + S_{B5}}{2} \right) \times \frac{D_1}{D_0} \tag{3}$$

Paying attention to $Z_1$ in equation (1), $Z_1$ can be expressed as a function of the corresponding rotation speeds and times, as follows. That is, each of the areas $S_{A1}$ and $S_{B1}$ until time $t_2$ can be defined by an area obtained by subtracting an area ($S_{B2}$) of a right-angled triangle from time $t_2$ to time $t_3$ from an area of an isosceles triangle from the beginning to time $t_3$, as follows:

$$S_{A1} = S_{B1} = \frac{t_3 N_1}{2} - \frac{(t_3 - t_2)N_2}{2}$$

Since the rise time and the falling time of the rotation speed up to the maximum rotation speed are equal to each other, $$t_3 = 2t_1 \tag{4}$$

As a result, we have:

$$Z_1 = \frac{\pi D}{60 \times 2} \{2t_1 N_1 - (2t_1 - t_2)N_2\} \times D_1/D_0 \tag{5}$$

For $Z_0$ in equation (2), this moving distance along the Z-axis in the moving range B is defined by an area of a rectangle from time $t_4$ to time $t_5$ in the first driving motor 362 since an area from time $t_3$ to time $t_4$ in the first driving motor 362 and an area from time $t_3$ to time $t_5$ in the second driving motor 372 have the same value with opposite signs and cancel with each other. Therefore, $Z_0$ is expressed by:

$$Z_0 = Z_1 + \frac{\pi D}{60 \times 2} (t_5 - t_4) N_{MAX} \times \frac{D_1}{D_0} \tag{6}$$

Note that in equation (6), we have:

$$t_5 - t_4 = (2t_1 + \Delta t) - \{\Delta t + 2(t_2 - t_1)\}$$
$$= 2(2t_1 - t_2)$$

where $\Delta t$ is defined as a time until $N_{MAX}$ is reached.

As a result, $Z_0$ can be expressed by:

$$Z_0 = Z_1 + \frac{\pi D}{60 \times 2} \times 2(2t_1 - t_2) \times \frac{D_1}{D_0} \tag{7}$$
$$= \frac{\pi D}{60 \times 2} [\{2t_1 N_1 - (2t_1 - t_2)N_2\} + 2(t_1 - t_2)N_{MAX}] \times \frac{D_1}{D_0}$$

Similarly, the above-mentioned $R_0$ can be expressed by:

$$R_0 = \frac{\pi D}{60 \times 2} \times 2 \times \{(t_6 - t_4)N_{MAX} + \Delta t N_{MAX} - (t_3 - t_2)N_{MAX}\} \times D_1/D_0 \quad (8)$$

From equations (6), (7), and (8) obtained in this manner, $t_1$, $t_2$, and $t_6$ are obtained. if $$\alpha = Z_1 \frac{\Delta t 120}{N_{MAX} \pi D} \times \frac{D_1}{D_0} \quad (9)$$

$$\beta = Z_0 \frac{\Delta t 120}{N_{MAX} \pi D} \times \frac{D_1}{D_0} \quad (10)$$

$$\gamma = \alpha - \beta \quad (11)$$

we have:

$$t_2 = \frac{-4\gamma \pm \sqrt{32\gamma^2 + 128\Delta t^2 \alpha}}{8\Delta t} \quad (12)$$

then, $$t_2 = \frac{-4\gamma \pm \sqrt{32\gamma^2 + 128\Delta t^2 \alpha}}{8\Delta t} \quad (13)$$

$$t_6 = \frac{120 R_0}{2\pi D} \times \frac{D_1}{D_0} + 2(t_2 - t_1) + \frac{(2t_1 - t_2)^2}{\Delta t} \quad (14)$$

From the relationship shown in FIG. 27, as shown in equation (4), the following relations can be obtained in addition to $t_3 = 2t_1$:

$$t_4 = \Delta t + (t_2 - t_1) \times 2 \quad ...(15)$$

$$t_5 = 2t_1 + \Delta t \quad ...(16)$$

$$t_7 = t_{11} - t_4 \quad ...(17)$$

$$t_8 = t_6 + \Delta t \quad ...(18)$$

$$t_9 = t_{11} - t_2 \quad ...(19)$$

$$t_{10} = t_{11} - t_1 \quad ...(20)$$

$$t_{11} = t_6 + \Delta t + 2t_1 \quad ...(21)$$

In this manner, times $t_1$ to $t_{11}$ are defined by equation (4) and equations (12) to (21). In other words, in FIG. 26, the total moving distance $Z_0$ along the Z-axis, the total moving distance $R_0$ along the R-axis, and the linear moving distance along the Z-axis are set in advance, and the maximum rotation speed $N_{MAX}$, time $\Delta t$ required until the maximum rotation speed $N_{MAX}$ is reached, the pitch diameter D of each of the driving rollers 342 and 340, the pitch diameter $D_0$ of each of the driven pulleys 360 and 368, and the pitch diameter $D_1$ of each of the driving pulleys 364 and 374 are given as constants. Therefore, times $t_1$ to $t_{11}$ for defining the arch motion can be sequentially determined. That is, when the above-mentioned constants are set and defined in this manner, the mounting plate 318 can be controlled by the control unit 382 in the arch motion mode.

A difference in tact times $t_G$ and $t_A$ associated with moving times from the start point to the end point when the moving distances $Z_0$ along the Z-axis are set to be the same value, e.g., 100 mm, the moving distances $R_0$ along the R-axis are set to be the same value, e.g., 300 mm in both the gate and arch motion modes shown in FIGS. 24 and 26 in the moving apparatus 316 with the above structure, will be described below.

First, the tact time $t_G$ in the gate motion mode is obtained. $\Delta t$ as a rise time to the maximum speed is set to be 0.2 sec, and maximum moving speeds $V_Z$ and $V_R$ along the Z- and R-axes are respectively set to be 1,000 mm/s. Under these conditions, the relationship between the maximum speed and a rise time $t_0$ to an arbitrary speed $V_0$ is given by:

1,000 : 0.2 = $V_0$ : $t_0$

From this relationship, we have:

$$V_0 = \frac{1,000 t_0}{0.2} = 5,000 t_0 \quad (22)$$

Since movement in the Z-axis direction can reach the maximum speed, the following condition can be established:

$$V_0 \cdot t_0 = 100 \quad ...(23)$$

Therefore, from equations (22) and (23), $$t_0^2 = 100/5,000$$

and, hence, $t_0 = 0.141$ sec.

As a result, in FIG. 24, a time required for moving an article in the moving range A or C, i.e., i.e., a time $t_{ZG}$ required for moving an article along the Z-axis is given by the following equation since the rise and falling times are equal to each other:

$$t_{ZG} = 2t_0 = 0.282 \text{ sec}$$

On the other hand, for movement along the R-axis, a time in which an article is moved at the maximum speed $V_R$ is represented by $t_{MAX}$. $R_0$ is given by:

$$R_0 = \frac{0.2 \times 1,000}{2} \times 2 + V_R \cdot t_{MAX}$$

and, $t_{MAX}$ can be expressed by:

$$t_{MAX} = \frac{300 - 200}{1,000} = 0.1$$

As a result, in FIG. 24, a time required for moving an article in the moving range B, i.e., a time $t_{RG}$ for moving the article along the R-axis is given by:

$$t_{RG} = 0.2 + 0.1 + 0.2 = 0.5 \text{ sec}$$

Therefore, the tact time $t_G$ in the gate motion mode is:

$$t_G = t_{ZG} + 2 + t_{RG} = 0.282 \times 2 + 0.5 = 1.064 \text{ sec}$$

In the arch motion mode, in addition to the same conditions as those in the gate motion mode, the pitch diameter D of each of the driving rollers 342 and 344 is assumed to be 15.28 mm, the pitch diameter $D_0$ of each of the driven pulleys 360 and 368 is assumed to be 45.84 mm, the pitch diameter of each of the driving pulleys 364 and 374 is assumed to be 19.1 mm, the maximum rotation speed $N_{MAX}$ of each of the driving motors 362 and 372 is assumed to be 3,000 rpm, and the linear moving distance $Z_1$ along the Z-axis is assumed to be 50 mm.

Thus, $V_Z = V_R = 1,000$ mm/s. Therefore, from equations (9), (10), and (11), we have:

$$\alpha = Z_1 \frac{\Delta t 120}{N_{MAX}\pi D} \times \frac{D_1}{D_0} = 0.02$$

$$\beta = Z_0 \frac{\Delta t 120}{N_{MAX}\pi D} \times \frac{D_1}{D_0} = 0.04$$

$$\gamma = \alpha - \beta = 0.02$$

As a result, equations (12) to (14) can yield:

$t_1 = 0.106$ sec $t_2 = 0.162$ sec $t_6 = 0.425$ sec

In addition, equation (21) can yield:

$t_A = t_{11} = t_6 + \Delta t + 2 \times t_1 = 0.837$ sec

In this manner, when an article is conveyed using the moving apparatus 316, the arch motion mode can convey an article in a tact time shorter than the gate motion mode by:

$\Delta t = 1.064 - 0.837 = 0.227$ sec

As described above, the orthogonal two-axis moving apparatus according to the present invention comprises a first movable body movable along one direction, a second movable body movable along the other direction perpendicular to the one direction, a to-be-moved portion defined in a portion of the second movable body, a driving means for moving the first and second movable bodies in their moving directions to move the moved portion to an arbitrary position, and a control means, connected to the driving means, for selectively executing first moving control for linearly moving the moved portion along the one or the other direction, and second moving control for moving the moved portion along a curved path.

Therefore, according to the present invention, an orthogonal two-axis moving apparatus which can move one end portion of an arm to an arbitrary position within a plane having one axis parallel to the extending direction of the arm, and the other axis perpendicular to the one axis, can be provided.

What is claimed is:

1. An orthogonal two-axis moving apparatus comprising:
   a first guide member which extends along a first direction and is attached to a stationary position;
   a slide bock which is slidably supported on said first guide member and is moveable in the first direction;
   a second guide member which extends along a second direction perpendicular to the first direction is supported by said slide block to be movable in the second direction;
   first and second rollers pivotally supported on two ends of said first guide member;
   a third roller pivotally supported on a first end of said second guide member;
   intermediate rollers pivotally supported on four corner portions of said slide block;
   a coupling belt, two ends of which are fixed to a second end of said second guide member and which is looped in a cross shape on said first to third rollers and said four intermediate rollers;
   first origin detection means for detecting an origin position of said slide block along the first direction; and
   second origin detection means for detecting an origin position of said second guide member along the second direction.

2. An apparatus according to claim 1, further comprising:
   first and second stationary blocks attached to first and second ends of said first guide member, respectively, for rotatably and axially supporting said first and second rollers; and
   a first movable block for rotatably and axially supporting said third roller and a second movable block to which the two ends of said coupling belt are fixed, said first and second movable blocks being attached to the first end and the second end of said second guide member, respectively, and
   wherein said first origin detection means is arranged between said slide block and said first or second stationary block, and
   said second origin detection means is arranged between said slide block and said first or second movable block.

3. An apparatus according to claim 2, wherein said first and second rollers are respectively rotated by first and second driving motors attached to said first and second stationary blocks, and
   first and second rotary encoders for detecting rotation amounts of said first and second driving motors are respectively attached to said first and second driving motors.

4. An apparatus according to claim 3, wherein said first origin detection means comprises a first home position sensor attached to said first or second stationary bock, and a first to-be-detected member attached to said slide block, wherein when said slide block comes closer to said first position sensor arranged on said first or second stationary block, said first home position sensor is actuated.

5. An apparatus according to claim 4, wherein said first origin detection means comprises control means for driving said first and second driving motors to move said slide block so that said first position sensor is temporarily disposed in a position where said first position sensor is not turned on by said first to-be-detected member, and thereafter, to move said slide block to a position wherein said first home position sensor is turned on by said first to-be-detected member, and then driving said first and second driving motors so that zero phases of said first and second rotary encoders are turned on.

6. An apparatus according to claim 3, wherein said second origin detection means comprises a second home position sensor attached to said first or second movable block, and a second to-be-detected member attached to said slide block, wherein when said slide block comes closer to said second home position sensor arranged on said first or second home block, said second home position sensor is actuated.

7. An apparatus according to claim 6, wherein said second origin detection means comprises control means for driving said first and second driving motors to move said slide block so that said second position sensor is temporarily disposed in a position where said second position sensor is not turned on by said second to-bedetected member, and thereafter, to move said slide block to a position where said second home position sensor is turned on by said second to-be-detected member, and then driving said first and second driving motors so that zero phases of said first and second rotary encoders are turned on.

8. An orthogonal two-axis moving apparatus comprising:
   a first guide member which extends along a first direction and is attached to a stationary position;
   a slide block which is slidably supported on said first guide member and is movable in the first direction;
   a second guide member which extends along a second direction perpendicular to the first direction and is supported by said slide block to be movable in the second direction;
   first and second rollers pivotally supported on two ends of said first guide member;
   a third roller pivotally supported on a first end of said second guide member;
   four intermediate rollers pivotally supported on four corner portions of said slide block; and
   a coupling belt, both ends of which are fixed to a second end of said second guide member, wherein said coupling belt extends from both ends toward first and second intermediate rollers, and is turned by said first and second intermediate rollers and directed in opposite directions to said first and second rollers of said first guide member, and is wound around said first and second rollers and returns to third and fourth intermediate rollers and is turned by said third and fourth intermediate rollers and wound around said third roller of said second guide member.

9. An apparatus according to claim 8, wherein first and second driving motors are respectively attached to two ends of said first guide member, and said first and second rollers are respectively rotated by said first and second driving motors.

10. An apparatus according to claim 9, wherein said first and second driving motors respectively comprise brake mechanisms for locking rotation operations of corresponding driving shafts when power supply is stopped.

11. An apparatus according to claim 9, wherein a brake mechanism for locking rotation of said third roller when power supply to said first and second driving motors is stopped is attached to said third roller.

12. An apparatus according to claim 8, wherein each of said first to third rollers comprises a toothed pulley,
   said coupling belt comprises a timing belt having a toothed inner surface, and
   each of said four intermediate rollers comprises an idle roller for guiding a flat outer surface of said timing belt.

13. An orthogonal two-axis moving apparatus comprising:
   a first guide member which extends along a first direction and is attached to a stationary position;
   a slide block which is slidably supported on said first guide member and is movable in the first direction;
   a second guide member which extends along a second direction perpendicular to the first direction and is supported by said slide block to be movable in the second direction;
   a first roller pivotally supported on a first end of said first guide member;
   second and third rollers pivotally supported on first and second ends, respectively, of said second guide member;
   four intermediate rollers pivotally supported on four corner portions of said slide block; and
   a coupling belt, both ends of which are fixed to a second end of said first guide member, wherein said coupling belt extends from both ends toward said first and second intermediate rollers, and is turned by said first and second intermediate rollers and directed in opposite directions to said second and third rollers of said second guide member, and is wound around said second and third rollers and returns to third and fourth intermediate rollers and is turned by said third and fourth intermediate rollers and wound around said first roller of said first guide member.

14. An apparatus according to claim 13, wherein a driving motor is attached to one end of said first guide member, and said first roller is rotated by said driving motor, and
   brake mechanisms which are selectively operated are attached to said second and third rollers.

15. An orthogonal two-axis moving apparatus comprising:
   a first guide member which extends along a first direction and is attached to a stationary position;
   a slide block which is slidably supported on said first guide member and is movable in the first direction;
   a second guide member which extends along a second direction perpendicular to the first direction and is supported by said slide block to be movable in the second direction;
   first and second driven rollers pivotally supported on two ends of said first guide member;
   a third driven roller pivotally supported on a first end of said second guide member;
   four intermediate rollers pivotally supported on four corner portions of said slide block;
   a coupling belt, both ends of which are fixed to a second end of said second guide member, wherein said coupling belt extends from both ends toward first and second intermediate rollers, and is turned by said first and second intermediate rollers and directed in opposite directions to said first and second rollers of said first guide member, and is wound around said first and second rollers and returns to third and fourth intermediate rollers and is turned by said third and fourth intermediate rollers and wound around said third roller of said second guide member; and
   first and second driving motors, attached to said slide block, for respectively driving two out of said four intermediate rollers located toward said first end of said second guide member.

16. An apparatus according to claim 15, wherein each of said four intermediate rollers comprises a toothed pulley,
   said coupling belt comprises a timing belt having a toothed outer surface, and
   each of said first to third driven rollers comprises an idle roller for guiding a flat inner surface of said timing belt.

17. An orthogonal two-axis moving apparatus comprising:
   a first guide member which extends along a first direction and is attached to a stationary position;

a slide block which is slidably supported on said first guide member and is movable in the first direction;

a second guide member which extends along a second direction perpendicular to the first direction and is supported by said slide block to be movable in the second direction;

first and second upper driven rollers pivotally supported and juxtaposed on a first end of said first guide member;

first and second lower driven rollers pivotally supported and juxtaposed on a second end of said first guide member;

a third driven roller pivotally supported on a first end of said second guide member;

four intermediate rollers pivotally supported on four corner portions of said slide block;

first and second driving rollers which are attached to said slide block and are rotatably supported between corresponding pairs of said intermediate rollers which are adjacent in the second direction;

a coupling belt, both ends of which are fixed to a second end of said second guide member, wherein said coupling belt extends from both ends toward first and second intermediate rollers, and is turned by said first and second intermediate rollers and directed in opposite directions to said first upper driven roller and said first lower driven roller, wound therearound and directed to said first and second driving rollers and wound therearound and directed in opposite directions to said second upper driven roller and said second lower driven roller and wound therearound and directed to third and fourth intermediate rollers and turned by said third and fourth rollers and wound around said third driven roller; and first and second driving motors, attached to said slide block, for rotating said first and second driving rollers.

18. An orthogonal two-axis moving apparatus comprising:

a first guide member which extends along a first direction and is attached to a stationary position;

a slide block which is slidably supported on said first guide member and is movable in the first direction;

a second guide member which extends along a second direction perpendicular to the first direction and is supported by said slide block to be movable in the second direction;

first and second upper driven rollers pivotally supported and juxtaposed on a first end of said first guide member;

first and second lower driven rollers pivotally supported and juxtaposed on a second end of said first guide member;

a pair of third driven rollers pivotally supported and juxtaposed on a first end of said second guide member;

a pair of fourth driven rollers pivotally supported and juxtaposed on a second end of said second guide member;

a plurality of intermediate rollers pivotally supported on four corner portions and portions between adjacent corners of said slide block, a coupling belt, both ends of which are fixed to a second end portion side of said slide block, wherein said coupling belt extends from both ends toward said pair of fourth driven rollers of said second guide member, returns to first and second intermediate rollers and is turned by said first and second intermediate rollers and directed in opposite directions to said first upper driven roller and said first lower driven roller, respectively, wound therearound and directed to third and fourth intermediate rollers and wound therearound, and directed in opposite directions to said second upper driven roller and said second lower driven roller and wound therearound and directed to fifth and sixth intermediate rollers and directed to said pair of third driven rollers on said second guide member and wound therearound and directed to a seventh intermediate roller; and first and second driving motors for rotating said third and fourth intermediate rollers.

19. A driving apparatus for robot hand, comprising:

a first guide member which extends along a first direction, is attached to a stationary position and has first and second rollers, a second guide member which extends along a second direction perpendicular to the first direction, wherein a third roller is provided on a first end of said second guide member and a mounting portion is provided on a second end of said second guide member, a slide member which is slidably supported on said first guide member, is movable in the first direction and has four intermediate rollers, first and second driving means for transmitting a driving force to said first and second rollers, respectively, a coupling belt having both ends fixed to one end of said first or second guide member and which is looped in a substantially cross shape on said intermediate rollers and said first, second and third rollers, wherein said coupling belt reverses direction at least once in the first direction and the second direction, and control means for controlling a driving direction of said first and second driving means and which expands and contracts a distance between said intermediate rollers and said first, second and third rollers to manipulate said hand.

* * * * *

UNITED STATES PATENT AND TRADEMARK OFFICE
CERTIFICATE OF CORRECTION

PATENT NO. : 5,063,334

DATED : November 5, 1991

INVENTOR(S) : Takeo Tanita, et al.

It is certified that error appears in the above-identified patent and that said Letters Patent is hereby corrected as shown below:

ON THE TITLE PAGE:

Item [56], References Cited:

UNITED STATES PATENT DOCUMENTS, "Etchepare et al." should read --Etcheparre et al.--.

Item [57], Abstract:

Line 20, "for detecting an origin" should read --detects an original--.

COLUMN 1:

Line 26, "driving motor c" should read --driving motor g--.

COLUMN 9:

TABLE

| "Moving Direction of Mounting Plate" | should read | --Moving Direction of Mounting Plate-- |
|---|---|---|
| ↓ | | ↓ |
| ↑ | | ↑ |
| → | | → |
| ← | | ← |
| | | ↘ |
| | | ↖ |
| | | ↗ |
| | | ↙ |

UNITED STATES PATENT AND TRADEMARK OFFICE
CERTIFICATE OF CORRECTION

PATENT NO. : 5,063,334

DATED : November 5, 1991

INVENTOR(S) : Takeo Tanita, et al.

It is certified that error appears in the above-identified patent and that said Letters Patent is hereby corrected as shown below:

COLUMN 10:

Line 4, "escape" should be deleted.
    Line 13, "turned" should read --turned on--.

COLUMN 17:

Line 1, "scale 138B" should read --198B--.

COLUMN 18:

Line 6, "second driven roller 144" should read --second driving roller 144--.

COLUMN 20:

TABLE

| "Moving Direction of Mounting Plate" | should read | --Moving Direction of Mounting Plate-- |
|---|---|---|
| ↓ | | ↓ |
| ↑ | | ↑ |
| → | | → |
| ← | | ← |
| | | ↖ |
| | | ↖ |
| | | ↙ |
| | | ↙ |

UNITED STATES PATENT AND TRADEMARK OFFICE
CERTIFICATE OF CORRECTION

PATENT NO. : 5,063,334
DATED : November 5, 1991
INVENTOR(S) : Takeo Tanita, et al.

It is certified that error appears in the above-identified patent and that said Letters Patent is hereby corrected as shown below:

COLUMN 22:

Line 11, "moving apparatus 116," should read --moving apparatus 116'--.
    Line 54, "L-In" should read --¶ In--.

COLUMN 25:

Line 47, "base 22" should read --base 222--.

COLUMN 26:

Line 36, "firs" should read --first--.

COLUMN 27:

Line 37, "scale 238B" should read --scale 298B--.

COLUMN 28:

Line 23, "timing belt 156" should read --timing belt 256--.

COLUMN 29:

Line 29, "an" should read --and--.

UNITED STATES PATENT AND TRADEMARK OFFICE
CERTIFICATE OF CORRECTION

PATENT NO. : 5,063,334
DATED : November 5, 1991
INVENTOR(S) : Takeo Tanita, et al.

It is certified that error appears in the above-identified patent and that said Letters Patent is hereby corrected as shown below:

COLUMN 31:

Line 14, "$\lambda/4$" should read --$\ell/4$--.
    Line 15, "$\lambda/2$" should read --$\ell/2$--.
    Line 16, "Left downward direction ( ):" should read --Left downward direction (✓):--.

COLUMN 32:

Line 29, "250  A" should read --250.  A--.

COLUMN 36:

Line 6, "i" should be deleted.
    Line 35, "324 a" should read --324a--.
    Line 38, "324 b." should read --324b.--

COLUMN 37:

Line 9, "is" should read --in--.
    Line 13, "351," should read --352,--.
    Line 15, "slide block 30" should read --slide block 330--.

COLUMN 38:

Line 52, "scale 338B" should read --scale 398B--.

UNITED STATES PATENT AND TRADEMARK OFFICE
CERTIFICATE OF CORRECTION

PATENT NO. : 5,063,334

DATED : November 5, 1991

INVENTOR(S) : Takeo Tanita, et al.

It is certified that error appears in the above-identified patent and that said Letters Patent is hereby corrected as shown below:

COLUMN 42:

TABLE

"Moving Direction of Mounting Plate" should read --Moving Direction of Mounting Plate--

↓            ↓
↑            ↑
→            →
←            ←
                     ↘
                     ↖
                     ↗
                     ↙

COLUMN 43:

Line 21, "272" should read --372--.
Line 36, "mounting plate 18" should read --mounting plate 318--.

COLUMN 45:

Line 36, "me $t_2$," should read --time $t_2$,--.

COLUMN 48:

Line 57, "$t_G = t_{ZG} + 2 + t_{RG} = 0.282 \times 2 + 0.5 = 1.064$ sec" should read --$t_G = t_{ZG} \times 2 + t_{RG} = 0.282 \times 2 + 0.5 = 1.064$ sec--.

UNITED STATES PATENT AND TRADEMARK OFFICE
CERTIFICATE OF CORRECTION

PATENT NO. : 5,063,334
DATED : November 5, 1991
INVENTOR(S) : Takeo Tanita, et al.

It is certified that error appears in the above-identified patent and that said Letters Patent is hereby corrected as shown below:

COLUMN 49:

Line 58, "direction is" should read --direction and is--.

COLUMN 50:

Line 61, "first or second home block," should read --first or second movable block,--.

COLUMN 53:

Line 36, "fourth rollers" should read --fourth intermediate rollers--.

UNITED STATES PATENT AND TRADEMARK OFFICE
CERTIFICATE OF CORRECTION

PATENT NO.  : 5,063,334
DATED       : November 5, 1991
INVENTOR(S) : Takeo Tanita, et al It is certified that error appears in the above-indentified patent and that said Letters Patent is hereby corrected as shown below:

COLUMN 54:

Line 9, "block," should read --block;--.
Line 30, "robot hand," should read --a robot hand,--.

Signed and Sealed this

Second Day of November, 1993

Attest:

BRUCE LEHMAN

Attesting Officer

Commissioner of Patents and Trademarks